United States Patent
Zhu et al.

(10) Patent No.: US 9,442,400 B2
(45) Date of Patent: Sep. 13, 2016

(54) ELECTROPHOTOGRAPHIC PHOTORECEPTOR INCLUDING A COPOLYMER POLYARYLATE RESIN, PRODUCTION METHOD THEREFOR, ELECTROPHOTOGRAPHIC DEVICE INCLUDING THE PHOTORECEPTOR, AND PRODUCTION METHOD FOR THE COPOLYMER POLYARYLATE RESIN

(75) Inventors: Fengqiang Zhu, Matsumoto (JP); Shinjiro Suzuki, Matsumoto (JP); Quanqiu Zhang, Matsumoto (JP); Seishi Terasaki, Matsumoto (JP)

(73) Assignee: FUJI ELECTRIC CO., LTD., Kawasaki-Shi (JP)

(*) Notice: Subject to any disclaimer, the term of this patent is extended or adjusted under 35 U.S.C. 154(b) by 47 days.

(21) Appl. No.: 14/372,448

(22) PCT Filed: Feb. 28, 2012

(86) PCT No.: PCT/JP2012/054953
§ 371 (c)(1),
(2), (4) Date: Nov. 21, 2014

(87) PCT Pub. No.: WO2013/128575
PCT Pub. Date: Sep. 6, 2013

(65) Prior Publication Data
US 2015/0079510 A1    Mar. 19, 2015

(51) Int. Cl.
G03G 5/05     (2006.01)
G03G 5/07     (2006.01)
C08G 63/195   (2006.01)
C08G 63/695   (2006.01)
C08G 77/445   (2006.01)

(52) U.S. Cl.
CPC ............ *G03G 5/078* (2013.01); *C08G 63/195* (2013.01); *C08G 63/6956* (2013.01); *C08G 77/445* (2013.01); *G03G 5/056* (2013.01); *G03G 5/0578* (2013.01); *G03G 5/071* (2013.01)

(58) Field of Classification Search
CPC .......................... G03G 5/0433; G03G 5/0578
See application file for complete search history.

(56) References Cited

U.S. PATENT DOCUMENTS

2005/0079431 A1    4/2005    Kobashi et al.
2008/0063963 A1    3/2008    Tajima et al.
(Continued)

FOREIGN PATENT DOCUMENTS

JP    S61-62040 A    3/1986
JP    H01-205171 A   8/1989
(Continued)

OTHER PUBLICATIONS

Abstract of CN 102532554 (Deng et al) Jul. 4, 2012.*

*Primary Examiner* — Hoa V Le
(74) *Attorney, Agent, or Firm* — Rabin & Berdo, P.C.

(57) ABSTRACT

An electrophotographic photoreceptor having a photosensitive layer which includes, as a resin binder, a copolymeric polyarylate resin having structural units of a Chemical Structural Formula 1, a method of producing the photoreceptor, an electrophotographic device including the electrophotographic photoreceptor, and a method of preparing the copolymeric polyarylate resin are provided. The electrophotographic photoreceptor reduces the amount of abrasion at the surface of a photoreceptor drum and lowers frictional resistance from the beginning until the end of printing, and moreover provides good images.

17 Claims, 3 Drawing Sheets

(56) References Cited

U.S. PATENT DOCUMENTS

| | | |
|---|---|---|
| 2012/0058422 A1 | 3/2012 | Suzuki et al. |
| 2013/0040234 A1 | 2/2013 | Zhang et al. |

FOREIGN PATENT DOCUMENTS

| | | |
|---|---|---|
| JP | H04-368953 A | 12/1992 |
| JP | H05-113670 A | 5/1993 |
| JP | H07-333881 A | 12/1995 |
| JP | H08-234468 A | 9/1996 |
| JP | H09-151255 A | 6/1997 |
| JP | H10-20534 A | 1/1998 |
| JP | 2000-355626 A | 12/2000 |
| JP | 2002-128883 A | 5/2002 |
| JP | 2002-162759 A | 6/2002 |
| JP | 2002-214807 A | 7/2002 |
| JP | 2002-333730 A | 11/2002 |
| JP | 2004-093865 A | 3/2004 |
| JP | 2005-115091 A | 4/2005 |
| JP | 2006-053549 A | 2/2006 |
| JP | 2007-121751 A | 5/2007 |
| JP | 2007-199659 A | 8/2007 |
| JP | 2010-096929 A | 4/2010 |
| TW | 201100984 A | 1/2011 |
| WO | WO-2010/092695 A1 | 8/2010 |
| WO | WO-2011/093410 A1 | 8/2011 |

* cited by examiner

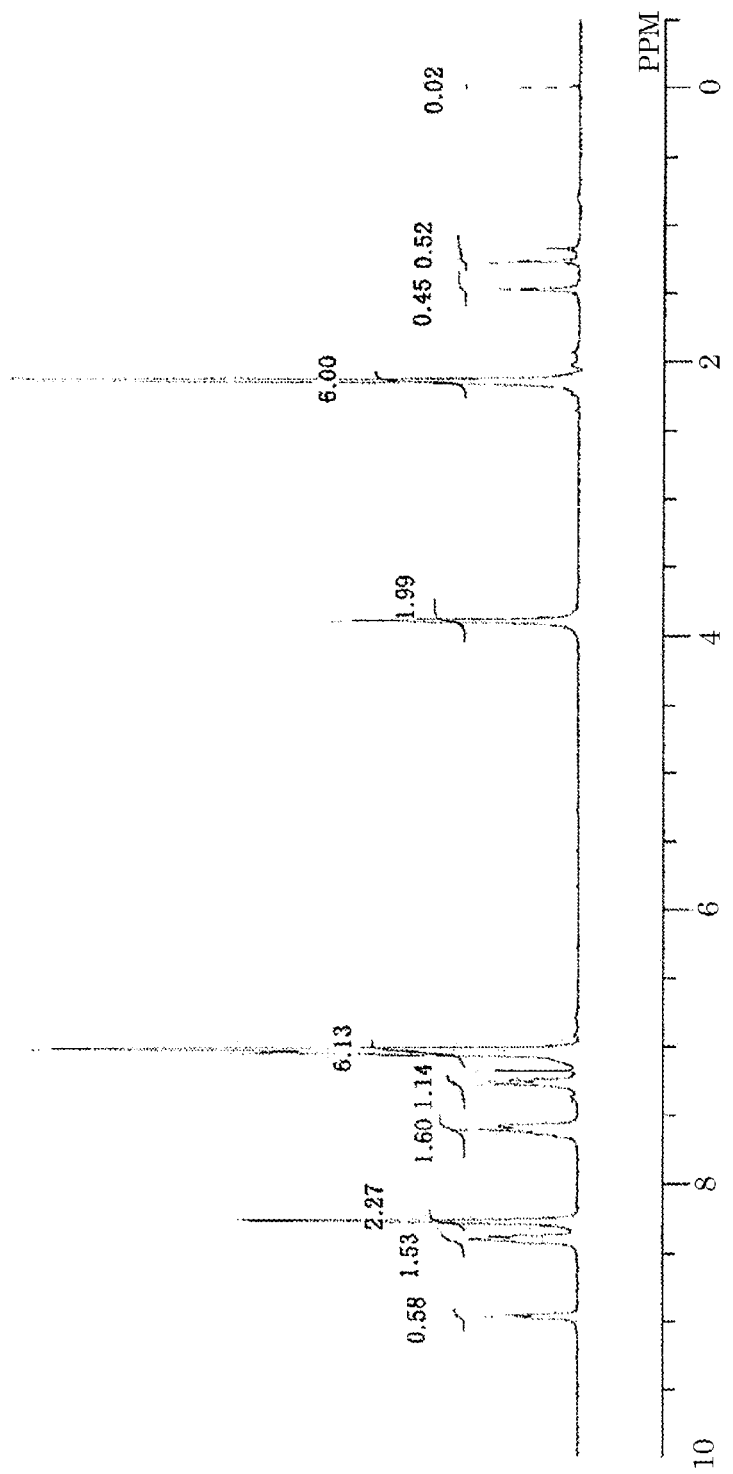

ELECTROPHOTOGRAPHIC PHOTORECEPTOR INCLUDING A COPOLYMER POLYARYLATE RESIN, PRODUCTION METHOD THEREFOR, ELECTROPHOTOGRAPHIC DEVICE INCLUDING THE PHOTORECEPTOR, AND PRODUCTION METHOD FOR THE COPOLYMER POLYARYLATE RESIN

BACKGROUND OF THE INVENTION

1. Field of the Invention

The invention relates to an electrophotographic photoreceptor (also referred to below simply as a "photoreceptor"), a method of producing such a photoreceptor, an electrophotographic device, and a method of producing a copolymeric polyarylate resin. More specifically, the invention relates to an electrophotographic photoreceptor which is composed primarily of an electrically conductive substrate and a photosensitive layer containing an organic material, and which is adapted for use in electrophotographic printers, photocopiers, fax machines and the like, to a method of producing such a photoreceptor, to an electrophotographic device, and to a method for producing a copolymeric polyarylate resin.

2. Background of the Related Art

Electrophotographic photoreceptors have a basic structure in which a photosensitive layer with a photoconductive function is provided on an electrically conductive substrate. In recent years, organic electrophotographic photoreceptors using organic compounds as functional components for generating and transporting electrical charges have been the subject of active research and development owing to their diversity of materials, high productivity, safety and other advantages, and they are being applied to copiers, printers and the like.

In general, a photoreceptor must have the function of holding a surface charge in a dark place, the function of receiving light and generating charge, and also the function of transporting the generated charge. Such photoreceptors include single-layer photoreceptors provided with a single photosensitive layer endowed with all of these functions, and also stacked (functionally separated) photoreceptors provided with a photosensitive layer comprising a stack of functionally discrete layers: primarily, a charge generating layer that serves the function of generating charge during photoreception, and a charge transport layer that serves the function of holding a surface charge in a dark place and transporting the charge generated in the charge generating layer during photoreception.

The photosensitive layer is normally formed by dissolving or dispersing a charge generating material, a charge transporting material and a resin binder in an organic solvent to obtain a coating liquid that is then applied onto a conductive substrate. In these organic electrophotographic photoreceptors, polycarbonates that are highly flexible, transparent to light exposure and resistant to friction with the paper and the blade used for toner removal are often used as resin binders in the layer forming the outermost surface in particular. Of these, bisphenol Z polycarbonate is widely used as a resin binder. Art using this polycarbonate as a resin binder is described in, for example, Japanese Patent Application Laid-open No. S61-62040, Patent Document 1.

Currently, most electrophotographic devices are so-called digital devices which use monochromatic light from, for example, an argon, helium-neon or semiconductor laser or a light-emitting diode as an exposing light source to digitize and convert images, lettering and other information to optical signals. These optical signals are irradiated onto an electrically charged photoreceptor so as to form on the photoreceptor surface an electrostatic latent image that is then rendered visible with a toner.

Methods of charging the photoreceptor include non-contact charging systems which use charging devices such as scorotrons that do not contact the photoreceptor, and contact charging systems which use charging devices with semiconductive rubber rollers or brushes that contact the photoreceptor. The advantage of a contact charging system over a non-contact charging system is that, because the corona discharge occurs very near the photoreceptor, little ozone is generated and little applied voltage is required. Hence, this system is favored in medium-sized and small devices in particular because it enables an electrophotographic device that is compact, inexpensive and environmentally friendly to be obtained.

The most common methods for cleaning the surface of the photoreceptor include scraping with a blade and a simultaneous cleaning/development process. In the case of blade cleaning, untransferred residual toner on the surface of the organic photoreceptor is scraped off with a blade, and the toner is then collected in a waste toner box or returned to the developing unit. The difficulty with cleaning by this blade scraping system is that space is required for the toner collection box and recycling, and it is necessary to monitor the amount of toner in the toner collection box. Moreover, if paper dust and external additives accumulate on the blade, they may damage the surface of the organic photoreceptor, shortening the life of the electrophotographic photoreceptor. Hence, the toner is sometimes collected in the development process, or a means for magnetically or electrically drawing off residual toner adhering to the surface of the electrophotographic photoreceptor is installed immediately before the developing roller.

When using a cleaning blade, the rubber hardness must be enhanced and the contact pressure must be increased in order to improve the cleaning properties. However, this promotes wear of the photoreceptor, causing fluctuations in potential and sensitivity, which leads to image abnormalities and, in the case of color devices, problems with color balance and reproducibility.

In the case of a cleaningless system in which development and cleaning are performed together by a development unit using a contact charging mechanism, toner with a fluctuating charge quantity is produced in the contact charging mechanism. Another problem is that when a very small amount of reverse-polarity toner is present in the toner, these toners cannot be sufficiently removed from the photoreceptor and contaminate the charging device.

The surface of the photoreceptor surface may also be contaminated by ozone, nitrogen oxides and the like produced during charging of the photoreceptor. In addition to image deletion caused by the contaminants themselves, adhering substances may reduce the lubricity of the surface, making it easier for paper dust and toner to adhere to the surface and causing other problems such as blade noise, curling and surface scratches.

To increase toner transfer efficiency in the transfer step, attempts have been made to improve transfer efficiency and thus reduce the amount of residual toner by optimizing the transfer current for the properties of the paper and the temperature and humidity environment. Organic photoreceptors with improved toner release properties and organic photoreceptors with a smaller transfer effect are thus needed as organic photoreceptors suited to such processes and contact charging systems.

To resolve these problems, various methods have been proposed for improving the surfacemost layer of the photoreceptor. For example, Japanese Patent Application Laid-open Nos. H1-205171 and H7-333881, respectively, Patent Documents 2 and 3, propose methods for adding a filler to the surface layer of the photosensitive layer in order to increase the durability of the photoreceptor surface. However, with these methods of dispersing a filler in the film, it is difficult to disperse the filler uniformly. Filler aggregates also occur, film transparency is reduced and the filler scatters exposure light, causing irregularities in charge transport and charge generation and detracting from the image characteristics. One method of improving filler dispersibility is to add a dispersant, but in this case the dispersant itself affects the photoreceptor characteristics, which are thus difficult to reconcile with filler dispersibility.

Japanese Patent Application Laid-open No. H4-368953, Patent Document 4, discloses a method for including a fluoroplastic such as polytetrafluoroethylene (PTFE) in the photosensitive layer, and Japanese Patent Application Laid-open No. 2002-162759, Patent Document 5, discloses a method for adding a silicone resin such as an alkyl-modified polysiloxane. However, in the method of Patent Document 4, the PTFE or other fluoroplastic has a low solubility in solvents or a poor compatibility with other resins, causing phase separation and light scattering at resin interfaces. As a result, the sensitivity characteristics have fallen short of what is desired in a photoreceptor. With the method of Patent Document 5, the problem has been that continuous effects are not obtained because the silicone resin bleeds to the surface of the coating film.

To solve these problems, Japanese Patent Application Laid-open No. 2002-128883, Patent Document 6, proposes a method for improving wear resistance by using a resin in which a siloxane structure has been added to the terminal structure. Japanese Patent Application Laid-open No. 2007-199659, Patent Document 7, describes a photoreceptor containing a polycarbonate or polyarylate obtained using a specific siloxane structure-containing phenol as a starting material. Japanese Patent Application Laid-open No. 2002-333730, Patent Document 8, discloses a photoreceptor containing a resin having a carboxyl group-containing siloxane resin structure introduced into the resin structure. Japanese Patent Application Laid-open No. H5-113670, Patent Document 9, describes a photosensitive layer containing a polycarbonate the surface energy of which has been reduced by the inclusion of a silicone structure. Japanese Patent Application Laid-open No. H8-234468, Patent Document 10, describes a photoreceptor which contains a polyester resin that includes polysiloxane as structural units on the surfacemost layer of the photoreceptor.

Japanese Patent Application Laid-open No. 2005-115091, Patent Document 11, discloses the use of polyarylate as a resin binder for the photosensitive layer, and describes repeated investigations conducted for such purposes as to improve durability and mechanical strength. Japanese Patent Application Laid-open No. 2002-214807, Patent Document 12, proposes a photoreceptor wherein polycarbonate and polyarylate resins having siloxane structures are used in the photosensitive layer by using a phenol-modified polysiloxane resin as the siloxane component. Japanese Patent Application Laid-open No. 2004-93865, Patent Document 13, discloses an electrophotographic device having a silicone-modified polyarylate resin-containing photosensitive layer. Japanese Patent Application Laid-open Nos. 2007-121751 and 2010-96929, respectively, Patent Documents 14 and 15 disclose photoreceptors which use polyarylate resins in the photosensitive layer.

Methods have also been proposed for forming surface protective layers on the photosensitive layer with the aim of protecting the photosensitive layer and improving mechanical strength and surface lubricity. However, the problem with these methods of forming a surface protective layer has been the difficulty of forming a film on the charge transport layer and the difficulty of satisfactorily achieving both charge transporting properties and a charge holding function.

Unfortunately, it is not possible with the art disclosed in the above-cited Patent Documents to achieve both a low coefficient of friction and a low amount of wear. Moreover, this foregoing art is also inadequate for maintaining good electrical characteristics and image characteristics.

It is therefore an object of the invention to provide an electrophotographic photoreceptor which, by enabling the amount of wear on the surface of the photoreceptor drum to be reduced and also lowering the coefficient of friction from the beginning until after printing, is able to obtain good images. Further objects of the invention are to provide a method of producing such a photoreceptor, an electrophotographic device, and a method of preparing a copolymeric polyarylate resin.

SUMMARY OF THE INVENTION

The inventors made extensive research to attain the objects by making use of various types of resins as a photosensitive layer in order to achieve a low amount of abrasion and a low coefficient of friction, and ultimately turned to polyarylate resins. The inventors have discovered that by using in particular a polyarylate resin containing specific siloxane structures as a resin binder, an electrophotographic photoreceptor in which a low coefficient of friction is sustained at the surface of the photoreceptor can be achieved. The inventors have also found that introducing a specific polyarylate structure into the resin increases the rigidity of the resin, thus making it possible to obtain an electrophotographic photoreceptor which is endowed with both a low coefficient of friction and reduced wear, and also has excellent electrical characteristics, whereby the present invention has been completed.

The electrophotographic photoreceptor of the invention has a photosensitive layer provided on an electrically conductive substrate and is characterized in that the photosensitive layer includes, as a resin binder, a copolymeric polyarylate resin having structural units of Chemical Structural Formula 1 below.
Chemical Structural Formula 1:
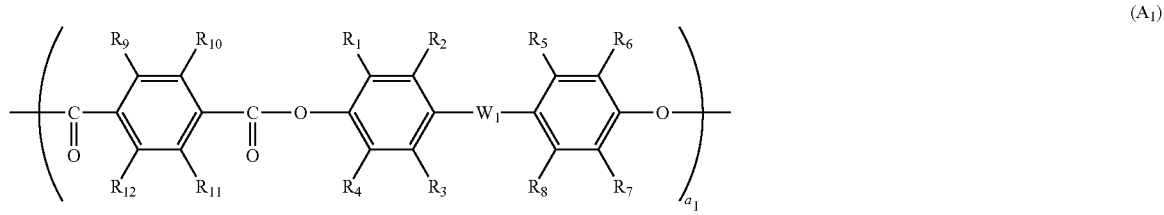
(A₁)
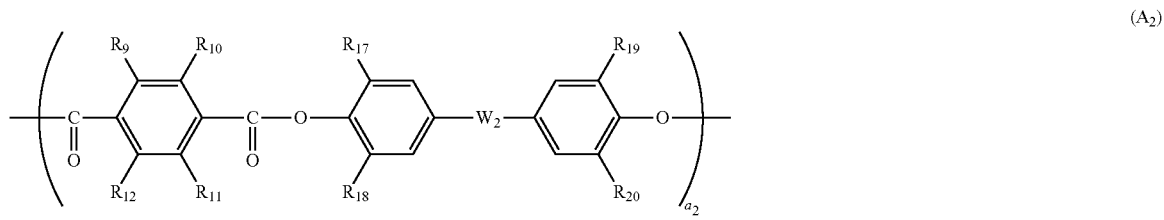
(A₂)
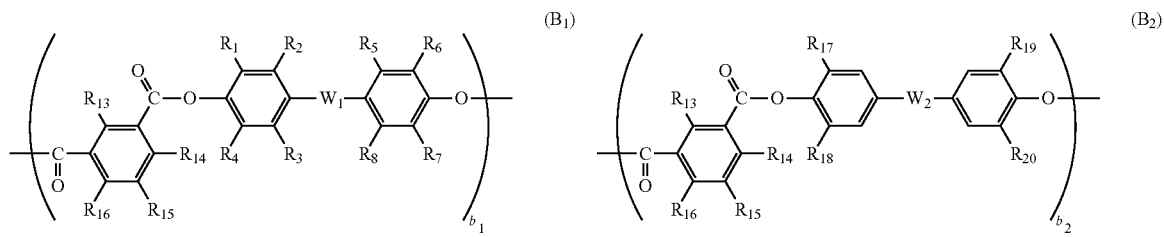
(B₁) (B₂)
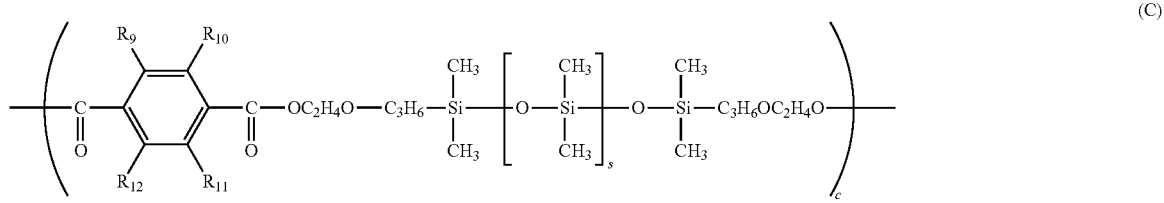
(C)
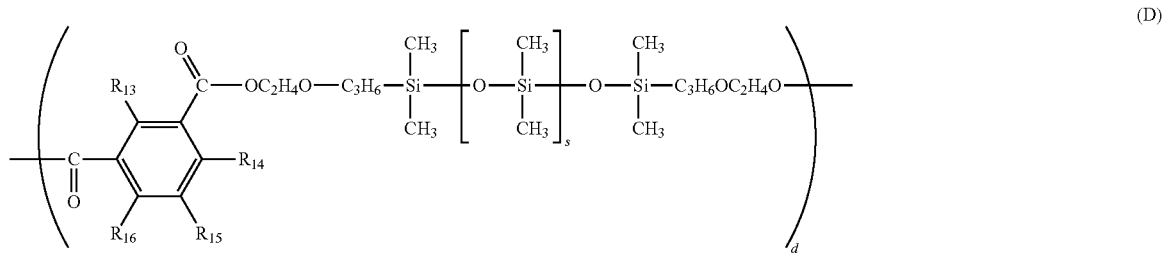
(D)

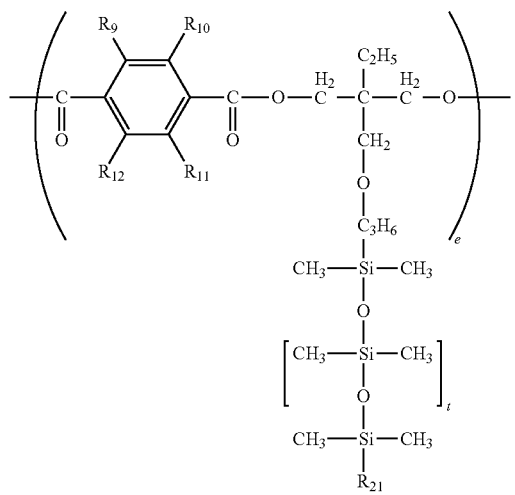
(E)

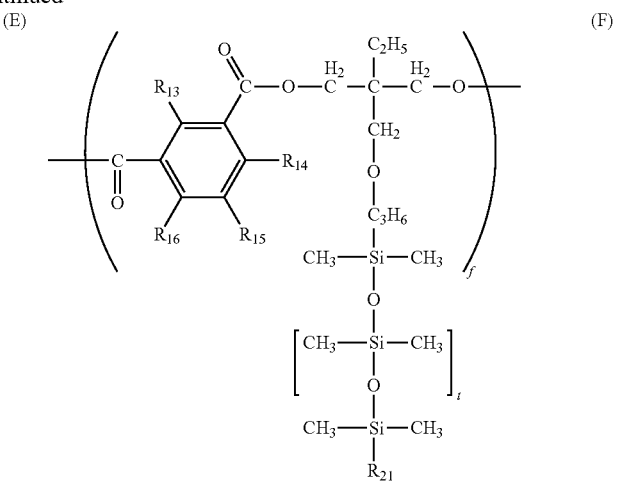
(F)

In Chemical Structural Formula 1, partial structural formulas $(A_1)$, $(A_2)$, $(B_1)$, $(B_2)$, (C), (D), (E) and (F) are structural units making up the resin binder; $a_1$, $a_2$, $b_1$, $b_2$, c, d, e and f represent mol % of the respective structural units $(A_1)$, $(A_2)$, $(B_1)$, $(B_2)$, (C), (D), (E) and (F), with $a_1+a_2+b_1+b_2+c+d+e+f$ being 100 mol % and c+d+e+f being from 0.001 to 10 mol %; $W_1$ and $W_2$ are two different moieties selected from the group consisting of a single bond, —O—, —S—, —SO—, —CO—, —SO$_2$—, —CR$_{22}$R$_{23}$— (R$_{22}$ and R$_{23}$, which may be the same or different, being a hydrogen atom, an alkyl group or halogenated alkyl group of 1 to 12 carbons, or a substituted or unsubstituted aryl group of 6 to 12 carbons), substituted or unsubstituted cycloalkylidene groups of 5 to 12 carbons, substituted or unsubstituted α,ω-alkylene groups of 2 to 12 carbons, a 9,9-fluorenylidene group, substituted or unsubstituted arylene groups of 6 to 12 carbons, and divalent groups containing an aryl group or arylene group of 6 to 12 carbons; $R_1$ to $R_{20}$, which may be the same or different, are each a hydrogen atom, an alkyl group of 1 to 8 carbons, a fluorine atom, a chlorine atom or a bromine atom; $R_{21}$ is a hydrogen atom, an alkyl group of 1 to 20 carbons, an aryl group which may have a substituent, a cycloalkyl group which may have a substituent, a fluorine atom, a chlorine atom or a bromine atom; and "s" and "t" are integers of 1 or more.

In the photoreceptor of the invention, it is preferable, in Chemical Structural Formula 1, for "c" and "d" to be 0 mol % or for "e" and "f" to be 0 mol %. Also, in Chemical Structural Formula 1, it is preferable for $W_2$ to be a single bond, —O— or —CR$_{22}$R$_{23}$— (R$_{22}$ and R$_{23}$, which may be the same or different, being a hydrogen atom, a methyl group or an ethyl group), and it is preferable for $W_1$ to be —CR$_{22}$R$_{23}$— (R$_{22}$ and R$_{23}$, which may be the same or different, being a hydrogen atom, a methyl group or an ethyl group). It is more preferable for $W_1$ to be a methylene group, $W_2$ to be a single bond, $R_1$ and $R_6$ to each be methyl groups, and $R_2$ to $R_5$ and $R_7$ to $R_{20}$ to be hydrogen atoms. The copolymeric polyarylate resin may be synthesized by interfacial polymerization alone, although it is more preferably synthesized by reacting a siloxane component in solution polymerization, followed by interfacial polymerization.

The photoreceptor of the invention is exemplified by a stacked photoreceptor having, on a support, both a charge generating layer containing a charge generating material and also a charge transport layer containing a charge transporting material and a binder resin; and a single-layer photoreceptor having, on a support, a layer which contains a charge transporting material and a binder resin and in which a charge generating material has been dispersed. The polyarylate resin of this invention may be used even in a single-layer photoreceptor, but is preferably used in the charge transport layer of a stacked photoreceptor.

The inventive method of producing an electrophotographic photoreceptor includes the step of forming a photosensitive layer by applying, onto an electrically conductive substrate, a coating liquid that includes at least a resin binder, wherein the resin binder is a copolymeric polyarylate resin having structural units of above Chemical Structural Formula 1.

The electrophotographic device of the invention is characterized by being equipped with the foregoing electrophotographic photoreceptor.

The inventive method of preparing a copolymeric polyarylate resin is characterized by being a method of preparing a copolymeric polyarylate resin having structural units of above Chemical Structural Formula 1 which involves either synthesis by interfacial polymerization, or synthesis by reacting a siloxane component using solution polymerization, followed by interfacial polymerization.

In the resin ($P_2$-1-6) described in Patent Document 10, the phthalic acid/bisphenol portion has a polyester structure similar to Structural Formula ($A_1$) of this invention. $P_2$-1-6 uses a siloxane-containing dihydric phenol, and so a phenyl group is interposed on the siloxane side of ester structural sites. Patent Document 12 similarly uses phenolic hydroxyl groups when introducing siloxane structures into the resin. The inventors, having determined that a problem with these resin structures is the excessive rigidity of the resin, which lowers the resistance to cracking due to internal stresses during film formation, conducted extensive investigations in order to find a solution to the decreased crack resistance in this related art. These investigations ultimately led to the present invention. In the introduction of a siloxane site in this invention, an alcoholic hydroxyl group (hydroxyalkyl) structure is included at one or both ends of the siloxane site and ester bonded so as to incorporate the siloxane structure into the resin. Siloxane structures and alcoholic hydroxyl groups are also bonded through ether linkages. This results in a structure containing ethylene moieties and ether bonds, allowing internal stresses to be eased.

In the practice of the invention, the effects that can be obtained in cases where above Structural Formulas (C) and (D) alone are included and in cases where above Structural Formulas (E) and (F) alone are included are similar. However, because above Structural Formulas (E) and (F) represent structures which include a single-end type siloxane component and moreover have $R_{21}$ at the end, an effect that can be obtained in this case is the ability to control the compatibility of the resin and the charge transporting material. Also, in Structural Formula (E) the siloxane component has a comb-like structure with respect to the resin backbone, owing to effects arising from the branched structure, unlike above Structural Formulas (C) and (D) in which the siloxane structure is incorporated into the resin backbone, hence it can be used while altering the relationship between molecular weight and coating liquid viscosity.

The use, according to this invention, of a copolymeric polyarylate resin composed of the above-described specific structural units as the resin binder in a photosensitive layer has made it possible to hold down abrasion of the photosensitive layer surface and keep the coefficient of friction low from the beginning until after printing while maintaining the electrophotographic characteristics of the photoreceptor. Also, the cleaning properties have been improved, enabling an electrophotographic photoreceptor to be obtained which can provide good images. It has also become apparent that the above-described copolymeric polyarylate resin is a resin of high rigidity and excellent mechanical strength.

BRIEF DESCRIPTION OF THE DRAWINGS

FIG. 2 is a chart showing the $H^1$-NMR spectrum for copolymeric polyarylate resin (III-1) in THF-$d_8$ solvent.

DETAILED DESCRIPTION OF THE INVENTION

Figure 1A:
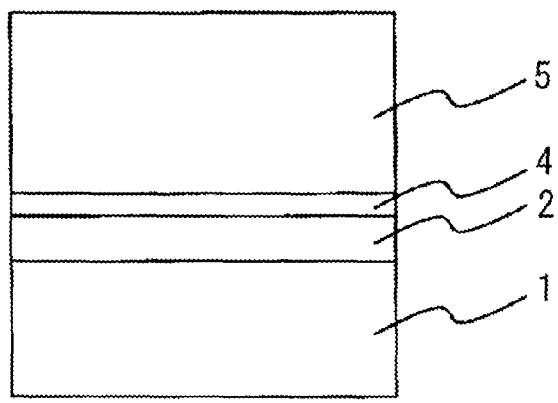
FIG. 1A is a schematic sectional view of a negative-charging, functionally separated, stacked electrophotographic photoreceptor according to the invention.

Embodiments of the invention are described in detail below while referring to the drawings, although the invention is not in any way limited by the explanation that follows.

Figure 1B:
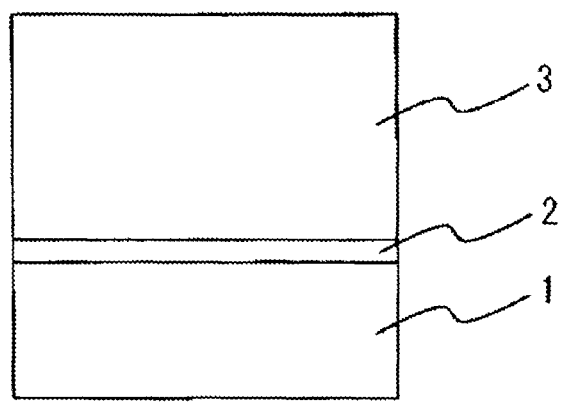
FIG. 1B is a schematic sectional view of a positive-charging single-layer electrophotographic photoreceptor according to the invention.
Figure 1C:
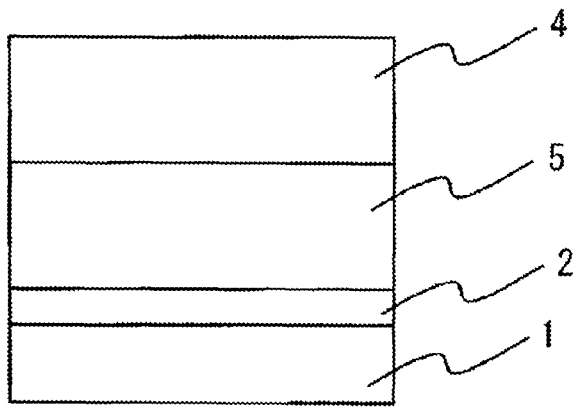
FIG. 1C is a schematic sectional view of a positive-charging, stacked electrophotographic photoreceptor according to the invention.
Figure 3:
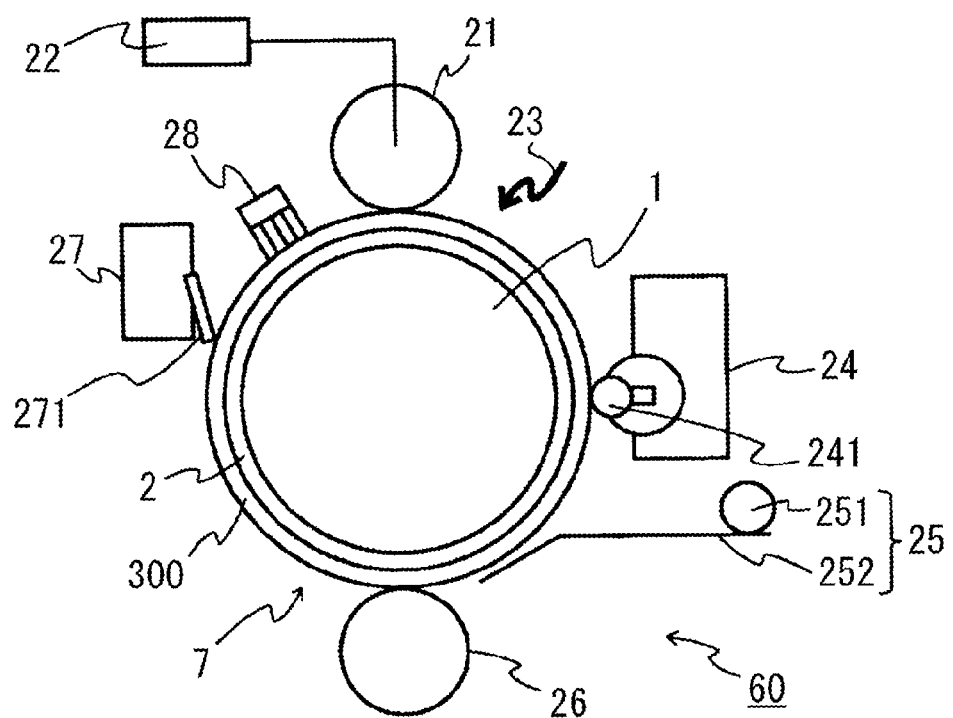
FIG. 3 is a schematic diagram showing the configuration of an electrophotographic device according to the invention.

As noted above, electrophotographic photoreceptors are broadly divided into so-called negative-charging stacked photoreceptors and positive-charging stacked photoreceptors—as stacked (functionally separated) photoreceptors, —and single-layer photoreceptors which are used chiefly as positive-charging photoreceptors. FIG. 1 presents schematic cross-sectional views of electrophotographic photoreceptors according to embodiments of the invention, with FIG. 1A showing a negative-charging stacked electrophotographic photoreceptor, FIG. 1B showing a positive-charging single-layer electrophotographic photoreceptor, and FIG. 1C showing a positive-charging stacked electrophotographic photoreceptor. As shown in the diagrams, in a negative-charging stacked photoreceptor, an undercoat layer 2 and a photosensitive layer that includes a charge generating layer 4 having a charge generating function and a charge transport layer 5 having a charge transporting function are stacked in this order on an electrically conductive substrate 1. In a positive-charging single-layer photoreceptor, an undercoat layer 2 and a single-layer type photosensitive layer 3 having both charge generating and charge transport functions are stacked in this order on an electrically conductive substrate 1. In a positive-charging stacked photoreceptor, an undercoat layer 2, and a photosensitive layer that includes a charge transport layer 5 having a charge transport function and a charge generating layer 4 having both a charge generating and charge transport function are stacked in this order on an electrically conductive base 1. In all these types of photoreceptors, the undercoat layer 2 is optionally provided. As used herein, the term 'photosensitive layer' encompasses both stacked photosensitive layers in which a charge generating layer and a charge transport layer are stacked together, and also single-layer photosensitive layers.

The conductive substrate 1 functions as an electrode for the photoreceptor and at the same time serves as a support for the layers making the photoreceptor. It may in the shape of, for example, a cylinder, a plate or a film. The conductive substrate 1 may be composed of, for example, a metal such as aluminum, stainless steel or nickel, or of some other material such as glass or resin that has been subjected to conductive treatment of the surface of the above metal or materials.

The undercoat layer 2 is composed of a layer containing primarily resin or of a metal oxide film such as anodized aluminum. This undercoat layer 2 controls the ability to inject charge from the conductive substrate 1 to the photosensitive layer, and therefore is provided, where necessary, for such purposes as to cover defects in the surface of the conductive substrate and to increase adhesion between the photosensitive layer and the conductive substrate 1. Resin materials that may be used in the undercoat layer 2 include electrically insulating polymers such as casein, polyvinyl alcohol, polyamide, melamine and cellulose, and electrically conductive polymers such as polythiophene, polypyrrole and polyaniline. These resins may be used singly or may be suitably combined and used in admixture. A metal oxide such as titanium dioxide or zinc oxide may be included and used within these resins.

Negative-Charging Stacked Photoreceptor

In a negative-charging stacked photoreceptor, the charge generating layer 4 is formed by, for example, dispersing particles of a charge generating material within a resin binder to form a coating liquid and then applying the resulting coating liquid, and generates a charge during photoreception. It is important for this layer to have a high charge generating efficiency and also the ability to inject the generated charge into the charge transport layer 5, and it is desirable that the layer have a low electric field dependence so that injection even in a low electric field is good.

Illustrative examples of charge generating materials include phthalocyanine compounds such as X-type nonmetallic phthalocyanine, τ-type nonmetallic phthalocyanine, α-type titanyl phthalocyanine, β-type titanyl phthalocyanine, Y-type titanyl phthalocyanine, γ-type titanyl phthalocyanine, amorphous titanyl phthalocyanine and ε-type copper phthalocyanine, and various azo pigments, anthanthrone pigments, thiapyrylium pigments, perylene pigments, perinone pigments, squarylium pigments and quinacridone pigments, which may be used singly or in suitable combination. A substance suitable for the wavelength region of the exposure light source used in image formation may be selected.

Because the charge generating layer 4 need only have a charge generating function, the thickness of this layer is determined by the light absorption coefficient of the charge generating material, generally being not more than 1 μm, and preferably not more than 0.5 μm. The charge generating layer 4 is composed primarily of a charge generating material, to which may be added, for example, a charge transporting material. Polymers, copolymers and the like of polycarbonate resin, polyester resin, polyamide resin, polyurethane resin, vinyl chloride resin, vinyl acetate resin, phenoxy resin, polyvinyl acetal resin, polyvinyl butyral resin, polystyrene resin, polysulfone resin, diallyl phthalate resin and methacrylate resin may be used in suitable combination as the resin binder.

The charge transport layer 5 is composed primarily of a charge transporting material and a resin binder. In this invention, it is essential to use a copolymeric polyarylate resin having structural units of above Chemical Structural Formula 1 as the resin binder of the charge transport layer 5. The expected effects of the invention can thereby be obtained.

In the photoreceptor of the invention, this copolymeric polyarylate resin may have other structural units as well. Letting the copolymeric polyarylate resin overall be 100 mol %, the structural units of above Chemical Structural Formula 1 preferably account for 10 to 100 mol %, and especially 50 to 100 mol %, thereof.

In the inventive photoreceptor, letting the total amount of structural units of Chemical Structural Formula 1 ($a_1+a_2+b_1+b_2+c+d+e+f$) be 100 mol %, the amount of siloxane components ($c+d+e+f$) is from 0.001 to 10 mol %, and preferably from 0.03 to 10 mol %. When ($c+d+e+f$) is smaller than 0.001 mol %, a sufficient coefficient of friction that is capable of being sustained may not be obtained. On the other hand, when ($c+d+e+f$) is larger than 10 mol %, a sufficient film hardness may not be obtained, in addition to which, when the coating liquid is prepared, sufficient compatibility with the solvent and functional materials may not be obtained.

In Chemical Structural Formula 1, the anticipated effects of the invention can be similarly obtained even when, to obtain the resin in a high yield, "c" and "d" are both 0 mol %, meaning that Structural Formula (C) and Structural Formula (D) are not included, or when "e" and "f" are both 0 mol %, meaning that Structural Formula (E) and Structural Formula (F) are not included.

In Chemical Structural Formula 1, "s" and "t" are each integers of at least 1 and not more than 400, and preferably integers of at least 8 and not more than 250.

In the photoreceptor of the invention, to obtain the anticipated effects of the invention, it is preferable, in Chemical Structural Formula 1, for $W_2$ to be a single bond, —O— or —$CR_{22}R_{23}$— ($R_{22}$ and $R_{23}$, which may be the same or different, being a hydrogen atom, a methyl group or an ethyl group), and it is preferable for $W_1$ to be —$CR_{22}R_{23}$— ($R_{22}$ and $R_{23}$, which may be the same or different, being a hydrogen atom, a methyl group or an ethyl group). It is more preferable for $W_1$ to be a methylene group, for $W_2$ to be a single bond, for each $R_1$ and $R_6$ to be methyl groups, and for $R_2$ to $R_5$ and $R_7$ to $R_{20}$ to be hydrogen atoms. The reason is thought to be that, although the effects of having $W_2$ be a single bond and introducing a biphenyl structure are not entirely clear, due to the biphenyl structure, the crystallinity within the resin locally rises and interactions between the resin molecules improve, increasing the durability of the photoreceptor.

The copolymeric polyarylate resin may be synthesized by interfacial polymerization alone, although synthesis using solution polymerization to react the siloxane components, followed by interfacial polymerization is more preferred. This is because, owing to the solubilities and reactivities of monomers of the siloxane components, it is preferable to carry out interfacial polymerization after having first reacted the siloxane components by solution polymerization.

The siloxane structures in the copolymeric polyarylate resin of Chemical Structural Formula 1 are exemplified by constituent monomers of Molecular Formula (2) below (the reactive silicones Silaplane FM-4411 (weight-average molecular weight, 1000), FM-4421 (weight-average molecular weight, 5000) and FM-4425 (weight-average molecular weight, 15,000), all from Chisso Corporation), and constituent monomers of Molecular Formula (3) below (the reactive silicones Silaplane FM-DA11 (weight-average molecular weight, 1000), FM-DA21 (weight-average molecular weight, 5000) and FM-DA26 (weight-average molecular weight, 15,000), from Chisso Corporation).

| Molecular Formula (2) | | | |
|---|---|---|---|
| Structural Formula No. | Basic Structure | Average molecular weight | Example structures |
| Formula (2)-1 | $HOC_2H_4O$—$C_3H_6$—$\underset{CH_3}{\underset{|}{\overset{CH_3}{\overset{|}{Si}}}}$—$\left[ O-\underset{CH_3}{\underset{|}{\overset{CH_3}{\overset{|}{Si}}}} \right]_s$—$O$—$\underset{CH_3}{\underset{|}{\overset{CH_3}{\overset{|}{Si}}}}$—$C_3H_6$—$OC_2H_4OH$ | 1000 | Silaplane FM-4411 (from Chisso Corp.) |
| Formula (2)-2 | | 5000 | Silaplane FM-4421 (from Chisso Corp.) |
| Formula (2)-3 | | 10,000 | Silaplane FM-4425 (from Chisso Corp.) |

Molecular Formula (3)

| Structural Formula No. | Basic Structure | Average molecular weight | Example structures |
|---|---|---|---|
| Formula (3)-1 | | 1000 | Silaplane FM-DA11 (from Chisso Corp.) |
| Formula (3)-2 | | 5000 | Silaplane FM-DA21 (from Chisso Corp.) |
| Formula (3)-3 | | 15,000 | Silaplane FM-DA26 (from Chisso Corp.) |

In the above formula, $R_{21}$ is an n-butyl group.

The copolymeric polyarylate resin of Chemical Structural Formula 1 may be used alone or may be used in admixture with other resins. Examples of other resins that may be used include other polyarylate resins, various polycarbonate resins such as bisphenol A polycarbonate, bisphenol Z polycarbonate, bisphenol A polycarbonate-biphenyl copolymer and bisphenol Z polycarbonate-biphenyl copolymer, polyphenylene resin, polyphenylene resin, polyester resin, polyvinyl acetal resin, polyvinyl butyral resin, polyvinyl alcohol resin, vinyl chloride resin, vinyl acetate resin, polyethylene resin, polypropylene resin, acrylic resin, polyurethane resin, epoxy resin, melamine resin, silicone resin, polyamide resin, polystyrene resin, polyacetal resin, polysulfone resin and methacrylate polymer, as well as copolymers thereof. In addition, resins of the same type but differing molecular weights may be used in admixture.

The content of resin binder, with respect to the solids content of the charge transport layer 5, is preferably from 10 to 90 wt %, and more preferably from 20 to 80 wt %. The content of copolymeric polyarylate resin, with respect to this resin binder, is preferably in the range of 1 wt % to 100 wt %, and more preferably in the range of 5 wt % to 80 wt %.

The weight-average molecular weights of these polyarylate resins are preferably from 5000 to 250,000, and more preferably from 10,000 to 150,000.

Illustrative examples of the Structural Formulas ($A_1$), ($A_2$), ($B_1$), ($B_2$), (C), (D), (E) and (F), which are structural units represented by above Chemical Structural Formula 1, are given below. In addition, Table 1 below shows examples of copolymeric polyarylate resins having these Structural Formulas ($A_1$), ($A_2$), ($B_1$), ($B_2$), (C), (D), (E) and (F). It should be noted, however, that the copolymeric polyarylate resin of the invention is not limited to copolymeric polyarylate resins having these example structures.

Examples of Structural Formula ($A_1$)

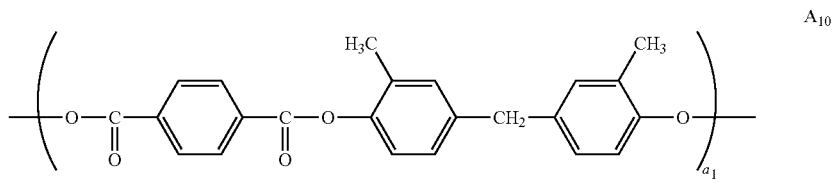

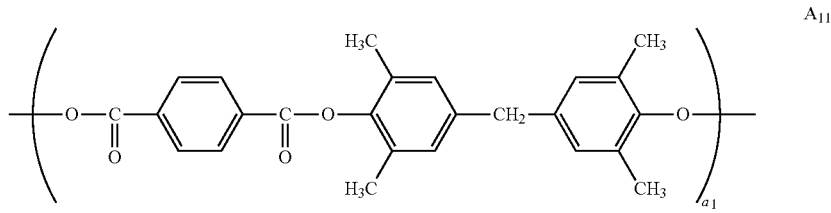

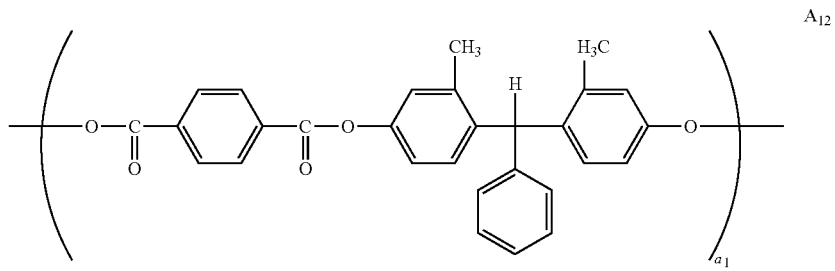

-continued
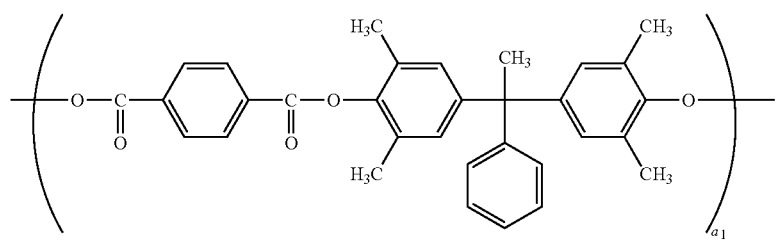
A₁₃
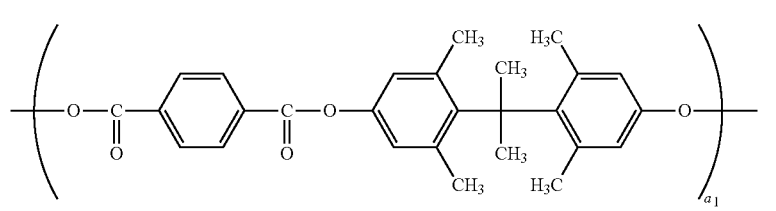
A₁₄
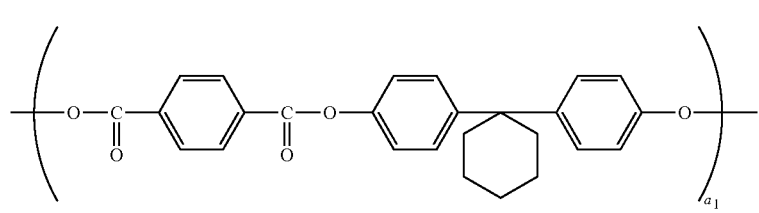
A₁₅
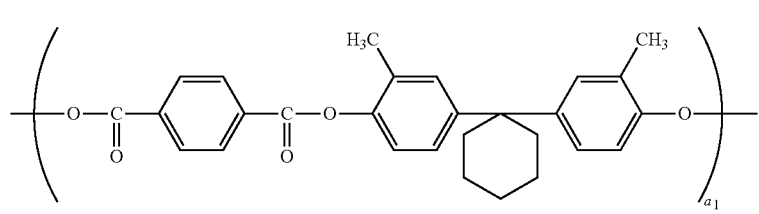
A₁₆
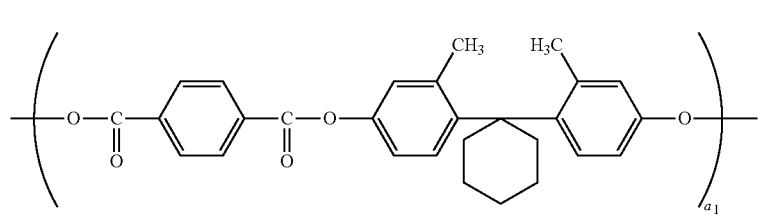
A₁₇
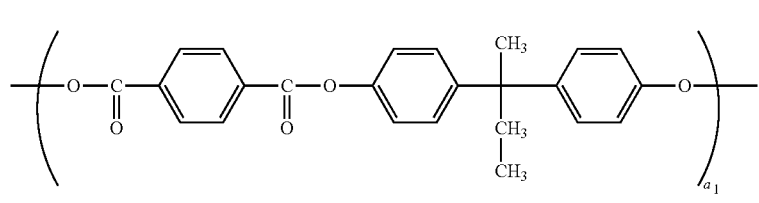
A₁₈
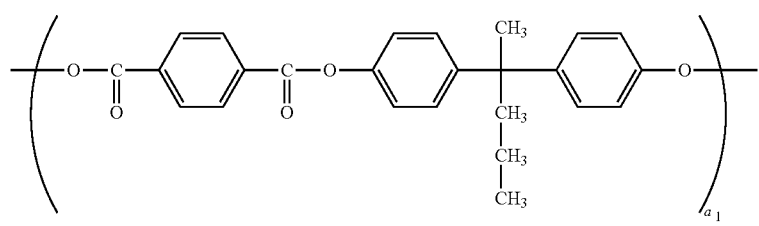
A₁₉

Examples of Structural Formula (A₁)
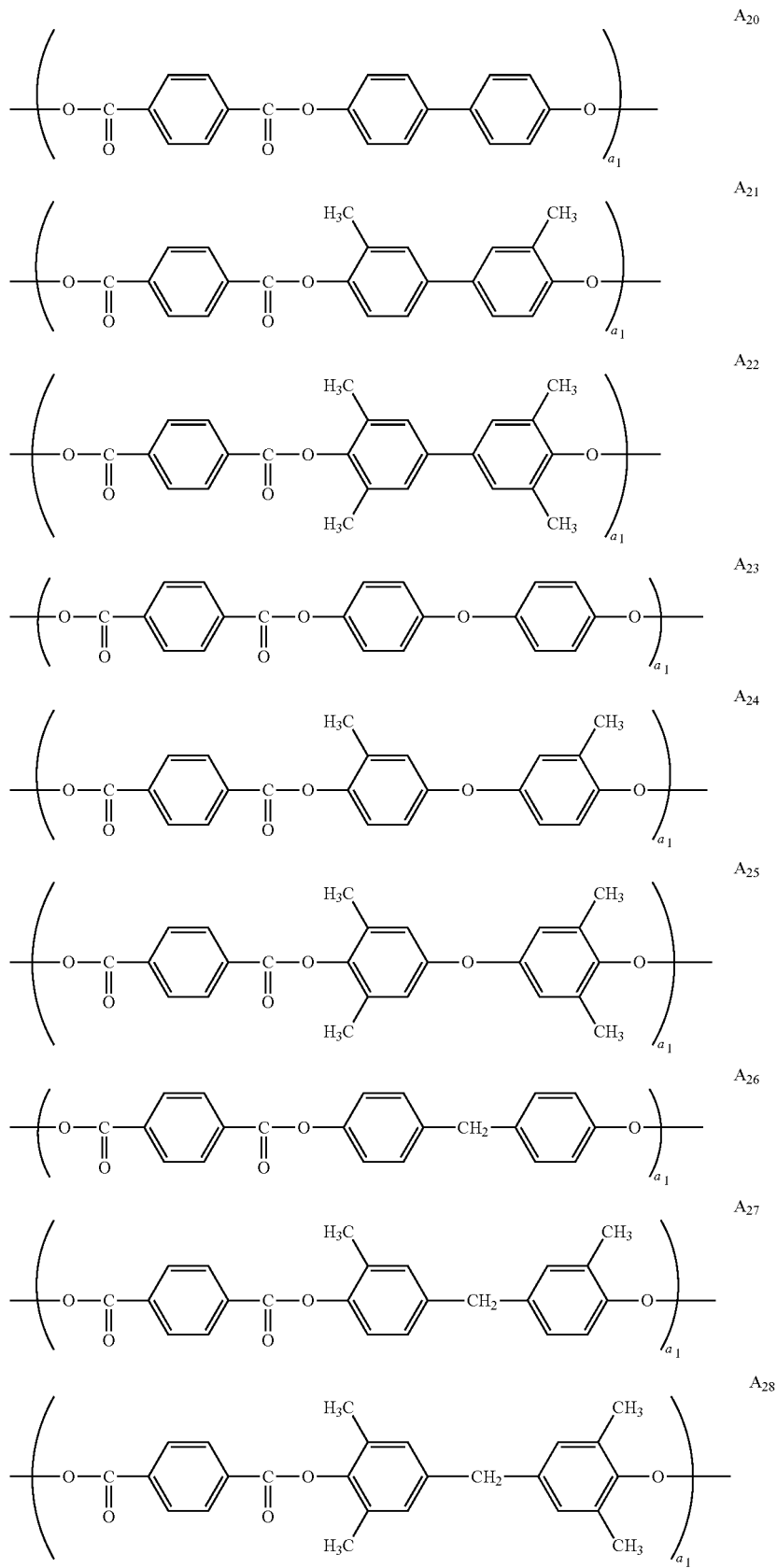

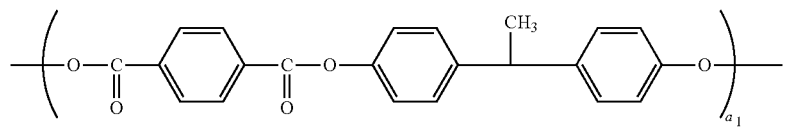
A29
Examples of Structural Formula (B₁)
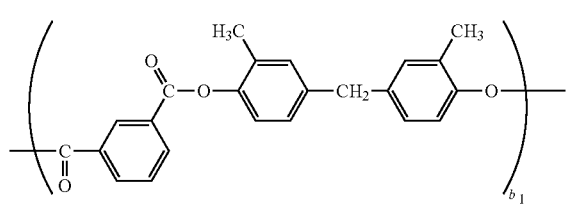
B10
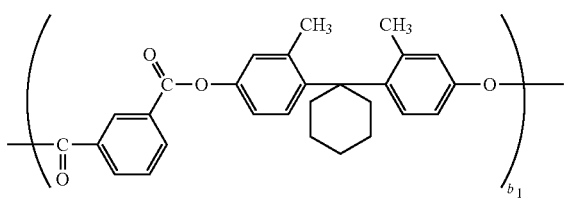
B16
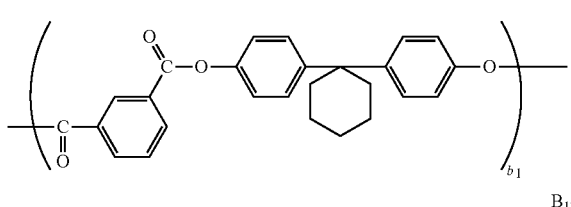
B11
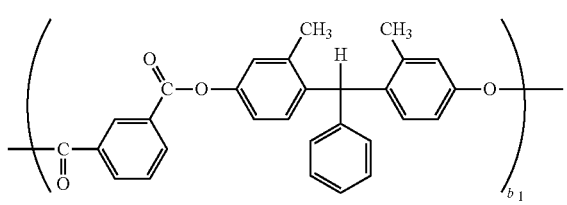
B17
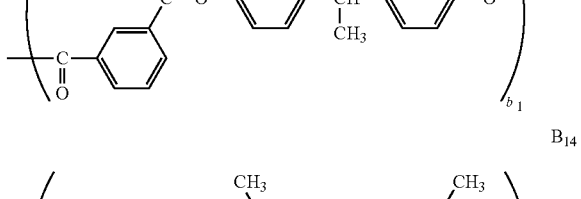
B12
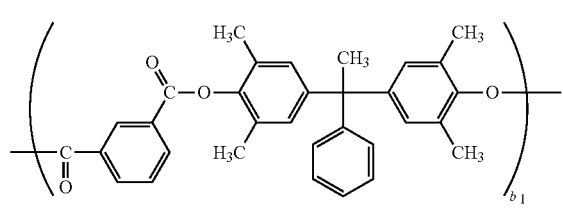
B18
B13
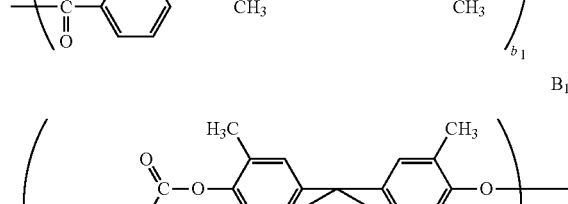
B14
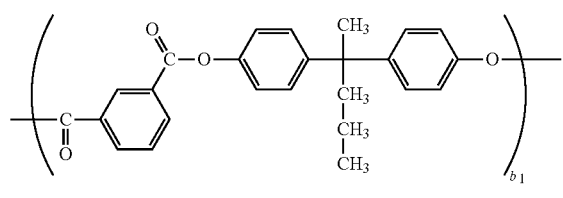
B19
Examples of Structural Formula (B₂)
B15
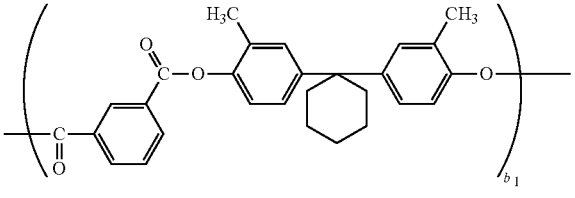
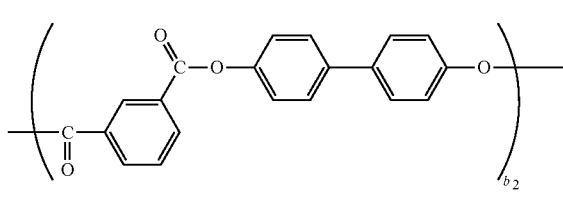
B20
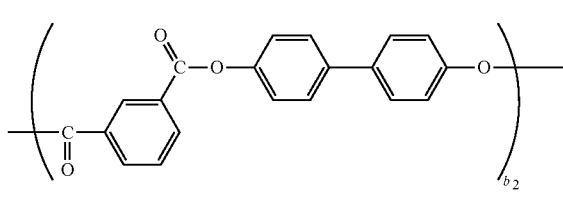

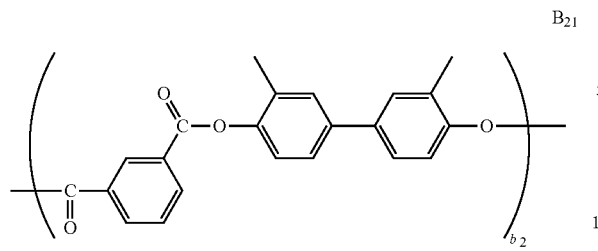
B21
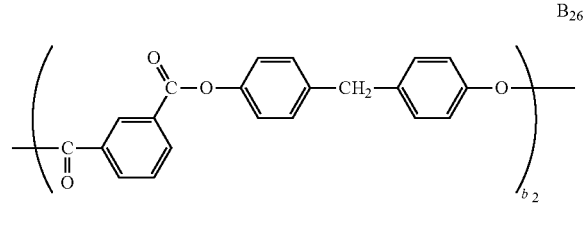
B26
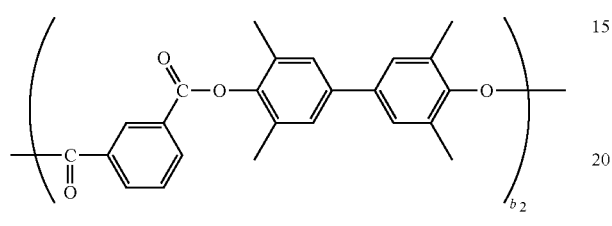
B22
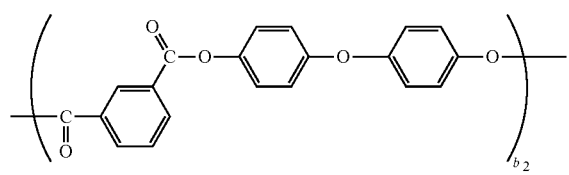
B23
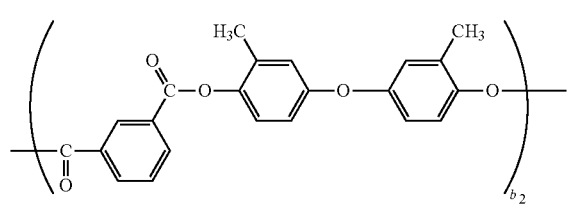
B24
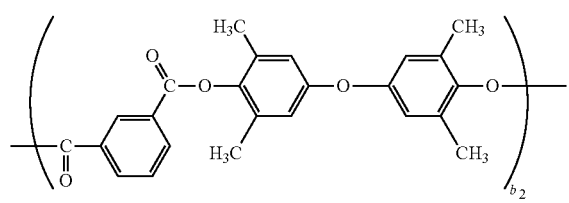
B25
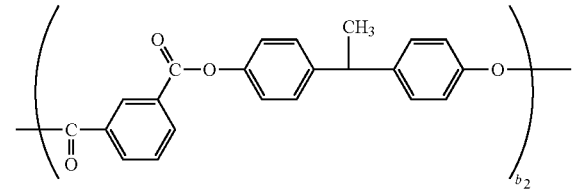
B27
B28
B29
An Example of Structural Formula (C)
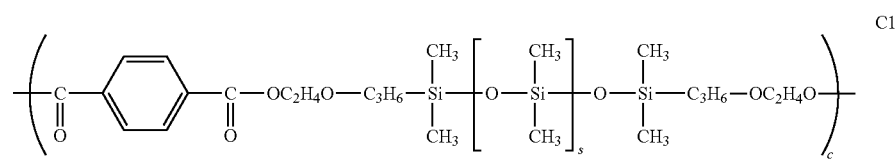
C1

An Example of Structural Formula (D)

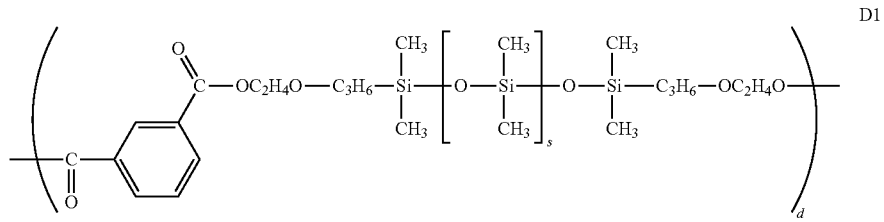

An Example of Structural Formula (E)

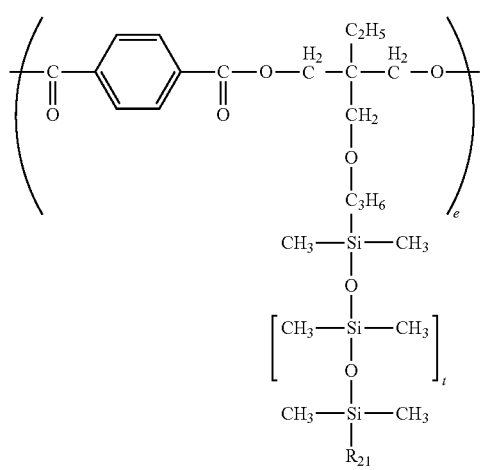

An Example of Structural Formula (F)

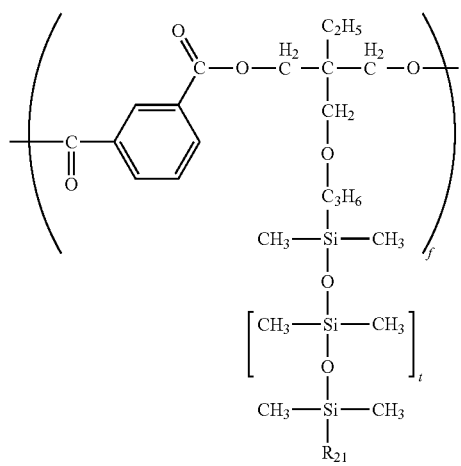

In this formula, $R_{21}$ is an n-butyl group.

TABLE 1

| Structure No. | Type of constituent monomer | | | | | | | |
|---|---|---|---|---|---|---|---|---|
| | A1 | A2 | B1 | B2 | C | D | E | F |
| I-1 | A10 | A20 | B10 | B20 | C1 | D1 | | |
| I-2 | A11 | A21 | B11 | B21 | C1 | D1 | | |
| I-3 | A12 | A22 | B12 | B22 | C1 | D1 | | |
| I-4 | A13 | A23 | B13 | B23 | C1 | D1 | | |
| I-5 | A14 | A24 | B14 | B24 | C1 | D1 | | |
| I-6 | A15 | A25 | B15 | B25 | C1 | D1 | | |
| I-7 | A16 | A26 | B16 | B26 | C1 | D1 | | |
| I-8 | A17 | A27 | B17 | B27 | C1 | D1 | | |
| I-9 | A18 | A28 | B18 | B28 | C1 | D1 | | |
| I-10 | A19 | A29 | B19 | B29 | C1 | D1 | | |
| I-11 | A10 | A20 | B10 | B20 | | | E1 | F1 |
| I-12 | A11 | A21 | B11 | B21 | | | E1 | F1 |
| I-13 | A12 | A22 | B12 | B22 | | | E1 | F1 |
| I-14 | A13 | A23 | B13 | B23 | | | E1 | F1 |
| I-15 | A14 | A24 | B14 | B24 | | | E1 | F1 |
| I-16 | A15 | A25 | B15 | B25 | | | E1 | F1 |
| I-17 | A16 | A26 | B16 | B26 | | | E1 | F1 |
| I-18 | A17 | A27 | B17 | B27 | | | E1 | F1 |
| I-19 | A18 | A28 | B18 | B28 | | | E1 | F1 |
| I-20 | A19 | A29 | B19 | B29 | | | E1 | F1 |
| I-21 | A10 | A20 | B10 | B20 | C1 | D1 | E1 | F1 |
| I-22 | A11 | A21 | B11 | B21 | C1 | D1 | E1 | F1 |
| I-23 | A12 | A22 | B12 | B22 | C1 | D1 | E1 | F1 |
| I-24 | A13 | A23 | B13 | B23 | C1 | D1 | E1 | F1 |
| I-25 | A14 | A24 | B14 | B24 | C1 | D1 | E1 | F1 |
| I-26 | A15 | A25 | B15 | B25 | C1 | D1 | E1 | F1 |
| I-27 | A16 | A26 | B16 | B26 | C1 | D1 | E1 | F1 |
| I-28 | A17 | A27 | B17 | B27 | C1 | D1 | E1 | F1 |
| I-29 | A18 | A28 | B18 | B28 | C1 | D1 | E1 | F1 |
| I-30 | A19 | A29 | B19 | B29 | C1 | D1 | E1 | F1 |

The charge transporting material of the charge transport layer 5 may be, for example, any of various hydrazone compounds, styryl compounds, diamine compounds, butadiene compounds or indole compounds, these being either used alone or used in admixture as suitable combinations. Illustrative examples of such charge transporting materials include, but are not limited to those shown as (II-1) to (II-14) below.

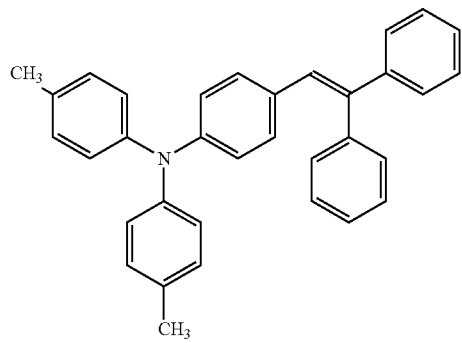 [SMILES: Cc1ccc(N(c2ccc(C)cc2)c2ccc(C=C(c3ccccc3)c3ccccc3)cc2)cc1] II-1
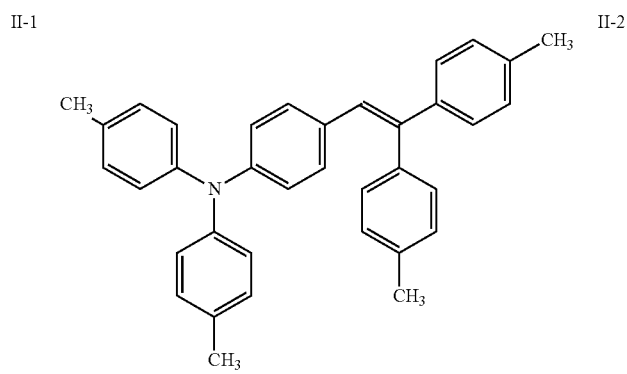 II-2
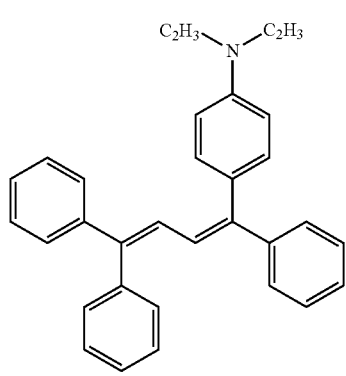 II-3
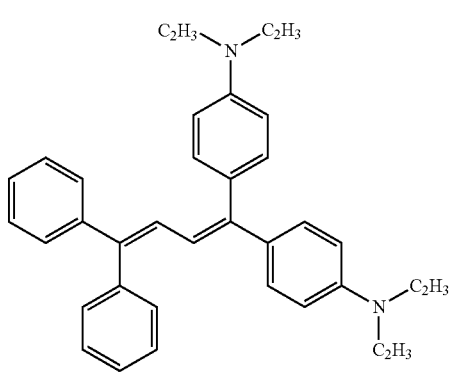 II-4
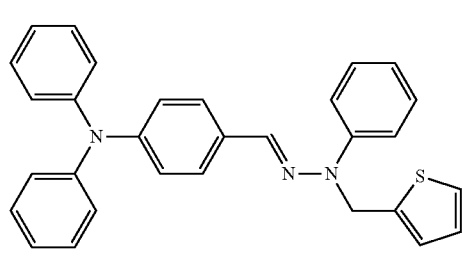 II-5
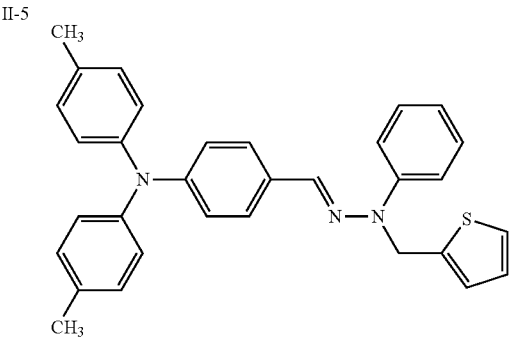 II-6
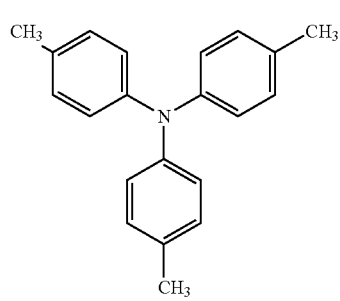 II-7

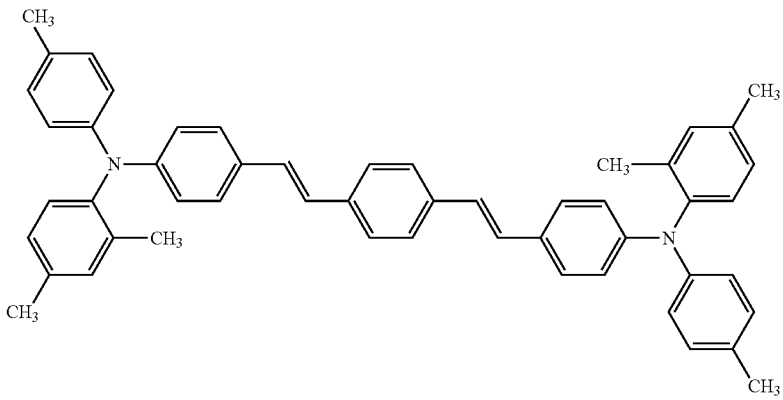
II-8
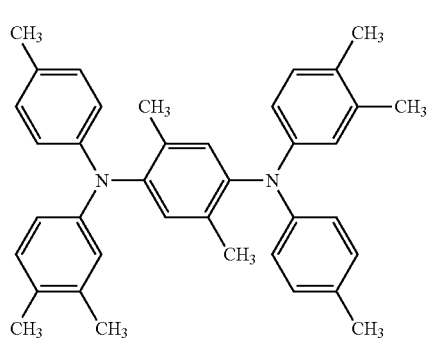
II-9
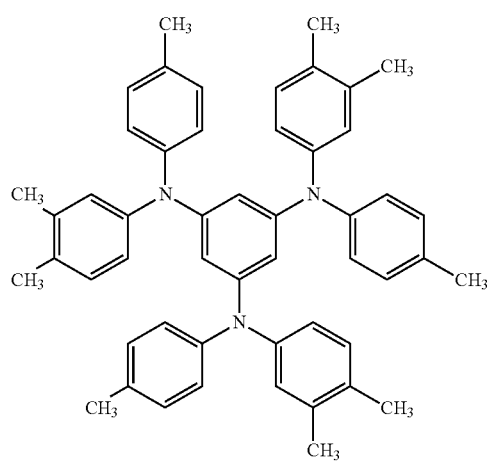
II-10
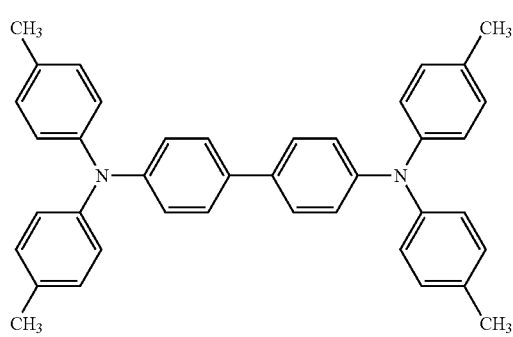
II-11
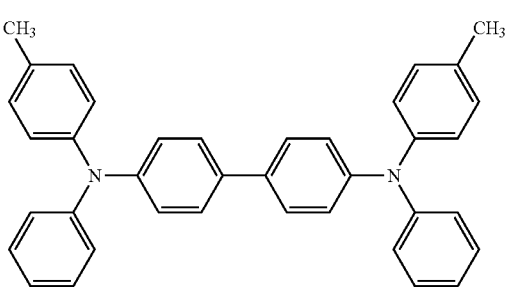
II-12
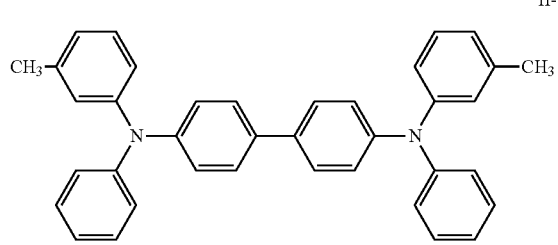
II-13
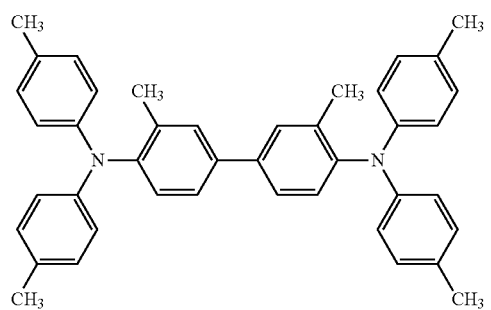
II-14

In addition, to maintain a practically effective surface potential, the film thickness of the charge transport layer 5 is preferably in the range of 3 to 50 μm, and more preferably in the range of 15 to 40 μm.

Single-Layer Photoreceptor

In the invention, a single-layer type photosensitive layer 3 is composed primarily of a charge generating material, a hole transporting substance, an electron transporting substance (acceptor compound) and a resin binder. In the practice of the invention, it is essential to use, as the resin binder of the single-layer type photosensitive layer 3, a copolymeric polyarylate resin having the structural units shown in Chemical Structural Formula 1 above. This copolymeric polyarylate resin may have other structural units as well. Letting the copolymeric polyarylate resin overall be 100 mol %, the structural units represented by above Chemical Structural Formula 1 account for preferably from 10 to 100 mol %, and most preferably from 50 to 100 mol %.

Examples of substances that may be used as the charge generating material include phthalocyanine pigments, azo pigments, anthanthrone pigments, perylene pigments, perinone pigments, polycyclic quinone pigments, squarylium pigments, thiapyrylium pigments and quinacridone pigments. These may be used singly, or two or more may be used in combination. In particular, in the electrophotographic photoreceptor of the invention, disazo pigments and trisazo pigments are preferred as azo pigments, N,N'-bis(3, 5-dimethylphenyl)-3,4:9,10-perylene-bis(carboximide) is preferred as a perylene pigment, and nonmetallic phthalocyanine, copper phthalocyanine and titanyl phthalocyanine are preferred as phthalocyanine pigments. Markedly improved effects in terms of sensitivity, durability and picture quality are exhibited with the use of X-type nonmetallic phthalocyanine, τ-type nonmetallic phthalocyanine, ε-type copper phthalocyanine, α-type titanyl phthalocyanine, β-type titanyl phthalocyanine, Y-type titanyl phthalocyanine, amorphous titanyl phthalocyanine, or the titanyl phthalocyanines mentioned in the specifications of Japanese Patent Application Laid-open No. H8-209023, U.S. Pat. No. 5,736,282 and U.S. Pat. No. 5,874,570 for which, in an X-ray diffraction spectrum using CuKα as the source of radiation, the Bragg angle 2θ has a maximum peak at 9.6°. The content of the charge generating material is preferably from 0.1 to 20 wt %, and more preferably from 0.5 to 10 wt %, based on the solids content of the single-layer type photosensitive layer 3.

Exemplary hole transporting substances include hydrazone compounds, pyrazoline compounds, pyrazolone compounds, oxadiazole compounds, oxazole compounds, arylamine compounds, benzidine compounds, stilbene compounds, styryl compounds, poly-N-vinylcarbazoles and polysilanes. These hole transporting substances may be used singly or two or more may be used in combination. The hole transporting substance used in the invention is preferably one which, aside from having an excellent ability to transport holes generated during light irradiation, is suitable for combination with charge generating materials. The content of the hole transporting substance, based on the solids content of the single-layer type photosensitive layer 3, is preferably from 3 to 80 wt %, and more preferably from 5 to 60 wt %.

Illustrative examples of the electron transporting substance (acceptor compound) include succinic anhydride, maleic anhydride, dibromosuccinic anhydride, phthalic anhydride, 3-nitrophthalic anhydride, 4-nitrophthalic anhydride, pyromellitic anhydride, pyromellitic acid, trimellitic acid, trimellitic anhydride, phthalimide, 4-nitrophthalimide, tetracyanoethylene, tetracyanoquinodimethane, chloranil, bromanil, o-nitrobenzoic acid, malononitrile, trinitrofluorenone, trinitrothioxanthone, dinitrobenzene, dinitroanthracene, dinitroacridine, nitroanthraquinone, dinitroanthraquinone, thiopyran compounds, quinone compounds, benzoquinone compounds, diphenoquinone compounds, napthoquinone compounds, anthraquinone compounds, stilbenequinone compounds and azoquinone compounds. These electron transporting substances may be used singly or two or more may be used in combination. The content of the electron transporting substance, based on the solids content of the single-layer type photosensitive layer 3, is preferably from 1 to 50 wt %, and more preferably from 5 to 40 wt %.

In the practice of this invention, a copolymeric polyarylate resin having structural units of above Chemical Structural Formula 1 must be used as the resin binder in a single-layer type photosensitive layer 3. By doing so, the anticipated effects of the invention can be obtained. This copolymeric polyarylate resin is exemplified by the same resins as mentioned above.

A copolymeric polyarylate resin of above Chemical Structural Formula 1 may be used either alone or in admixture with another resin as the resin binder of the single-layer type photosensitive layer 3. Examples of such other resins that may be used include various polycarbonate resins, such as bisphenol A polycarbonate, bisphenol Z polycarbonate, bisphenol A polycarbonate-biphenyl copolymer and bisphenol Z polycarbonate-biphenyl copolymer, polyphenylene resin, polyester resin, polyvinyl acetal resin, polyvinyl butyral resin, polyvinyl alcohol resin, vinyl chloride resin, vinyl acetate resin, polyethylene resin, polypropylene resin, acrylic resin, polyurethane resin, epoxy resin, melamine resin, silicone resin, polyamide resin, polystyrene resin, polyacetal resin, other polyarylate resins, polysulfone resin, methacrylate polymer, and copolymers thereof. In addition, resins of the same type but having different molecular weights may be used in admixture.

The content of the resin binder, based on the solids content of the single-layer type photosensitive layer 3, is preferably from 10 to 90 wt %, and more preferably from 20 to 80 wt %. Moreover, the content of the copolymeric polyarylate resin in this resin binder is preferably in the range of 1 wt % to 100 wt %, and more preferably in the range of 5 wt % to 80 wt %.

To maintain a practically effective surface potential, the film thickness of the single-layer type photosensitive layer 3 is preferably in the range of 3 to 100 μm, and more preferably in the range of 5 to 40 μm.

Positive-Charging Stacked Photoreceptor

In a positive-charging stacked photoreceptor, the charge transport layer 5 is composed of primarily a charge transporting material and a resin binder. The charge transporting material and the resin binder used may be the same materials as those mentioned in connection with embodiments of the charge transport layer 5 in a negative-charging stacked photoreceptor. The contents of the respective materials and the film thickness of the charge transport layer 5 may be made the same as for the negative-charging stacked photoreceptor. Also, a copolymeric polyarylate resin having structural units of above Chemical Structural Formula 1 may be optionally used as the resin binder.

The charge generating layer 4 provided on the charge transport layer 5 is composed of primarily a charge generating material, a hole transporting substance, an electron transporting substance (acceptor compound) and a resin binder. The charge generating material, hole transporting substance, electron transporting substance and resin binder used may be the same materials as those mentioned in connection with embodiments of the single-layer type photosensitive layer 3 in a single-layer photoreceptor. The contents of the respective materials and the film thickness of the charge generating layer 4 may be made the same as for the single-layer type photosensitive layer 3 in a single-layer photoreceptor. In a positive-charging stacked photoreceptor, it is critical for a copolymeric polyarylate resin having structural units of above Chemical Structural Formula 1 to be used as the resin binder of the charge generating layer 4.

In this invention, an antidegradant such as an antioxidant or a light stabilizer may be included in either a stacked or single-layer type photosensitive layer for the purpose of increasing environmental resistance or stability to harmful light. Examples of compounds that may be used for this purpose include chromanol derivatives such as tocopherol and esterified compounds thereof, polyarylalkane compounds, hydroquinone derivatives, etherified compounds, dietherified compounds, benzophenone derivatives, benzotriazole derivatives, thioether compounds, phenylenediamine derivatives, phosphonic acid esters, phosphorous acid esters, phenol compounds, hindered phenol compounds, straight-chain amine compounds, cyclic amine compounds and hindered amine compounds.

A leveling agent such as a silicone oil or a fluorinated oil may be included in the photosensitive layer in order to improve the leveling properties or the lubricity of the formed film. In addition, metal oxides such as silicon oxide (silica), titanium oxide, zinc oxide, calcium oxide, aluminum oxide (alumina) and zirconium oxide; metal sulfates such as barium sulfate and calcium sulfate; microparticulate metal nitrides such as silicon nitride and aluminum nitride; particles of a fluoroplastic such as tetrafluoroethylene resin, and fluorinated comb-type graft polymer resins may be included so as to, for example, adjust the film hardness, lower the coefficient of friction, and impart lubricity. Other known additives may also be optionally included, insofar as doing so does not detract to any great degree from the electrophotographic characteristics.

Electrophotographic Device

The electrophotographic photoreceptor of the invention is able to achieve the anticipated effects when used in various types of machine processes. Specifically, satisfactory effects can be obtained in charging processes, including contact charging systems which use rollers or brushes and non-contact charging systems which use corotrons or scorotrons, and even in development processes such as contact development and non-contact development systems which use, for example, a nonmagnetic single-component, or a magnetic single-component or two-component approach.

By way of illustration, FIG. 4 shows a schematic view of an electrophotographic device according to the invention. The electrophotographic device 60 of the invention is equipped with an electrophotographic photoreceptor 7 of the invention which includes a conductive substrate 1 and, covering the outside surface thereof, an undercoat layer 2 and a photosensitive layer 300. This electrophotographic device 60 also includes, arranged about the periphery of the photoreceptor 7: a roller charging member 21, a high-voltage power source 22 that supplies the voltage applied to this roller charging member 21, an image exposing member 23, a developing unit 24 equipped with a developing roller 241, a paper feeding member 25 equipped with a paper feeding roller 251 and a paper feeding guide 252, a transfer charging unit (direct charging type) 26, a cleaning device 27 equipped with a cleaning blade 271, and a charge neutralizing member 28. The electrophotographic device 60 of the invention may be a color printer.

EXAMPLES

Specific embodiments of the invention are illustrated more fully below by way of examples, although the invention is not limited by the following examples insofar as they do not depart from the scope and spirit of the invention.

Preparation of Copolymeric Polyarylate Resin

Preparation Example 1

Method of Preparing Copolymeric Polyarylate Resin (III-1)

Solution (i) was prepared by charging a 2-liter, 4-neck, flat-bottomed flask with 540 mL of ion-exchanged water, 12.4 g of NaOH, 0.574 g of p-tert-butylphenol, 24.278 g of bis(4-hydroxy-3-methylphenyl)methane (abbreviated below as "BPCF"), 4.95 g of biphenol (BP) and 0.272 g of tetrabutylammonium bromide. Next, Solution (ii) was prepared by dissolving 0.00133 g of the compound of Molecular Formula (2)-1 (Silaplane FM-4411, from Chisso Corporation) in 20 g of anhydrous methylene chloride, and Solution (iii) was prepared by dissolving 12.240 g of terephthaloyl chloride, 14.960 g of isophthaloyl chloride and 0.75 mL of triethylamine in 120 g of anhydrous methylene chloride. First, Solution (ii) was added dropwise to Solution (iii) over a period of 1 hour so as to prepare Solution (iv), which was then poured into Solution (i) over a period of 2 minutes, following which reaction was carried out under stirring for 1.5 hours. After reaction completion, the reaction mixture was neutralized with 4.74 mL of acetic acid then diluted by the further addition of 360 mL of methylene chloride. The aqueous phase was separated off and subsequently re-precipitated with a 4-fold volume of methanol. After 2 hours of drying at 60° C., the resulting crude product was rendered into a 5% solution with methylene chloride, following which this solution was added to 3 L of ion-exchanged water and the resin was re-precipitated and thereby washed. This washing was carried out until the conductivity of the wash water fell to 5 µS/m or below. The resin was removed, dissolved once again to 5 wt % in methylene chloride, then added dropwise to a 5-fold amount of acetone under stirring, and thereby re-precipitated. The precipitate was collected by filtration and dried for 2 hours at 60° C., thereby giving 42.24 g of the target polymer. FIG. 2 shows the $H^1$-NMR of this copolymeric polyarylate resin (III-1) in THF-$d_8$ solvent. The starting material charging amounts and copolymerization ratios for this copolymeric polyarylate resin (III-1) are shown below and in Tables 2 and 3.

(III-1)  $a_1:a_2:b_1:b_2:c:d=35.9996:43.9996:8.9999:10.999:0.00045:0.00055$. The polystyrene-equivalent weight-average molecular weight of this resin (III-1), as measured by gel permeation chromatography (GPC), was 145,000.

Preparation Example 2

Method of Preparing Copolymeric Polyarylate Resin (III-2)

Aside from using 24.278 g of BPCF, 4.95 g of BP, 0.00133 g of the compound of Molecular Formula (2)-1, 8.160 g of terephthaloyl chloride and 19.040 g of isophthaloyl chloride, synthesis was carried out in the same way as in Synthesis Example 1. The starting material charging amounts and copolymerization ratios for the resulting copolymeric polyarylate resin (III-2) are shown in Tables 2 and 3.

Preparation Example 3

Method of Preparing Copolymeric Polyarylate Resin (III-3)

Aside from using 24.278 g of BPCF, 4.95 g of BP, 0.00133 g of the compound of Molecular Formula (2)-1, 16.320 g of terephthaloyl chloride and 10.880 g of isophthaloyl chloride, synthesis was carried out in the same way as in Synthesis Example 1. The starting material charging amounts and copolymerization ratios for the resulting copolymeric polyarylate resin (III-3) are shown in Tables 2 and 3.

Preparation Example 4

Method of Preparing Copolymeric Polyarylate Resin (III-4)

Aside from using 24.230 g of BPCF, 4.940 g of BP, 0.133 g of the compound of Molecular Formula (2)-1, 12.24 g of terephthaloyl chloride and 14.96 g of isophthaloyl chloride, synthesis was carried out in the same way as in Synthesis Example 1. The starting material charging amounts and copolymerization ratios for the resulting copolymeric polyarylate resin (III-4) are shown in Tables 2 and 3.

Preparation Example 5

Method of Preparing Copolymeric Polyarylate Resin (III-5)

Aside from using 24.230 g of BPCF, 4.940 g of BP, 0.133 g of the compound of Molecular Formula (2)-1, 8.160 g of terephthaloyl chloride and 19.040 g of isophthaloyl chloride, synthesis was carried out in the same way as in Synthesis Example 1. The starting material charging amounts and copolymerization ratios for the resulting copolymeric polyarylate resin (III-5) are shown in Tables 2 and 3.

Preparation Example 6

Method of Preparing Copolymeric Polyarylate Resin (III-6)

Aside from using 24.230 g of BPCF, 4.940 g of BP, 0.133 g of the compound of Molecular Formula (2)-1, 16.320 g of terephthaloyl chloride and 10.880 g of isophthaloyl chloride, synthesis was carried out in the same way as in Synthesis Example 1. The starting material charging amounts and copolymerization ratios for the resulting copolymeric polyarylate resin (III-6) are shown in Tables 2 and 3.

Preparation Example 7

Method of Preparing Copolymeric Polyarylate Resin (III-7)

Aside from using 21.912 g of BPCF, 4.47 g of BP, 6.647 g of the compound of Molecular Formula (2)-1, 12.24 g of terephthaloyl chloride and 14.96 g of isophthaloyl chloride, synthesis was carried out in the same way as in Synthesis Example 1. The starting material charging amounts and copolymerization ratios for the resulting copolymeric polyarylate resin (III-7) are shown in Tables 2 and 3.

Preparation Example 8

Method of Preparing Copolymeric Polyarylate Resin (III-8)

Aside from using 21.912 g of BPCF, 4.47 g of BP, 6.647 g of the compound of Molecular Formula (2)-1, 8.160 g of terephthaloyl chloride and 19.040 g of isophthaloyl chloride, synthesis was carried out in the same way as in Synthesis Example 1. The starting material charging amounts and copolymerization ratios for the resulting copolymeric polyarylate resin (III-8) are shown in Tables 2 and 3.

Preparation Example 9

Method of Preparing Copolymeric Polyarylate Resin (III-9)

Aside from using 21.912 g of BPCF, 4.47 g of BP, 6.647 g of the compound of Molecular Formula (2)-1, 16.320 g of terephthaloyl chloride and 10.880 g of isophthaloyl chloride, synthesis was carried out in the same way as in Synthesis Example 1. The starting material charging amounts and copolymerization ratios for the resulting copolymeric polyarylate resin (III-9) are shown in Tables 2 and 3.

Preparation Example 10

Method of Preparing Copolymeric Polyarylate Resin (III-10)

Aside from using 24.266 g of BPCF and 4.95 g of BP, using the compound of Molecular Formula (2)-2 (Silaplane FMDA26, from Chisso Corporation) instead of the compound of Molecular Formula (2)-1 and setting the amount of the compound of Molecular Formula (2)-2 to 0.666 g, synthesis was carried out in the same way as in Synthesis Example 1. The starting material charging amounts and copolymerization ratios for the resulting copolymeric polyarylate resin (III-10) are shown in Tables 2 and 3.

Preparation Example 11

Method of Preparing Copolymeric Polyarylate Resin (III-11)

Aside from using 24.288 g of BPCF and 4.95 g of BP, using the compound of Molecular Formula (2)-3 (Silaplane FMDA26, from Chisso Corporation) instead of the compound of Molecular Formula (2)-1 and setting the amount of the compound of Molecular Formula (2)-3 to 0.133 g, synthesis was carried out in the same way as in Synthesis Example 1. The starting material charging amounts and copolymerization ratios for the resulting copolymeric polyarylate resin (III-11) are shown in Tables 2 and 3.

Preparation Example 12

Method of Preparing Copolymeric Polyarylate Resin (III-12)

Aside from setting the amount of the compound of Molecular Formula (3)-1 in Synthesis Example 1 to 0.00133 g, synthesis was carried out in the same way as in Synthesis Example 1. The starting material charging amounts and copolymerization ratios for the resulting copolymeric polyarylate resin (III-12) are shown in Tables 2 and 3.

Preparation Example 13

Method of Preparing Copolymeric Polyarylate Resin (III-13)

Aside from setting the amount of the compound of Molecular Formula (3)-1 in Synthesis Example 2 to 0.00133 g, synthesis was carried out in the same way as in Synthesis Example 2. The starting material charging amounts and copolymerization ratios for the resulting copolymeric polyarylate resin (III-13) are shown in Tables 2 and 3.

Preparation Example 14

Method of Preparing Copolymeric Polyarylate Resin (III-14)

Aside from setting the amount of the compound of Molecular Formula (3)-1 in Synthesis Example 3 to 0.00133 g, synthesis was carried out in the same way as in Synthesis Example 3. The starting material charging amounts and copolymerization ratios for the resulting copolymeric polyarylate resin (III-14) are shown in Tables 2 and 3.

Preparation Example 15

Method of Preparing Copolymeric Polyarylate Resin (III-15)

Aside from setting the amount of the compound of Molecular Formula (3)-1 in Synthesis Example 4 to 0.133 g, synthesis was carried out in the same way as in Synthesis Example 3. The starting material charging amounts and copolymerization ratios for the resulting copolymeric polyarylate resin (III-15) are shown in Tables 2 and 3.

Preparation Example 16

Method of Preparing Copolymeric Polyarylate Resin (III-16)

Aside from setting the amount of the compound of Molecular Formula (3)-1 in Synthesis Example 5 to 0.133 g, synthesis was carried out in the same way as in Synthesis Example 3. The starting material charging amounts and copolymerization ratios for the resulting copolymeric polyarylate resin (III-16) are shown in Tables 2 and 3.

Preparation Example 17

Method of Preparing Copolymeric Polyarylate Resin (III-17)

Aside from setting the amount of the compound of Molecular Formula (3)-1 in Synthesis Example 6 to 0.133 g, synthesis was carried out in the same way as in Synthesis Example 3. The starting material charging amounts and copolymerization ratios for the resulting copolymeric polyarylate resin (III-17) are shown in Tables 2 and 3.

Preparation Example 18

Method of Preparing Copolymeric Polyarylate Resin (III-18)

Aside from setting the amount of the compound of Molecular Formula (3)-1 in Synthesis Example 7 to 6.647 g, synthesis was carried out in the same way as in Synthesis Example 7. The starting material charging amounts and copolymerization ratios for the resulting copolymeric polyarylate resin (III-18) are shown in Tables 2 and 3.

Preparation Example 19

Method of Preparing Copolymeric Polyarylate Resin (III-19)

Aside from setting the amount of the compound of Molecular Formula (3)-1 in Synthesis Example 8 to 6.647 g, synthesis was carried out in the same way as in Synthesis Example 8. The starting material charging amounts and copolymerization ratios for the resulting copolymeric polyarylate resin (III-19) are shown in Tables 2 and 3.

Preparation Example 20

Method of Preparing Copolymeric Polyarylate Resin (III-20)

Aside from setting the amount of the compound of Molecular Formula (3)-1 in Synthesis Example 9 to 6.647 g, synthesis was carried out in the same way as in Synthesis Example 9. The starting material charging amounts and copolymerization ratios for the resulting copolymeric polyarylate resin (III-20) are shown in Tables 2 and 3.

Preparation Example 21

Method of Preparing Copolymeric Polyarylate Resin (III-21)

Aside from using the compound of Molecular Formula (3)-2 instead of the compound of Molecular Formula (2)-1 in Synthesis Example 1 and setting the amount of the compound of Molecular Formula (3)-2 to 0.666 g, synthesis was carried out in the same way as in Synthesis Example 10. The starting material charging amounts and copolymerization ratios for the resulting copolymeric polyarylate resin (III-21) are shown in Tables 2 and 3.

Preparation Example 22

Method of Preparing Copolymeric Polyarylate Resin (III-22)

Aside from setting the amount of the compound of Molecular Formula (3)-3 in Synthesis Example 11 to 0.2000 g, synthesis was carried out in the same way as in Synthesis Example 10. The starting material charging amounts and copolymerization ratios for the resulting copolymeric polyarylate resin (III-22) are shown in Tables 2 and 3.

Preparation Example 23

Method of Preparing Copolymeric Polyarylate Resin (III-23)

Aside from using both the compound of Molecular Formula (2)-1 and the compound of Molecular Formula (3)-1 instead of only the compound of Molecular Formula (2)-1 in Synthesis Example 1, and setting the amount of the compound of Molecular Formula (2)-1 to 0.00133 g and the amount of the compound of Molecular Formula (3)-1 to 0.00133 g, synthesis was carried out in the same way as in Synthesis Example 1. The starting material charging amounts and copolymerization ratios for the resulting copolymeric polyarylate resin (III-23) are shown in Tables 2 and 3.

Preparation Example 24

Method of Preparing Copolymeric Polyarylate Resin (III-24)

Aside from setting the amount of the compound of Molecular Formula (2)-1 in Synthesis Example 23 to 7.016 g and the amount of the compound of Molecular Formula (3)-1 to 7.016 g, synthesis was carried out in the same way as in Synthesis Example 23. The starting material charging amounts and copolymerization ratios for the resulting copolymeric polyarylate resin (III-24) are shown in Tables 2 and 3.

Preparation Example 25

Method of Preparing Copolymeric Polyarylate Resin (III-25)

Aside from setting the amount of the compound of Molecular Formula (2)-1 in Synthesis Example 23 to 0.2000 g and the amount of the compound of Molecular Formula (3)-1 to 6.997 g, synthesis was carried out in the same way as in Synthesis Example 23. The starting material charging amounts and copolymerization ratios for the resulting copolymeric polyarylate resin (III-25) are shown in Tables 2 and 3.

Preparation Example 26

Method of Preparing Copolymeric Polyarylate Resin (III-26)

Aside from setting the amount of the compound of Molecular Formula (2)-1 in Synthesis Example 23 to 6.997 g and the amount of the compound of Molecular Formula (3)-1 to 0.133 g, synthesis was carried out in the same way as in Synthesis Example 23. The starting material charging amounts and copolymerization ratios for the resulting copolymeric polyarylate resin (III-26) are shown in Tables 2 and 3.

Preparation Example 27

Method of Preparing Copolymeric Polyarylate Resin (III-27)

Aside from setting the amount of BPCF to 27.313 g and the amount of BP to 2.48 g, synthesis was carried out in the same way as in Synthesis Example 1. The starting material charging amounts and copolymerization ratios for the resulting copolymeric polyarylate resin (III-27) are shown in Tables 4 and 5.

Preparation Example 28

Method of Preparing Copolymeric Polyarylate Resin (III-28)

Aside from setting the amount of the compound of Molecular Formula (2)-1 in Synthesis Example 27 to 0.133 g, synthesis was carried out in the same way as in Synthesis Example 27. The starting material charging amounts and copolymerization ratios for the resulting copolymeric polyarylate resin (III-28) are shown in Tables 4 and 5.

Preparation Example 29

Method of Preparing Copolymeric Polyarylate Resin (III-29)

Aside from setting the amount of the compound of Molecular Formula (3)-1 in Synthesis Example 27 to 0.00133 g, synthesis was carried out in the same way as in Synthesis Example 27. The starting material charging amounts and copolymerization ratios for the resulting copolymeric polyarylate resin (III-29) are shown in Tables 4 and 5.

Preparation Example 30

Method of Preparing Copolymeric Polyarylate Resin (III-30)

Aside from setting the amount of the compound of Molecular Formula (3)-1 in Synthesis Example 27 to 0.133 g, synthesis was carried out in the same way as in Synthesis Example 27. The starting material charging amounts and copolymerization ratios for the resulting copolymeric polyarylate resin (III-30) are shown in Tables 4 and 5.

Preparation Example 31

Method of Preparing Copolymeric Polyarylate Resin (III-31)

Aside from setting the amount of BPCF to 21.243 g and the amount of BP to 7.43 g, synthesis was carried out in the same way as in Synthesis Example 27. The starting material charging amounts and copolymerization ratios for the resulting copolymeric polyarylate resin (III-31) are shown in Tables 4 and 5.

Preparation Example 32

Method of Preparing Copolymeric Polyarylate Resin (III-32)

Aside from setting the amount of the compound of Molecular Formula (2)-1 in Synthesis Example 31 to 0.133 g, synthesis was carried out in the same way as in Synthesis Example 31. The starting material charging amounts and copolymerization ratios for the resulting copolymeric polyarylate resin (III-32) are shown in Tables 4 and 5.

Preparation Example 33

Method of Preparing Copolymeric Polyarylate Resin (III-33)

Aside from setting the amount of the compound of Molecular Formula (3)-1 in Synthesis Example 31 to 0.00133 g, synthesis was carried out in the same way as in Synthesis Example 31. The starting material charging amounts and copolymerization ratios for the resulting copolymeric polyarylate resin (III-33) are shown in Tables 4 and 5.

Preparation Example 34

Method of Preparing Copolymeric Polyarylate Resin (III-34)

Aside from setting the amount of the compound of Molecular Formula (3)-1 in Synthesis Example 31 to 0.133 g, synthesis was carried out in the same way as in Synthesis Example 31. The starting material charging amounts and copolymerization ratios for the resulting copolymeric polyarylate resin (III-34) are shown in Tables 4 and 5.

Preparation Example 35

Method of Preparing Copolymeric Polyarylate Resin (III-35)

Aside from setting the amount of BPCF to 18.209 g and the amount of BP to 9.90 g, synthesis was carried out in the same way as in Synthesis Example 27. The starting material charging amounts and copolymerization ratios for the resulting copolymeric polyarylate resin (III-35) are shown in Tables 4 and 5.

Preparation Example 36

Method of Preparing Copolymeric Polyarylate Resin (III-36)

Aside from setting the amount of the compound of Molecular Formula (2)-1 in Synthesis Example 35 to 0.133 g, synthesis was carried out in the same way as in Synthesis Example 35. The starting material charging amounts and copolymerization ratios for the resulting copolymeric polyarylate resin (III-36) are shown in Tables 4 and 5.

Preparation Example 37

Method of Preparing Copolymeric Polyarylate Resin (III-37)

Aside from setting the amount of the compound of Molecular Formula (3)-1 in Synthesis Example 35 to 0.00133 g, synthesis was carried out in the same way as in Synthesis Example 35. The starting material charging amounts and copolymerization ratios for the resulting copolymeric polyarylate resin (III-37) are shown in Tables 4 and 5.

Preparation Example 38

Method of Preparing Copolymeric Polyarylate Resin (III-38)

Aside from setting the amount of the compound of Molecular Formula (3)-1 in Synthesis Example 35 to 0.133 g, synthesis was carried out in the same way as in Synthesis Example 35. The starting material charging amounts and copolymerization ratios for the resulting copolymeric polyarylate resin (III-38) are shown in Tables 4 and 5.

Preparation Example 39

Method of Preparing Copolymeric Polyarylate Resin (III-39)

Aside from setting the amount of BPCF to 27.313 g and replacing the BP with 2.69 g of 4,4'-dihydroxydiphenyl ether (BP-E), synthesis was carried out in the same way as in Synthesis Example 27. The starting material charging amounts and copolymerization ratios for the resulting copolymeric polyarylate resin (III-39) are shown in Tables 6 and 7.

Preparation Example 40

Method of Preparing Copolymeric Polyarylate Resin (III-40)

Aside from setting the amount of the compound of Molecular Formula (2)-1 in Synthesis Example 39 to 0.133 g, synthesis was carried out in the same way as in Synthesis Example 39. The starting material charging amounts and copolymerization ratios for the resulting copolymeric polyarylate resin (III-40) are shown in Tables 6 and 7.

Preparation Example 41

Method of Preparing Copolymeric Polyarylate Resin (III-41)

Aside from setting the amount of BPCF to 24.278 g and the amount of BP-E to 5.38 g, synthesis was carried out in the same way as in Synthesis Example 39. The starting material charging amounts and copolymerization ratios for the resulting copolymeric polyarylate resin (III-41) are shown in Tables 6 and 7.

Preparation Example 42

Method of Preparing Copolymeric Polyarylate Resin (III-42)

Aside from setting the amount of the compound of Molecular Formula (2)-1 in Synthesis Example 41 to 0.133 g, synthesis was carried out in the same way as in Synthesis Example 41. The starting material charging amounts and copolymerization ratios for the resulting copolymeric polyarylate resin (III-42) are shown in Tables 6 and 7.

Preparation Example 43

Method of Preparing Copolymeric Polyarylate Resin (III-43)

Aside from setting the amount of BPCF to 21.243 g and the amount of BP-E to 8.06 g, synthesis was carried out in the same way as in Synthesis Example 39. The starting material charging amounts and copolymerization ratios for the resulting copolymeric polyarylate resin (III-43) are shown in Tables 6 and 7.

Preparation Example 44

Method of Preparing Copolymeric Polyarylate Resin (III-44)

Aside from setting the amount of the compound of Molecular Formula (2)-1 in Synthesis Example 43 to 0.133 g, synthesis was carried out in the same way as in Synthesis Example 43. The starting material charging amounts and copolymerization ratios for the resulting copolymeric polyarylate resin (III-44) are shown in Tables 6 and 7.

Preparation Example 45

Method of Preparing Copolymeric Polyarylate Resin (III-45)

Aside from setting the amount of BPCF to 27.31 g and replacing the BP with 2.66 g of 4,4'-dihydroxydiphenylmethane (BPF), synthesis was carried out in the same way as in Synthesis Example 27. The starting material charging amounts and copolymerization ratios for the resulting copolymeric polyarylate resin (III-45) are shown in Tables 6 and 7.

Preparation Example 46

Method of Preparing Copolymeric Polyarylate Resin (III-46)

Aside from setting the amount of the compound of Molecular Formula (2)-1 in Synthesis Example 45 to 0.133 g, synthesis was carried out in the same way as in Synthesis Example 45. The starting material charging amounts and copolymerization ratios for the resulting copolymeric polyarylate resin (III-46) are shown in Tables 6 and 7.

Preparation Example 47

Method of Preparing Copolymeric Polyarylate Resin (III-47)

Aside from setting the amount of BPCF to 24.278 g and the amount of BP-F to 5.32 g, synthesis was carried out in the same way as in Synthesis Example 45. The starting material charging amounts and copolymerization ratios for the resulting copolymeric polyarylate resin (III-47) are shown in Tables 6 and 7.

Preparation Example 48

Method of Preparing Copolymeric Polyarylate Resin (III-48)

Aside from setting the amount of the compound of Molecular Formula (2)-1 in Synthesis Example 47 to 0.133 g, synthesis was carried out in the same way as in Synthesis Example 47. The starting material charging amounts and copolymerization ratios for the resulting copolymeric polyarylate resin (III-48) are shown in Tables 6 and 7.

Preparation Example 49

Method of Preparing Copolymeric Polyarylate Resin (III-49)

Aside from setting the amount of BPCF to 21.243 g and the amount of BP-F to 7.99 g, synthesis was carried out in the same way as in Synthesis Example 45. The starting material charging amounts and copolymerization ratios for the resulting copolymeric polyarylate resin (III-49) are shown in Tables 6 and 7.

Preparation Example 50

Method of Preparing Copolymeric Polyarylate Resin (III-50)

Aside from setting the amount of the compound of Molecular Formula (2)-1 in Synthesis Example 49 to 0.133 g, synthesis was carried out in the same way as in Synthesis Example 49. The starting material charging amounts and copolymerization ratios for the resulting copolymeric polyarylate resin (III-50) are shown in Tables 6 and 7.

Preparation Example 51

Method of Preparing Copolymeric Polyarylate Resin (III-51)

Aside from replacing the BPCF with 27.261 g of 2,2-bis(4-hydroxy-3-methylphenyl)propane (BPC) and setting the amount of BP to 4.95 g, synthesis was carried out in the same way as in Synthesis Example 27. The starting material charging amounts and copolymerization ratios for the resulting copolymeric polyarylate resin (III-51) are shown in Tables 6 and 7.

Preparation Example 52

Method of Preparing Copolymeric Polyarylate Resin (III-52)

Aside from replacing the BP with 5.38 g of BP-E, synthesis was carried out in the same way as in Synthesis Example 51. The starting material charging amounts and copolymerization ratios for the resulting copolymeric polyarylate resin (III-52) are shown in Tables 6 and 7.

Preparation Example 53

Method of Preparing Copolymeric Polyarylate Resin (III-53)

Aside from replacing the BP with 5.32 g of BPF, synthesis was carried out in the same way as in Synthesis Example 51. The starting material charging amounts and copolymerization ratios for the resulting copolymeric polyarylate resin (III-53) are shown in Tables 6 and 7.

Preparation Example 54

Method of Preparing Copolymeric Polyarylate Resin (III-54)

Aside from replacing the BPCF with 28.544 g of 1,1-bis(4-hydroxyphenyl)cyclohexane (BPZ) and setting the amount of BP to 4.95 g, synthesis was carried out in the same way as in Synthesis Example 27. The starting material charging amounts and copolymerization ratios for the resulting copolymeric polyarylate resin (III-54) are shown in Tables 6 and 7.

Preparation Example 55

Method of Preparing Copolymeric Polyarylate Resin (III-55)

Aside from replacing the BP with 5.38 g of BP-E, synthesis was carried out in the same way as in Synthesis Example 54. The starting material charging amounts and copolymerization ratios for the resulting copolymeric polyarylate resin (III-55) are shown in Tables 6 and 7.

Preparation Example 56

Method of Preparing Copolymeric Polyarylate Resin (III-56)

Aside from replacing the BP with 5.32 g of BPF, synthesis was carried out in the same way as in Synthesis Example 54. The starting material charging amounts and copolymerization ratios for the resulting copolymeric polyarylate resin (III-56) are shown in Tables 6 and 7.

Preparation Example 57

Method of Preparing Copolymeric Polyarylate Resin (III-57)

Aside from replacing the BPCF with 31.522 g of 1,1-bis(4-hydroxy-3-methylphenyl)cyclohexane (BPCZ) and setting the amount of BP to 4.95 g, synthesis was carried out in the same way as in Synthesis Example 27. The starting material charging amounts and copolymerization ratios for the resulting copolymeric polyarylate resin (III-57) are shown in Tables 8 and 9.

Preparation Example 58

Method of Preparing Copolymeric Polyarylate Resin (III-58)

Aside from replacing the BP with 5.38 g of BP-E, synthesis was carried out in the same way as in Synthesis Example 57. The starting material charging amounts and copolymerization ratios for the resulting copolymeric polyarylate resin (III-58) are shown in Tables 8 and 9.

Preparation Example 59

Method of Preparing Copolymeric Polyarylate Resin (III-59)

Aside from replacing the BP with 5.32 g of BPF, synthesis was carried out in the same way as in Synthesis Example 57. The starting material charging amounts and copolymerization ratios for the resulting copolymeric polyarylate resin (III-59) are shown in Tables 8 and 9.

Preparation Example 60

Method of Preparing Copolymeric Polyarylate Resin (III-60)

Aside from replacing the BPCF with 25.770 g of 1,1-bis(4-hydroxy-3-methylphenyl)ethane (BIOC-E) and setting the amount of BP to 4.95 g, synthesis was carried out in the same way as in Synthesis Example 27. The starting material charging amounts and copolymerization ratios for the resulting copolymeric polyarylate resin (III-60) are shown in Tables 8 and 9.

Preparation Example 61

Method of Preparing Copolymeric Polyarylate Resin (III-61)

Aside from replacing the BP with 5.38 g of BP-E, synthesis was carried out in the same way as in Synthesis Example 60. The starting material charging amounts and copolymerization ratios for the resulting copolymeric polyarylate resin (III-61) are shown in Tables 8 and 9.

Preparation Example 62

Method of Preparing Copolymeric Polyarylate Resin (III-62)

Aside from replacing the BP with 5.32 g of BPF, synthesis was carried out in the same way as in Synthesis Example 60. The starting material charging amounts and copolymerization ratios for the resulting copolymeric polyarylate resin (III-62) are shown in Tables 8 and 9.

Preparation Example 63

Method of Preparing Copolymeric Polyarylate Resin (III-63)

Aside from replacing the BPCF with 27.261 g of bis(4-hydroxy-3,5-dimethylphenyl)methane (BPCCF) and setting the amount of BP to 4.95 g, synthesis was carried out in the same way as in Synthesis Example 27. The starting material charging amounts and copolymerization ratios for the resulting copolymeric polyarylate resin (III-63) are shown in Tables 8 and 9.

Preparation Example 64

Method of Preparing Copolymeric Polyarylate Resin (III-64)

Aside from replacing the BP with 5.38 g of BP-E, synthesis was carried out in the same way as in Synthesis Example 63. The starting material charging amounts and copolymerization ratios for the resulting copolymeric polyarylate resin (III-64) are shown in Tables 8 and 9.

Preparation Example 65

Method of Preparing Copolymeric Polyarylate Resin (III-65)

Aside from replacing the BP with 5.32 g of BPF, synthesis was carried out in the same way as in Synthesis Example 63. The starting material charging amounts and copolymerization ratios for the resulting copolymeric polyarylate resin (III-65) are shown in Tables 8 and 9.

Preparation Example 66

Method of Preparing Copolymeric Polyarylate Resin (III-66)

Aside from setting the amount of BPCF to 19.231 g, the amount of BP-E to 4.26 g and the amount of the compound of Molecular Formula (2)-1 to 14.623 g, synthesis was carried out in the same way as in Synthesis Example 1. The starting material charging amounts and copolymerization ratios for the resulting copolymeric polyarylate resin (III-66) are shown in Tables 10 and 11.

Preparation Example 67

Method of Preparing Copolymeric Polyarylate Resin (III-67)

Aside from setting the amount of BPCF to 19.231 g, the amount of BPF to 4.22 g and the amount of the compound of Molecular Formula (2)-2 to 73.116 g, synthesis was carried out in the same way as in Synthesis Example 1. The starting material charging amounts and copolymerization ratios for the resulting copolymeric polyarylate resin (III-67) are shown in Tables 10 and 11.

Preparation Example 68

Method of Preparing Copolymeric Polyarylate Resin (III-68)

Aside from setting the amount of BPCF to 19.231 g, the amount of BP to 4.22 g and the amount of the compound of Molecular Formula (2)-3 to 146.232 g, synthesis was carried out in the same way as in Synthesis Example 1. The starting material charging amounts and copolymerization ratios for the resulting copolymeric polyarylate resin (III-68) are shown in Tables 10 and 11.

Preparation Example 69

Method of Preparing Copolymeric Polyarylate Resin (III-69)

Aside from setting the amount of BPCF to 27.262 g, the amount of BP-E to 5.38 g, the amount of terephthaloyl chloride to 17.720 g, the amount of isophthaloyl chloride to 9.54 g and not adding the compound of Molecular Formula (2)-1, synthesis was carried out in the same way as in Synthesis Example 1. The starting material charging amounts and copolymerization ratios for the resulting copolymeric polyarylate resin (III-68) are shown in Tables 10 and 11.

Preparation Example 70

Method of Preparing Copolymeric Polyarylate Resin (III-70)

Aside from setting the amount of BPCF to 27.262 g, the amount of BPF to 5.32 g and not adding the compound of Molecular Formula (2)-1, synthesis was carried out in the same way as in Synthesis Example 69. The starting material charging amounts and copolymerization ratios for the resulting copolymeric polyarylate resin (III-70) are shown in Tables 10 and 11.

Preparation Example 71

Method of Preparing Copolymeric Polyarylate Resin (III-71)

Aside from setting the amount of BPCF to 27.262 g, the amount of BP to 4.95 g and not adding the compound of Molecular Formula (2)-1, synthesis was carried out in the same way as in Synthesis Example 69. The starting material charging amounts and copolymerization ratios for the resulting copolymeric polyarylate resin (III-71) are shown in Tables 10 and 11.

Preparation Example 72

Method of Preparing Copolymeric Polyarylate Resin (III-72)

Aside from setting the amount of BPZ to 28.544 g, the amount of BP-E to 5.38 g, the amount of terephthaloyl chloride to 9.54 g, the amount of isophthaloyl chloride to 17.720 g and not adding the compound of Molecular Formula (2)-1, synthesis was carried out in the same way as in Synthesis Example 1. The starting material charging amounts and copolymerization ratios for the resulting copolymeric polyarylate resin (III-72) are shown in Tables 10 and 11.

Preparation Example 73

Method of Preparing Copolymeric Polyarylate Resin (III-73)

Aside from setting the amount of BPC to 28.544 g, the amount of BPF to 5.32 g and not adding the compound of Molecular Formula (2)-1, synthesis was carried out in the same way as in Synthesis Example 72. The starting material charging amounts and copolymerization ratios for the resulting copolymeric polyarylate resin (III-73) are shown in Tables 10 and 11.

Preparation Example 74

Method of Preparing Copolymeric Polyarylate Resin (III-74)

Aside from setting the amount of BPC to 28.544 g, the amount of BP to 4.95 g and not adding the compound of Molecular Formula (2)-1, synthesis was carried out in the same way as in Synthesis Example 72. The starting material charging amounts and copolymerization ratios for the resulting copolymeric polyarylate resin (III-74) are shown in Tables 10 and 11.

TABLE 2

| | | Starting material charging amounts (mol %) | | | | | |
| | | Acid chloride ingredients | | Alcohol ingredients | | | |
| | Resin | Terephthalic acid | Isophthalic acid | BPCF | BP | Siloxane monomer | Siloxane monomer |
| --- | --- | --- | --- | --- | --- | --- | --- |
| Preparation Example 1 | (III-1) | 55 | 45 | 79.999 | 20 | 0.001 | — |

TABLE 2-continued

| | | Starting material charging amounts (mol %) | | | | | |
|---|---|---|---|---|---|---|---|
| | | Acid chloride ingredients | | Alcohol ingredients | | | |
| | Resin | Terephthalic acid | Isophthalic acid | BPCF | BP | Siloxane monomer | Siloxane monomer |
| Preparation Example 2 | (III-2) | 30 | 70 | 79.999 | 20 | 0.001 | — |
| Preparation Example 3 | (III-3) | 60 | 40 | 79.999 | 20 | 0.001 | — |
| Preparation Example 4 | (III-4) | 55 | 45 | 79.92 | 19.98 | 0.1 | — |
| Preparation Example 5 | (III-5) | 30 | 70 | 79.92 | 19.98 | 0.1 | — |
| Preparation Example 6 | (III-6) | 60 | 40 | 79.92 | 19.98 | 0.1 | — |
| Preparation Example 7 | (III-7) | 55 | 45 | 76 | 19 | 5 | — |
| Preparation Example 8 | (III-8) | 30 | 70 | 76 | 19 | 5 | — |
| Preparation Example 9 | (III-9) | 60 | 40 | 76 | 19 | 5 | — |
| Preparation Example 10 | (III-10) | 55 | 45 | 79.92 | 19.98 | 0.1 | — |
| Preparation Example 11 | (III-11) | 55 | 45 | 79.992 | 19.998 | 0.01 | — |
| Preparation Example 12 | (III-12) | 55 | 45 | 79.999 | 20 | 0.001 | — |
| Preparation Example 13 | (III-13) | 30 | 70 | 79.999 | 20 | 0.001 | — |
| Preparation Example 14 | (III-14) | 60 | 40 | 79.999 | 20 | 0.001 | — |
| Preparation Example 15 | (III-15) | 55 | 45 | 79.92 | 19.98 | 0.1 | — |
| Preparation Example 16 | (III-16) | 30 | 70 | 79.92 | 19.98 | 0.1 | — |
| Preparation Example 17 | (III-17) | 60 | 40 | 79.92 | 19.98 | 0.1 | — |
| Preparation Example 18 | (III-18) | 55 | 45 | 76 | 19 | 5 | — |
| Preparation Example 19 | (III-19) | 30 | 70 | 76 | 19 | 5 | — |
| Preparation Example 20 | (III-20) | 60 | 40 | 76 | 19 | 5 | — |
| Preparation Example 21 | (III-21) | 55 | 45 | 79.92 | 19.98 | 0.1 | — |
| Preparation Example 22 | (III-22) | 55 | 45 | 79.992 | 19.998 | 0.01 | — |
| Preparation Example 23 | (III-23) | 55 | 45 | 79.998 | 20 | 0.001 | 0.001 |
| Preparation Example 24 | (III-24) | 55 | 45 | 72 | 18 | 5 | 5 |
| Preparation Example 25 | (III-25) | 55 | 45 | 75.92 | 18.98 | 0.1 | 5 |
| Preparation Example 26 | (III-26) | 55 | 45 | 75.92 | 18.98 | 5 | 0.1 |

TABLE 3

| | | Resin copolymerization ratios | | | | | | | |
|---|---|---|---|---|---|---|---|---|---|
| | Resin | $a_1$ (mol %) | $a_2$ (mol %) | $b_1$ (mol %) | $b_2$ (mol %) | c (mol %) | d (mol %) | e (mol %) | f (mol %) |
| Prep. Ex. 1 | (III-1) | 35.9996 | 43.9996 | 8.9999 | 10.9999 | 0.00045 | 0.00055 | 0.0000 | 0.0000 |
| Prep. Ex. 2 | (III-2) | 23.9998 | 55.9994 | 5.9999 | 13.9999 | 0.00030 | 0.00070 | 0.0000 | 0.0000 |
| Prep. Ex. 3 | (III-3) | 47.9995 | 31.9997 | 11.9999 | 7.9999 | 0.00060 | 0.00040 | 0.0000 | 0.0000 |
| Prep. Ex. 4 | (III-4) | 35.9640 | 43.9560 | 8.9910 | 10.9890 | 0.04500 | 0.05500 | 0.0000 | 0.0000 |
| Prep. Ex. 5 | (III-5) | 23.9760 | 55.9440 | 5.9940 | 13.9860 | 0.03000 | 0.07000 | 0.0000 | 0.0000 |
| Prep. Ex. 6 | (III-6) | 47.9520 | 31.9680 | 11.9880 | 7.9920 | 0.06000 | 0.04000 | 0.0000 | 0.0000 |

TABLE 3-continued

| | Resin | Resin copolymerization ratios | | | | | | | |
|---|---|---|---|---|---|---|---|---|---|
| | | $a_1$ (mol %) | $a_2$ (mol %) | $b_1$ (mol %) | $b_2$ (mol %) | c (mol %) | d (mol %) | e (mol %) | f (mol %) |
| Prep. Ex. 7 | (III-7) | 34.2000 | 41.8000 | 8.5500 | 10.4500 | 2.25000 | 2.75000 | 0.0000 | 0.0000 |
| Prep. Ex. 8 | (III-8) | 22.8000 | 53.2000 | 5.7000 | 13.3000 | 1.50000 | 3.50000 | 0.0000 | 0.0000 |
| Prep. Ex. 9 | (III-9) | 45.6000 | 30.4000 | 11.4000 | 7.6000 | 3.00000 | 2.00000 | 0.0000 | 0.0000 |
| Prep. Ex. 10 | (III-10) | 35.9640 | 43.9560 | 8.9910 | 10.9890 | 0.04500 | 0.05500 | 0.0000 | 0.0000 |
| Prep. Ex. 11 | (III-11) | 35.9964 | 43.9956 | 8.9991 | 10.9989 | 0.00450 | 0.00550 | 0.0000 | 0.0000 |
| Prep. Ex. 12 | (III-12) | 35.9996 | 43.9996 | 8.9999 | 10.9999 | 0.00045 | 0.00055 | 0.0000 | 0.0000 |
| Prep. Ex. 13 | (III-13) | 23.9998 | 55.9994 | 5.9999 | 13.9999 | 0.00030 | 0.00070 | 0.0000 | 0.0000 |
| Prep. Ex. 14 | (III-14) | 47.9995 | 31.9997 | 11.9999 | 7.9999 | 0.00060 | 0.00040 | 0.0000 | 0.0000 |
| Prep. Ex. 15 | (III-15) | 35.9640 | 43.9560 | 8.9910 | 10.9890 | 0.04500 | 0.05500 | 0.0000 | 0.0000 |
| Prep. Ex. 16 | (III-16) | 23.9760 | 55.9440 | 5.9940 | 13.9860 | 0.03000 | 0.07000 | 0.0000 | 0.0000 |
| Prep. Ex. 17 | (III-17) | 47.9520 | 31.9680 | 11.9880 | 7.9920 | 0.06000 | 0.04000 | 0.0000 | 0.0000 |
| Prep. Ex. 18 | (III-18) | 34.2000 | 41.8000 | 8.5500 | 10.4500 | 2.25000 | 2.75000 | 0.0000 | 0.0000 |
| Prep. Ex. 19 | (III-19) | 22.8000 | 53.2000 | 5.7000 | 13.3000 | 1.50000 | 3.50000 | 0.0000 | 0.0000 |
| Prep. Ex. 20 | (III-20) | 45.6000 | 30.4000 | 11.4000 | 7.6000 | 3.00000 | 2.00000 | 0.0000 | 0.0000 |
| Prep. Ex. 21 | (III-21) | 35.9640 | 43.9560 | 8.9910 | 10.9890 | 0.04500 | 0.05500 | 0.0000 | 0.0000 |
| Prep. Ex. 22 | (III-22) | 35.9964 | 43.9956 | 8.9991 | 10.9989 | 0.00450 | 0.00550 | 0.0000 | 0.0000 |
| Prep. Ex. 23 | (III-23) | 35.9993 | 43.9991 | 8.9998 | 10.9998 | 0.00045 | 0.00055 | 0.0005 | 0.0006 |
| Prep. Ex. 24 | (III-24) | 32.4000 | 39.6000 | 8.1000 | 9.9000 | 2.25000 | 2.75000 | 2.2500 | 2.7500 |
| Prep. Ex. 25 | (III-25) | 34.1640 | 41.7560 | 8.5410 | 10.4390 | 0.04500 | 0.05500 | 2.2500 | 2.7500 |
| Prep. Ex. 26 | (III-26) | 34.1640 | 41.7560 | 8.5410 | 10.4390 | 2.25000 | 2.75000 | 0.0450 | 0.0550 |

TABLE 4

| | | | Starting material charging amounts (mol %) | | | | | |
|---|---|---|---|---|---|---|---|---|
| | | | Acid chloride ingredients | | Alcohol ingredients | | | |
| | | Resin | Terephthalic acid | Isophthalic acid | BPCF | BP | Siloxane monomer | Siloxane monomer |
| Prep. Ex. 27 | Example 27 | (III-27) | 55 | 45 | 89.999 | 10 | 0.001 | — |
| Prep. Ex. 28 | Example 28 | (III-28) | 55 | 45 | 89.91 | 9.99 | 0.1 | — |
| Prep. Ex. 29 | Example 29 | (III-29) | 55 | 45 | 89.999 | 10 | 0.001 | — |
| Prep. Ex. 30 | Example 30 | (III-30) | 55 | 45 | 89.91 | 9.99 | 0.1 | — |
| Prep. Ex. 31 | Example 31 | (III-31) | 55 | 45 | 69.999 | 30 | 0.001 | — |
| Prep. Ex. 32 | Example 32 | (III-32) | 55 | 45 | 69.93 | 29.97 | 0.1 | — |
| Prep. Ex. 33 | Example 1 | (III-33) | 55 | 45 | 69.999 | 30 | 0.001 | — |
| Prep. Ex. 34 | Example 2 | (III-34) | 55 | 45 | 69.93 | 29.97 | 0.1 | — |
| Prep. Ex. 35 | Example 3 | (III-35) | 55 | 45 | 59.999 | 40 | 0.001 | — |
| Prep. Ex. 36 | Example 4 | (III-36) | 55 | 45 | 59.94 | 39.96 | 0.1 | — |
| Prep. Ex. 37 | Example 5 | (III-37) | 55 | 45 | 59.999 | 40 | 0.001 | — |

TABLE 4-continued

| | | Starting material charging amounts (mol %) | | | | | |
|---|---|---|---|---|---|---|---|
| | | Acid chloride ingredients | | Alcohol ingredients | | | |
| | Resin | Terephthalic acid | Isophthalic acid | BPCF | BP | Siloxane monomer | Siloxane monomer |
| Prep. Ex. 38 | Example 6 (III-38) | 55 | 45 | 59.94 | 39.96 | 0.1 | — |

TABLE 5

| | | Resin copolymerization ratios | | | | | | | |
|---|---|---|---|---|---|---|---|---|---|
| | Resin | $a_1$ (mol %) | $a_2$ (mol %) | $b_1$ (mol %) | $b_2$ (mol %) | c (mol %) | d (mol %) | e (mol %) | f (mol %) | c + d + e + f |
| Prep. Ex. 27 | (III-27) | 40.4996 | 49.4995 | 4.5000 | 5.4999 | 0.00045 | 0.00055 | 0.0000 | 0.0000 | 0.001 |
| Prep. Ex. 28 | (III-28) | 40.4595 | 49.4505 | 4.4955 | 5.4945 | 0.04500 | 0.05500 | 0.0000 | 0.0000 | 0.1 |
| Prep. Ex. 29 | (III-29) | 40.4996 | 49.4995 | 4.5000 | 5.4999 | 0.00045 | 0.00055 | 0.0000 | 0.0000 | 0.001 |
| Prep. Ex. 30 | (III-30) | 40.4595 | 49.4505 | 4.4955 | 5.4945 | 0.04500 | 0.05500 | 0.0000 | 0.0000 | 0.1 |
| Prep. Ex. 31 | (III-31) | 31.4997 | 38.4996 | 13.4999 | 16.4998 | 0.00045 | 0.00055 | 0.0000 | 0.0000 | 0.001 |
| Prep. Ex. 32 | (III-32) | 31.4685 | 38.4615 | 13.4865 | 16.4835 | 0.04500 | 0.05500 | 0.0000 | 0.0000 | 0.1 |
| Prep. Ex. 33 | (III-33) | 31.4997 | 38.4996 | 13.4999 | 16.4998 | 0.00045 | 0.00055 | 0.0000 | 0.0000 | 0.001 |
| Prep. Ex. 34 | (III-34) | 31.4685 | 38.4615 | 13.4865 | 16.4835 | 0.04500 | 0.05500 | 0.0000 | 0.0000 | 0.1 |
| Prep. Ex. 35 | (III-35) | 26.9997 | 32.9997 | 17.9998 | 21.9998 | 0.00045 | 0.00055 | 0.0000 | 0.0000 | 0.001 |
| Prep. Ex. 36 | (III-36) | 26.9730 | 32.9670 | 17.9820 | 21.9780 | 0.04500 | 0.05500 | 0.0000 | 0.0000 | 0.1 |
| Prep. Ex. 37 | (III-37) | 26.9997 | 32.9997 | 17.9998 | 21.9998 | 0.00045 | 0.00055 | 0.0000 | 0.0000 | 0.001 |
| Prep. Ex. 38 | (III-38) | 26.9730 | 32.9670 | 17.9820 | 21.9780 | 0.04500 | 0.05500 | 0.0000 | 0.0000 | 0.1 |

TABLE 6

| | | Starting material charging amounts (mol %) | | | | | | | | |
|---|---|---|---|---|---|---|---|---|---|---|
| | | Acid chloride ingredients | | Alcohol ingredients | | | | | | |
| | Resin | Terephthalic acid | Isophthalic acid | BPCF | BPC | BPZ | BP-E | BPF | BP | Siloxane monomer | Siloxane monomer |
| Prep. Ex. 39 | (III-39) | 55 | 45 | 89.999 | — | — | 10 | — | — | 0.001 | — |
| Prep. Ex. 40 | (III-40) | 55 | 45 | 89.91 | — | — | 9.99 | — | — | 0.1 | — |
| Prep. Ex. 41 | (III-41) | 55 | 45 | 79.999 | — | — | 20 | — | — | 0.001 | — |
| Prep. Ex. 42 | (III-42) | 55 | 45 | 79.92 | — | — | 19.98 | — | — | 0.1 | — |
| Prep. Ex. 43 | (III-43) | 55 | 45 | 69.999 | — | — | 30 | — | — | 0.001 | — |
| Prep. Ex. 44 | (III-44) | 55 | 45 | 69.93 | — | — | 29.97 | — | — | 0.1 | — |
| Prep. Ex. 45 | (III-45) | 55 | 45 | 89.999 | — | — | — | 10 | — | 0.001 | — |
| Prep. Ex. 46 | (III-46) | 55 | 45 | 89.91 | — | — | — | 9.99 | — | 0.1 | — |
| Prep. Ex. 47 | (III-47) | 55 | 45 | 79.999 | — | — | — | 20 | — | 0.001 | — |
| Prep. Ex. 48 | (III-48) | 55 | 45 | 79.92 | — | — | — | 19.98 | — | 0.1 | — |
| Prep. Ex. 49 | (III-49) | 55 | 45 | 69.999 | — | — | — | 30 | — | 0.001 | — |
| Prep. Ex. 50 | (III-50) | 55 | 45 | 69.93 | — | — | — | 29.97 | — | 0.1 | — |

TABLE 6-continued

| | | Starting material charging amounts (mol %) | | | | | | | | |
|---|---|---|---|---|---|---|---|---|---|---|
| | | Acid chloride ingredients | | Alcohol ingredients | | | | | | |
| | Resin | Terephthalic acid | Isophthalic acid | BPCF | BPC | BPZ | BP-E | BPF | BP | Siloxane monomer | Siloxane monomer |
| Prep. Ex. 51 | (III-51) | 55 | 45 | — | 79.999 | — | — | — | 20 | 0.001 | — |
| Prep. Ex. 52 | (III-52) | 55 | 45 | — | 79.999 | — | 20 | — | — | 0.001 | — |
| Prep. Ex. 53 | (III-53) | 55 | 45 | — | 79.999 | — | — | 20 | — | 0.001 | — |
| Prep. Ex. 54 | (III-54) | 55 | 45 | — | — | 79.999 | — | — | 20 | 0.001 | — |
| Prep. Ex. 55 | (III-55) | 55 | 45 | — | — | 79.999 | 20 | — | — | 0.001 | — |
| Prep. Ex. 56 | (III-56) | 55 | 45 | — | — | 79.999 | — | 20 | — | 0.001 | — |

TABLE 7

| | | Resin copolymerization ratios | | | | | | | | |
|---|---|---|---|---|---|---|---|---|---|---|
| | Resin | $a_1$ (mol %) | $a_2$ (mol %) | $b_1$ (mol %) | $b_2$ (mol %) | c (mol %) | d (mol %) | e (mol %) | f (mol %) | c + d + e + f |
| Prep. Ex. 39 | (III-39) | 40.4996 | 49.4995 | 4.5000 | 5.4999 | 0.00045 | 0.00055 | 0.0000 | 0.0000 | 0.001 |
| Prep. Ex. 40 | (III-40) | 40.4595 | 49.4505 | 4.4955 | 5.4945 | 0.04500 | 0.05500 | 0.0000 | 0.0000 | 0.1 |
| Prep. Ex. 41 | (III-41) | 35.9996 | 43.9996 | 8.9999 | 10.9999 | 0.00045 | 0.00055 | 0.0000 | 0.0000 | 0.001 |
| Prep. Ex. 42 | (III-42) | 35.9640 | 43.9560 | 8.9910 | 10.9890 | 0.04500 | 0.05500 | 0.0000 | 0.0000 | 0.1 |
| Prep. Ex. 43 | (III-43) | 31.4997 | 38.4996 | 13.4999 | 16.4998 | 0.00045 | 0.00055 | 0.0000 | 0.0000 | 0.001 |
| Prep. Ex. 44 | (III-44) | 31.4685 | 38.4615 | 13.4865 | 16.4835 | 0.04500 | 0.05500 | 0.0000 | 0.0000 | 0.1 |
| Prep. Ex. 45 | (III-45) | 40.4996 | 49.4995 | 4.5000 | 5.4999 | 0.00045 | 0.00055 | 0.0000 | 0.0000 | 0.001 |
| Prep. Ex. 46 | (III-46) | 40.4595 | 49.4505 | 4.4955 | 5.4945 | 0.04500 | 0.05500 | 0.0000 | 0.0000 | 0.1 |
| Prep. Ex. 47 | (III-47) | 35.9996 | 43.9996 | 8.9999 | 10.9999 | 0.00045 | 0.00055 | 0.0000 | 0.0000 | 0.001 |
| Prep. Ex. 48 | (III-48) | 35.9640 | 43.9560 | 8.9910 | 10.9890 | 0.04500 | 0.05500 | 0.0000 | 0.0000 | 0.1 |
| Prep. Ex. 49 | (III-49) | 31.4997 | 38.4996 | 13.4999 | 16.4998 | 0.00045 | 0.00055 | 0.0000 | 0.0000 | 0.001 |
| Prep. Ex. 50 | (III-50) | 31.4685 | 38.4615 | 13.4865 | 16.4835 | 0.04500 | 0.05500 | 0.0000 | 0.0000 | 0.1 |
| Prep. Ex. 51 | (III-51) | 35.9996 | 43.9996 | 8.9999 | 10.9999 | 0.00045 | 0.00055 | 0.0000 | 0.0000 | 0.001 |
| Prep. Ex. 52 | (III-52) | 35.9996 | 43.9996 | 8.9999 | 10.9999 | 0.00045 | 0.00055 | 0.0000 | 0.0000 | 0.001 |
| Prep. Ex. 53 | (III-53) | 35.9996 | 43.9996 | 8.9999 | 10.9999 | 0.00045 | 0.00055 | 0.0000 | 0.0000 | 0.001 |
| Prep. Ex. 54 | (III-54) | 35.9996 | 43.9996 | 8.9999 | 10.9999 | 0.00045 | 0.00055 | 0.0000 | 0.0000 | 0.001 |
| Prep. Ex. 55 | (III-55) | 35.9996 | 43.9996 | 8.9999 | 10.9999 | 0.00045 | 0.00055 | 0.0000 | 0.0000 | 0.001 |
| Prep. Ex. 56 | (III-56) | 35.9996 | 43.9996 | 8.9999 | 10.9999 | 0.00045 | 0.00055 | 0.0000 | 0.0000 | 0.001 |

TABLE 8

| | | Starting material charging amounts (mol %) | | | | | | | | |
|---|---|---|---|---|---|---|---|---|---|---|
| | | Acid chloride ingredients | | Alcohol ingredients | | | | | | |
| | Resin | Terephthalic acid | Isophthalic acid | BPCZ | BIOC-E | BPCCF | BP-E | BPF | BP | Siloxane monomer | Siloxane monomer |
| Prep. Ex. 57 | (III-57) | 55 | 45 | 79.999 | — | — | — | — | 20 | 0.001 | — |

TABLE 8-continued

| | | Starting material charging amounts (mol %) | | | | | | | | |
|---|---|---|---|---|---|---|---|---|---|---|
| | | Acid chloride ingredients | | Alcohol ingredients | | | | | | |
| | Resin | Terephthalic acid | Isophthalic acid | BPCZ | BIOC-E | BPCCF | BP-E | BPF | BP | Siloxane monomer | Siloxane monomer |
| Prep. Ex. 58 | (III-58) | 55 | 45 | 79.999 | — | — | 20 | — | — | 0.001 | — |
| Prep. Ex. 59 | (III-59) | 55 | 45 | 79.999 | — | — | — | 20 | — | 0.001 | — |
| Prep. Ex. 60 | (III-60) | 55 | 45 | — | 79.999 | — | — | — | 20 | 0.001 | — |
| Prep. Ex. 61 | (III-61) | 55 | 45 | — | 79.999 | — | 20 | — | — | 0.001 | — |
| Prep. Ex. 62 | (III-62) | 55 | 45 | — | 79.999 | — | — | 20 | — | 0.001 | — |
| Prep. Ex. 63 | (III-63) | 55 | 45 | — | — | 79.999 | — | — | 20 | 0.001 | — |
| Prep. Ex. 64 | (III-64) | 55 | 45 | — | — | 79.999 | 20 | — | — | 0.001 | — |
| Prep. Ex. 65 | (III-65) | 55 | 45 | — | — | 79.999 | — | 20 | — | 0.001 | — |

TABLE 9

| | | Resin copolymerization ratios | | | | | | | | |
|---|---|---|---|---|---|---|---|---|---|---|
| | Resin | $a_1$ (mol %) | $a_2$ (mol %) | $b_1$ (mol %) | $b_2$ (mol %) | c (mol %) | d (mol %) | e (mol %) | f (mol %) | c + d + e + f |
| Prep. Ex. 57 | (III-57) | 35.9996 | 43.9996 | 8.9999 | 10.9999 | 0.00045 | 0.00055 | 0.0000 | 0.0000 | 0.001 |
| Prep. Ex. 58 | (III-58) | 35.9996 | 43.9996 | 8.9999 | 10.9999 | 0.00045 | 0.00055 | 0.0000 | 0.0000 | 0.001 |
| Prep. Ex. 59 | (III-59) | 35.9996 | 43.9996 | 8.9999 | 10.9999 | 0.00045 | 0.00055 | 0.0000 | 0.0000 | 0.001 |
| Prep. Ex. 60 | (III-60) | 35.9996 | 43.9996 | 8.9999 | 10.9999 | 0.00045 | 0.00055 | 0.0000 | 0.0000 | 0.001 |
| Prep. Ex. 61 | (III-61) | 35.9996 | 43.9996 | 8.9999 | 10.9999 | 0.00045 | 0.00055 | 0.0000 | 0.0000 | 0.001 |
| Prep. Ex. 62 | (III-62) | 35.9996 | 43.9996 | 8.9999 | 10.9999 | 0.00045 | 0.00055 | 0.0000 | 0.0000 | 0.001 |
| Prep. Ex. 63 | (III-63) | 35.9996 | 43.9996 | 8.9999 | 10.9999 | 0.00045 | 0.00055 | 0.0000 | 0.0000 | 0.001 |
| Prep. Ex. 64 | (III-64) | 35.9996 | 43.9996 | 8.9999 | 10.9999 | 0.00045 | 0.00055 | 0.0000 | 0.0000 | 0.001 |
| Prep. Ex. 65 | (III-65) | 35.9996 | 43.9996 | 8.9999 | 10.9999 | 0.00045 | 0.00055 | 0.0000 | 0.0000 | 0.001 |

TABLE 10

| | | Starting material charging amounts (mol %) | | | | | | | | |
|---|---|---|---|---|---|---|---|---|---|---|
| | | Acid chloride ingredients | | Alcohol ingredients | | | | | | |
| | Resin | Terephthalic acid | Isophthalic acid | BPCF | BPC | BPZ | BP-E | BPF | BP | Siloxane monomer | Siloxane monomer |
| Prep. Ex. 66 | (III-66) | 55 | 45 | 71.2 | — | — | 17.8 | — | — | 11 | — |
| Prep. Ex. 67 | (III-67) | 55 | 45 | 71.2 | — | — | — | 17.8 | — | 11 | — |
| Prep. Ex. 68 | (III-68) | 55 | 45 | 71.2 | — | — | — | — | 17.8 | 11 | — |
| Prep. Ex. 69 | (III-69) | 65 | 35 | — | 80 | — | 20 | — | — | 0 | — |
| Prep. Ex. 70 | (III-70) | 65 | 35 | — | 80 | — | — | 20 | — | 0 | — |
| Prep. Ex. 71 | (III-71) | 65 | 35 | — | 80 | — | — | — | 20 | 0 | — |
| Prep. Ex. 72 | (III-72) | 35 | 65 | — | — | 80 | 20 | — | — | 0 | — |
| Prep. Ex. 73 | (III-73) | 35 | 65 | — | — | 80 | — | 20 | — | 0 | — |

TABLE 10-continued

| | | Starting material charging amounts (mol %) | | | | | | | | |
|---|---|---|---|---|---|---|---|---|---|---|
| | | Acid chloride ingredients | | Alcohol ingredients | | | | | | |
| | Resin | Terephthalic acid | Isophthalic acid | BPCF | BPC | BPZ | BP-E | BPF | BP | Siloxane monomer | Siloxane monomer |
| Prep. Ex. 74 | (III-74) | 35 | 65 | — | — | 80 | — | — | 20 | 0 | — |

TABLE 11

| | | Resin copolymerization ratios | | | | | | | | |
|---|---|---|---|---|---|---|---|---|---|---|
| | Resin | $a_1$ (mol %) | $a_2$ (mol %) | $b_1$ (mol %) | $b_2$ (mol %) | c (mol %) | d (mol %) | e (mol %) | f (mol %) | c + d + e + f |
| Prep. Ex. 66 | (III-66) | 32.0400 | 39.1600 | 8.0100 | 9.7900 | 4.95000 | 6.05000 | 0.0000 | 0.0000 | 11 |
| Prep. Ex. 67 | (III-67) | 32.0400 | 39.1600 | 8.0100 | 9.7900 | 4.95000 | 6.05000 | 0.0000 | 0.0000 | 11 |
| Prep. Ex. 68 | (III-68) | 32.0400 | 39.1600 | 8.0100 | 9.7900 | 4.95000 | 6.05000 | 0.0000 | 0.0000 | 11 |
| Prep. Ex. 69 | (III-69) | 28.0000 | 52.0000 | 7.0000 | 13.0000 | 0.00000 | 0.00000 | 0.0000 | 0.0000 | 0 |
| Prep. Ex. 70 | (III-70) | 28.0000 | 52.0000 | 7.0000 | 13.0000 | 0.00000 | 0.00000 | 0.0000 | 0.0000 | 0 |
| Prep. Ex. 71 | (III-71) | 28.0000 | 52.0000 | 7.0000 | 13.0000 | 0.00000 | 0.00000 | 0.0000 | 0.0000 | 0 |
| Prep. Ex. 72 | (III-72) | 52.0000 | 28.0000 | 13.0000 | 7.0000 | 0.00000 | 0.00000 | 0.0000 | 0.0000 | 0 |
| Prep. Ex. 73 | (III-73) | 52.0000 | 28.0000 | 13.0000 | 7.0000 | 0.00000 | 0.00000 | 0.0000 | 0.0000 | 0 |
| Prep. Ex. 74 | (III-74) | 52.0000 | 28.0000 | 13.0000 | 7.0000 | 0.00000 | 0.00000 | 0.0000 | 0.0000 | 0 |

Note:
The copolymerization ratios in the above tables are the ratios when $a_1 + a_2 + b_1 + b2 + c + d + e + f = 100$ mol %.

Production of Negative-Charging Stacked Photoreceptors

Example 1

Coating Liquid 1 was prepared by dissolving and dispersing 5 parts by weight of an alcohol-soluble nylon (available under the trade name "CM8000" from Toray Industries, Inc.) and 5 parts by weight of aminosilane-treated titanium oxide fine particles in 90 parts by weight of methanol. This Coating Liquid 1 was dip-coated as an undercoat layer onto the outer periphery of an aluminum cylinder having an outside diameter of 30 mm as the conductive substrate 1, and dried for 30 minutes at a temperature of 100° C. to form an undercoat layer 2 having a thickness of 3 μm.

Coating Liquid 2 was prepared by dissolving and dispersing 1 part by weight of Y-type titanyl phthalocyanine as the charge generating material and 1.5 parts by weight of polyvinyl butyral resin (available under the trade name "S-LEC KS-1" from Sekisui Chemical Co., Ltd.) as the resin binder in 60 parts by weight of dichloromethane. This Coating Liquid 2 was dip-coated onto the undercoat layer 2, and dried for 30 minutes at a temperature of 80° C. to form a charge generating layer 4 having a thickness of 0.3 μm.

Coating Liquid 3 was prepared by dissolving 90 parts by weight of the compound of the following formula

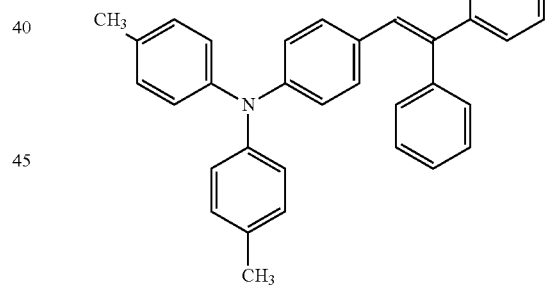

as the charge transporting material and 110 parts by weight of the copolymeric polyarylate resin (III-1) of Preparation Example 1 as the resin binder in 1000 parts by weight of dichloromethane. Coating Liquid 3 was dip-coated onto the charge generating layer 4 and dried for 60 minutes at a temperature of 90° C. to form a charge transport layer 5 having a thickness of 25 μm, thereby producing a negative-charging stacked photoreceptor.

Examples 2 to 65

Aside from replacing the copolymeric polyarylate resin (III-1) of Preparation Example 1 used in Example 1 with the copolymeric polyarylate resins (III-2 to III-65) prepared in Preparation Examples 2 to 65, photoreceptors were produced in the same way as in Example 1.

Example 66

Aside from replacing the Y-type titanyl phthalocyanine used in Example 1 with α-type titanyl phthalocyanine, a photoreceptor was produced in the same way as in Example 1.

Example 67

Aside from replacing the charge transporting material used in Example 1 with the compound of the following formula, a photoreceptor was produced in the same way as in Example 1.

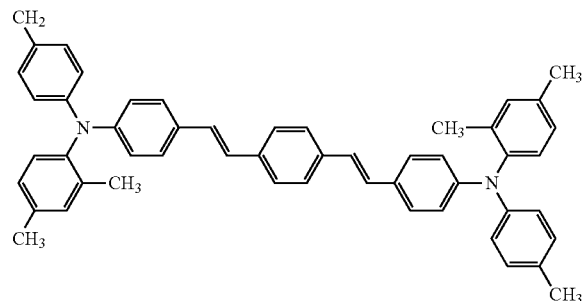

Example 68

Aside from changing the amount of resin III-1 used in Example 1 to 22 parts by weight and adding 88 parts by weight of resin III-31, a photoreceptor was produced in the same way as in Example 1.

Example 69

Aside from changing the amount of resin III-1 used in Example 1 to 22 parts by weight and adding 88 parts by weight of resin III-32, a photoreceptor was produced in the same way as in Example 1.

Comparative Example 1

Aside from replacing the copolymeric polyarylate resin (III-1) of Preparation Example 1 used in Example 1 with the copolymeric polyarylate resin (III-66) prepared in Preparation Example 66, a photoreceptor was produced in the same way as in Example 1.

Comparative Example 2

Aside from replacing the copolymeric polyarylate resin (III-1) of Preparation Example 1 used in Example 1 with the copolymeric polyarylate resin (III-67) prepared in Preparation Example 67, a photoreceptor was produced in the same way as in Example 1.

Comparative Example 3

Aside from replacing the copolymeric polyarylate resin (III-1) of Preparation Example 1 used in Example 1 with the copolymeric polyarylate resin (III-68) prepared in Preparation Example 68, a photoreceptor was produced in the same way as in Example 1.

Comparative Example 4

Aside from replacing the copolymeric polyarylate resin (III-1) of Preparation Example 1 used in Example 1 with the copolymeric polyarylate resin (III-69) prepared in Preparation Example 69, a photoreceptor was produced in the same way as in Example 1.

Comparative Example 5

Aside from replacing the copolymeric polyarylate resin (III-1) of Preparation Example 1 used in Example 1 with the copolymeric polyarylate resin (III-70) prepared in Preparation Example 70, a photoreceptor was produced in the same way as in Example 1.

Comparative Example 6

Aside from replacing the copolymeric polyarylate resin (III-1) of Preparation Example 1 used in Example 1 with the copolymeric polyarylate resin (III-71) prepared in Preparation Example 71, a photoreceptor was produced in the same way as in Example 1.

Comparative Example 7

Aside from replacing the copolymeric polyarylate resin (III-1) of Preparation Example 1 used in Example 1 with the copolymeric polyarylate resin (III-72) prepared in Preparation Example 72, a photoreceptor was produced in the same way as in Example 1.

Comparative Example 8

Aside from replacing the copolymeric polyarylate resin (III-1) of Preparation Example 1 used in Example 1 with the copolymeric polyarylate resin (III-73) prepared in Preparation Example 73, a photoreceptor was produced in the same way as in Example 1.

Comparative Example 9

Aside from replacing the copolymeric polyarylate resin (III-1) of Preparation Example 1 used in Example 1 with the copolymeric polyarylate resin (III-74) prepared in Preparation Example 74, a photoreceptor was produced in the same way as in Example 1.

Comparative Example 10

Aside from replacing the copolymeric polyarylate resin (III-1) of Preparation Example 1 used in Example 1 with Polycarbonate Z (PCZ-500, available from Mitsubishi Gas Chemical Co., Ltd.; referred to below as "III-75"), a photoreceptor was produced in the same way as in Example 1.

Comparative Example 11

Aside from replacing the copolymeric polyarylate resin (III-1) of Preparation Example 1 used in Example 1 with Polycarbonate A (S-3000, available from Mitsubishi Engineering Plastics Corporation; referred to below as "III-76"), a photoreceptor was produced in the same way as in Example 1.

Comparative Example 12

Aside from replacing the copolymeric polyarylate resin (III-1) of Preparation Example 1 used in Example 1 with the polyester resin $P_2$-1-6 of the following formula

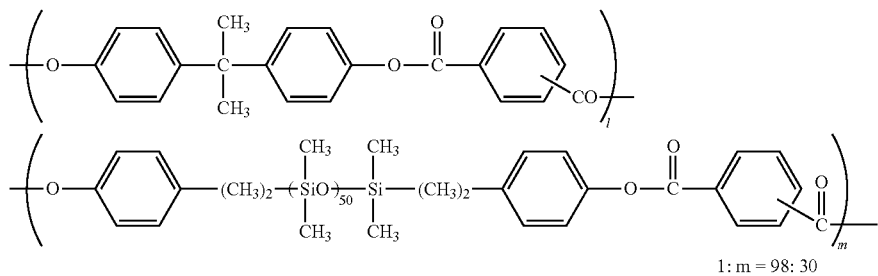

P₂-1-6 l : m = 98 : 30

(referred to below as "III-77"), which is mentioned in Patent Document 10 (Japanese Patent Application Laid-open No. H8-234468), a photoreceptor was produced in the same way as in Example 1.

Comparative Example 13

Aside from replacing the copolymeric polyarylate resin (III-1) of Preparation Example 1 used in Example 1 with polyester resin A-1 of the following formula

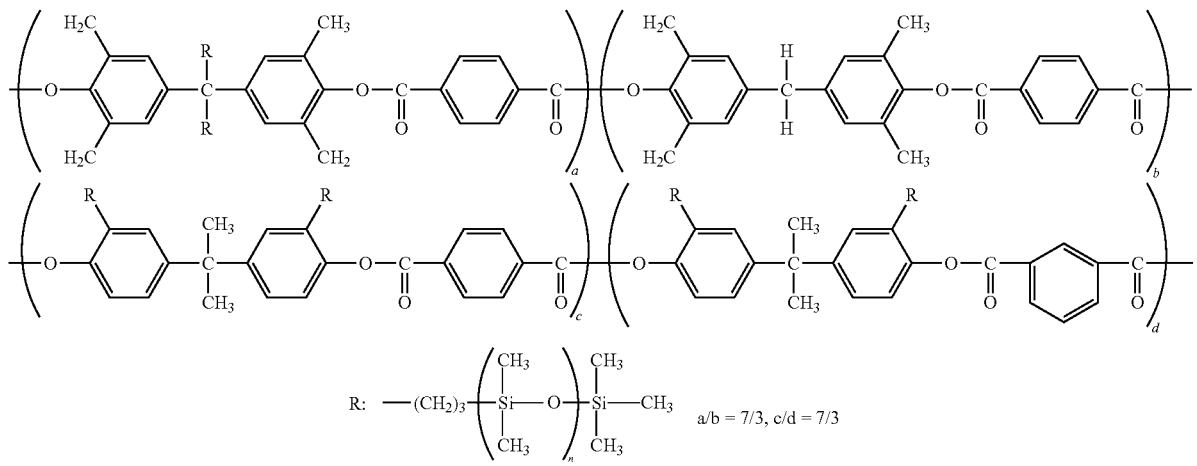

a/b = 7/3, c/d = 7/3

(referred to below as "III-78"), which is mentioned in Patent Document 12 (Japanese Patent Application Laid-open No. 2002-214807), a photoreceptor was produced in the same way as in Example 1.

Production of Single-Layer Photoreceptors

Example 70

A coating liquid prepared by dissolving, under stirring, 0.2 part by weight of a vinyl chloride-vinyl acetate-vinyl alcohol copolymer (available under the trade name "Solbin TA5R" from Nissin Chemical Industry Co., Ltd.) in 99 parts by weight of methyl ethyl ketone was dip-coated as the undercoat layer on the outer periphery of an aluminum cylinder having an outside diameter of 24 mm as the conductive substrate 1, then dried for 30 minutes at a temperature of 100° C. to form an undercoat layer 2 having a thickness of 0.1 μm.

A coating liquid prepared by dissolving and dispersing 1 part by weight of the nonmetallic phthalocyanine of the following formula

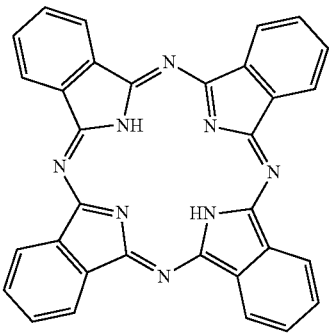 [SMILES: c1ccc2c(c1)-c1nc-2nc2[nH]c(nc3nc(nc4[nH]c(n1)c1ccccc41)-c1ccccc1-3)c1ccccc21]

as a charge generating material, 30 parts by weight of the stilbene compound of the following formula

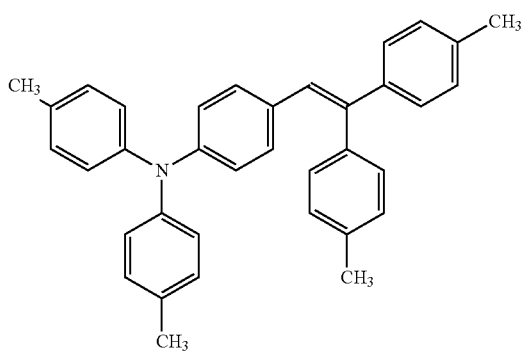

and 15 parts by weight of the stilbene compound of the following formula

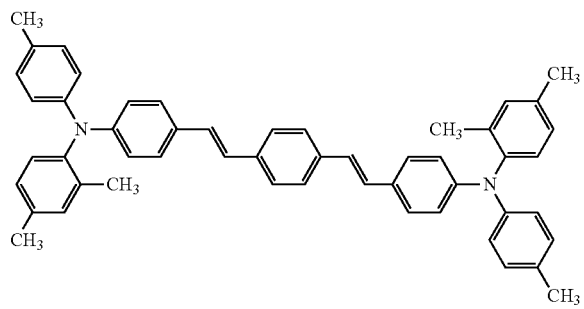

as hole transporting materials, 30 parts by weight of the compound of the following formula

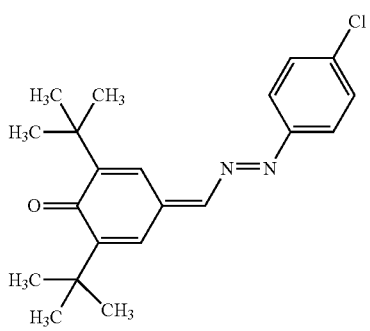 [SMILES: CC(C)(C)C1=CC(=C/N=N/c2ccc(Cl)cc2)C=C(C(C)(C)C)C1=O]

as an electron transporting material and 55 parts by weight of the resin (III-1) of above Preparation Example 1 as a resin binder in 350 parts by weight of tetrahydrofuran was dip-coated onto the undercoat layer 2, then dried for 60 minutes at a temperature of 100° C. to form a photosensitive layer having a thickness of 25 μm, thereby producing a single-layer photoreceptor.

Example 71

Aside from replacing the nonmetallic phthalocyanine used in Example 70 with Y-type titanyl phthalocyanine, a photoreceptor was produced in the same way as in Example 70.

Example 72

Aside from replacing the nonmetallic phthalocyanine used in Example 70 with α-type titanyl phthalocyanine, a photoreceptor was produced in the same way as in Example 70.

Comparative Example 14

Aside from replacing the polyarylate resin (III-1) of Preparation Example 1 used in Example 70 with polycarbonate Z (III-75), a photoreceptor was produced in the same way as in Example 70.

Production of Positive-Charging Stacked Photoreceptors

Example 73

A coating liquid was prepared by dissolving 50 parts by weight of the compound of the following formula

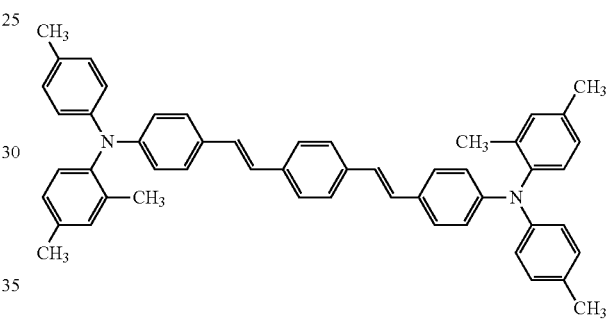

as a charge transporting material and 50 parts by weight of polycarbonate Z (III-75) as a resin binder in 800 parts by weight of dichloromethane. This coating liquid was dip-coated onto the outer periphery of an aluminum cylinder having an outside diameter of 24 mm as the conductive substrate 1, then dried for 60 minutes at a temperature of 120° C. to form a charge transporting layer having a thickness of 15 μm.

A coating liquid prepared by dissolving and dispersing 1.5 parts by weight of the nonmetallic phthalocyanine of the following formula

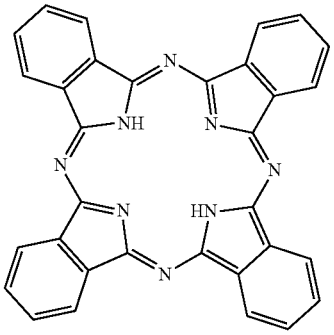 [SMILES: c1ccc2c(c1)-c1nc-2nc2[nH]c(nc3nc(nc4[nH]c(n1)c1ccccc41)-c1ccccc1-3)c1ccccc21]

as a charge generating material, 10 parts by weight of the stilbene compounds of the following formula

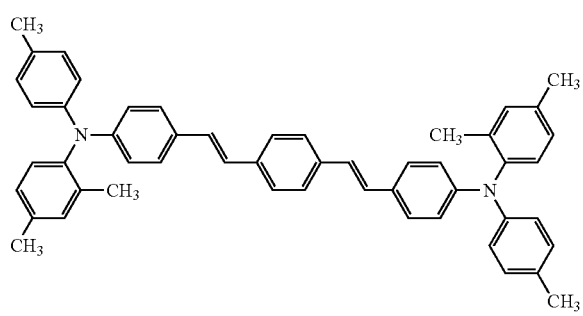 [SMILES: Cc1ccc(N(c2ccc(/C=C/c3ccc(/C=C/c4ccc(N(c5ccc(C)cc5)c5ccc(C)cc5C)cc4)cc3)cc2)c2ccc(C)cc2C)cc1]

as a hole transporting material, 25 parts by weight of the compound of the following formula

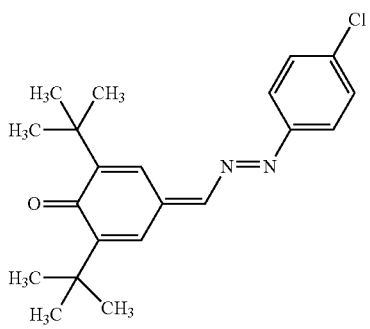 [SMILES: CC(C)(C)C1=CC(=C/N=N/c2ccc(Cl)cc2)C=C(C(C)(C)C)C1=O]

as an electron transporting material and 60 parts by weight of the resin (III-1) of above Preparation Example 1 as a resin binder in 800 parts by weight of 1,2-dichloroethane was dip-coated onto the charge transport layer and dried for 60 minutes at a temperature of 100° C. to form a photosensitive layer having a thickness of 15 μm, thereby producing a positive-charging stacked photoreceptor.

Comparative Example 15

Aside from replacing the polyarylate resin (III-1) of Preparation Example 1 used in Example 73 with polycarbonate Z (III-75), a photoreceptor was produced in the same way as in Example 73.

Evaluation of the Photoreceptors

The lubricity and electrical characteristics of the photoreceptors produced in Examples 1 to 73 and Comparative Examples 1 to 15 were evaluated as described below. In addition, the solubility of the copolymeric polyarylate resin in solvent when preparing a coating liquid for a charge transporting layer was measured in order to assess the state of the coating liquid. The evaluation results are shown in Tables 12 to 19.

Evaluation of Lubricity

The lubricity of the drum surface on each of the photoreceptors produced in the examples of the invention and the comparative examples was measured using a surface property tester (Heidon-14FW Surface Property Tester). The lubricity was also determined for each photoreceptor after mounting the drum in a Hewlett-Packard LJ4000 printer and printing out 10,000 sheets of A4 paper.

Measurement was carried out by pressing a urethane rubber blade against the drum surface under a fixed load (20 g), and measuring, as a frictional force, the load under the friction generated by moving the blade in the lengthwise direction of the drum.

Electrical Characteristics

For the photoreceptors produced in Examples 1 to 69 and Comparative Examples 1 to 13, the surface of the photoreceptor was charged to −650 V by corona discharge in a dark place within a 22° C., 50% RH atmosphere, following which the surface potential $V_0$ immediately after charging was measured. The photoreceptor was then left to stand in a dark place for 5 seconds, after which the surface voltage $V_5$ was measured. The potential retention $Vk_5$ (%) 5 seconds after charging was determined according to the following formula (1)

$$Vk_5 = V_5/V_0 \times 100 \tag{1}.$$

Next, using a halogen lamp as the light source, the photoreceptor was irradiated for 5 seconds from the time at which the surface potential reached −600 V with 1.0 μW/cm² of exposure light obtained by using filters for spectral separation to 780 nm, the exposure dose required for light attenuation to a surface potential of −300 V was measured as $E_{1/2}$ (μJ/cm²), and the residual potential at the surface of the photoreceptor 5 seconds after exposure was measured as Vr5 (V). In Examples 70 to 73 and Comparative Examples 14 and 15, evaluation was carried out in the same way as above, but with charging to +650 V, irradiation of the exposure light from a surface potential of +600 V, and with $E_{1/2}$ being the exposure dose required for light attenuation to +300 V.

Equipment Characteristics

The photoreceptors produced in Examples 1 to 69 and Comparative Examples 1 to 13 were installed in Hewlett-Packard LJ4000 printers that had been modified to enable the surface potential of the photoreceptor to be measured, and the potential of the exposure unit was evaluated. In addition, 10,000 sheets of A4 paper were printed out, the film thicknesses of each photoreceptor before and after printing were measured, and the amount of wear (μm) after printing was thereby determined. The photoreceptors produced in Examples 70 to 73 and Comparative Examples 14 and 15 were installed in Brother HL-2040 printers that had been modified to enable the surface potential of the photoreceptor to be measured, and the potential of the exposure unit was evaluated. In addition, 10,000 sheets of A4 paper were printed out, the film thicknesses of each photoreceptor before and after printing were measured, and the amount of wear (μm) after printing was thereby determined.

Evaluation of Crack Resistance

The initial drum was immersed in kerosene for 5 minutes and then air-dried, following which it was wiped off with paper and a crack resistance test carried out. Evaluation was carried out visually by solid black image evaluation on a scale of 1 (Poor: many cracks) to 5 (Good: no cracks).

TABLE 12

|  | Resin | Solubility | Compatibility | Charging | $Vk_5$ (%) | $E_{1/2}$ (μJ/cm²) | Vr5 (V) |
|---|---|---|---|---|---|---|---|
| Example 1 | (III-1) | dissolved | good | negative | 97 | 0.11 | 14 |
| Example 2 | (III-2) | dissolved | good | negative | 96 | 0.13 | 16 |
| Example 3 | (III-3) | dissolved | good | negative | 96 | 0.13 | 15 |

TABLE 12-continued

|  | Resin | Solubility | Compatibility | Charging | $Vk_5$ (%) | $E_{1/2}$ ($\mu J/cm^2$) | Vr5 (V) |
|---|---|---|---|---|---|---|---|
| Example 4 | (III-4) | dissolved | good | negative | 95 | 0.12 | 16 |
| Example 5 | (III-5) | dissolved | good | negative | 96 | 0.13 | 13 |
| Example 6 | (III-6) | dissolved | good | negative | 95 | 0.12 | 15 |
| Example 7 | (III-7) | dissolved | good | negative | 95 | 0.14 | 20 |
| Example 8 | (III-8) | dissolved | good | negative | 94 | 0.15 | 22 |
| Example 9 | (III-9) | dissolved | good | negative | 96 | 0.12 | 21 |
| Example 10 | (III-10) | dissolved | good | negative | 95 | 0.13 | 16 |
| Example 11 | (III-11) | dissolved | good | negative | 96 | 0.12 | 14 |
| Example 12 | (III-12) | dissolved | good | negative | 95 | 0.14 | 15 |
| Example 13 | (III-13) | dissolved | good | negative | 96 | 0.15 | 16 |
| Example 14 | (III-14) | dissolved | good | negative | 95 | 0.12 | 16 |
| Example 15 | (III-15) | dissolved | good | negative | 94 | 0.14 | 13 |
| Example 16 | (III-16) | dissolved | good | negative | 96 | 0.15 | 22 |
| Example 17 | (III-17) | dissolved | good | negative | 96 | 0.12 | 21 |
| Example 18 | (III-18) | dissolved | good | negative | 96 | 0.11 | 15 |
| Example 19 | (III-19) | dissolved | good | negative | 96 | 0.12 | 16 |
| Example 20 | (III-20) | dissolved | good | negative | 95 | 0.11 | 15 |
| Example 21 | (III-21) | dissolved | good | negative | 95 | 0.16 | 13 |
| Example 22 | (III-22) | dissolved | good | negative | 95 | 0.13 | 15 |
| Example 23 | (III-23 | dissolved | good | negative | 95 | 0.15 | 15 |
| Example 24 | (III-24) | dissolved | good | negative | 96 | 0.13 | 20 |
| Example 25 | (III-25) | dissolved | good | negative | 94 | 0.14 | 22 |
| Example 26 | (III-26) | dissolved | good | negative | 96 | 0.11 | 20 |
| Example 27 | (III-27) | dissolved | good | negative | 95 | 0.12 | 18 |
| Example 28 | (III-28) | dissolved | good | negative | 96 | 0.13 | 14 |
| Example 29 | (III-29) | dissolved | good | negative | 96 | 0.15 | 15 |

TABLE 13

|  | Resin | Solubility | Compatibility | Charging | $Vk_5$ (%) | $E_{1/2}$ ($\mu J/cm^2$) | Vr5 (V) |
|---|---|---|---|---|---|---|---|
| Example 30 | (III-30) | dissolved | good | negative | 96 | 0.17 | 16 |
| Example 31 | (III-31) | dissolved | good | negative | 96 | 0.14 | 16 |
| Example 32 | (III-32) | dissolved | good | negative | 94 | 0.12 | 15 |
| Example 33 | (III-33) | dissolved | good | negative | 96 | 0.14 | 23 |
| Example 34 | (III-34) | dissolved | good | negative | 95 | 0.13 | 21 |
| Example 35 | (III-35) | dissolved | good | negative | 96 | 0.11 | 14 |
| Example 36 | (III-36) | dissolved | good | negative | 96 | 0.15 | 16 |
| Example 37 | (III-37) | dissolved | good | negative | 96 | 0.14 | 17 |
| Example 38 | (III-38) | dissolved | good | negative | 95 | 0.16 | 16 |
| Example 39 | (III-39) | dissolved | good | negative | 97 | 0.13 | 14 |
| Example 40 | (III-40) | dissolved | good | negative | 95 | 0.15 | 15 |
| Example 41 | (III-41) | dissolved | good | negative | 94 | 0.14 | 21 |
| Example 42 | (III-42) | dissolved | good | negative | 95 | 0.17 | 22 |
| Example 43 | (III-43) | dissolved | good | negative | 96 | 0.14 | 21 |
| Example 44 | (III-44) | dissolved | good | negative | 94 | 0.12 | 16 |
| Example 45 | (III-45) | dissolved | good | negative | 96 | 0.13 | 16 |
| Example 46 | (III-46) | dissolved | good | negative | 95 | 0.12 | 17 |
| Example 47 | (III-47) | dissolved | good | negative | 97 | 0.14 | 16 |
| Example 48 | (III-48) | dissolved | good | negative | 95 | 0.13 | 15 |
| Example 49 | (III-49) | dissolved | good | negative | 94 | 0.13 | 13 |
| Example 50 | (III-50) | dissolved | good | negative | 96 | 0.14 | 22 |
| Example 51 | (III-51) | dissolved | good | negative | 96 | 0.15 | 23 |
| Example 52 | (III-52 | dissolved | good | negative | 94 | 0.11 | 14 |
| Example 53 | (III-53) | dissolved | good | negative | 96 | 0.14 | 16 |
| Example 54 | (III-54) | dissolved | good | negative | 96 | 0.13 | 17 |
| Example 55 | (III-55) | dissolved | good | negative | 95 | 0.14 | 16 |
| Example 56 | (III-56) | dissolved | good | negative | 96 | 0.12 | 13 |
| Example 57 | (III-57) | dissolved | good | negative | 95 | 0.15 | 17 |
| Example 58 | (III-58) | dissolved | good | negative | 94 | 0.12 | 20 |
| Example 59 | (III-59) | dissolved | good | negative | 94 | 0.15 | 21 |

TABLE 14

|  | Resin | Solubility | Compatibility | Charging | $Vk_5$ (%) | $E_{1/2}$ ($\mu J/cm^2$) | Vr5 (V) |
|---|---|---|---|---|---|---|---|
| Example 60 | (III-60) | dissolved | good | negative | 95 | 0.15 | 21 |
| Example 61 | (III-61) | dissolved | good | negative | 95 | 0.13 | 18 |
| Example 62 | (III-62) | dissolved | good | negative | 96 | 0.12 | 17 |
| Example 63 | (III-63) | dissolved | good | negative | 95 | 0.13 | 15 |

TABLE 14-continued

|  | Resin | Solubility | Compatibility | Charging | $Vk_5$ (%) | $E_{1/2}$ ($\mu J/cm^2$) | Vr5 (V) |
|---|---|---|---|---|---|---|---|
| Example 64 | (III-64) | dissolved | good | negative | 97 | 0.15 | 16 |
| Example 65 | (III-65) | dissolved | good | negative | 96 | 0.14 | 15 |
| Example 66 | (III-1) | dissolved | good | negative | 96 | 0.20 | 20 |
| Example 67 | (III-1) | dissolved | good | negative | 96 | 0.14 | 12 |
| Example 68 | (III-1) | dissolved | good | negative | 95 | 0.15 | 14 |
| Example 69 | (III-1) | dissolved | good | negative | 96 | 0.15 | 16 |
| Example 70 | (III-1) | dissolved | good | positive | 85 | 0.27 | 28 |
| Example 71 | (III-1) | dissolved | good | positive | 82 | 0.26 | 27 |
| Example 72 | (III-1) | dissolved | good | positive | 83 | 0.26 | 26 |
| Example 73 | (III-1) | dissolved | good | positive | 82 | 0.31 | 25 |

TABLE 15

|  | Resin | Machine light area potential (−V) | Amount of wear (μm) | Lubricity (dynamic coefficient of friction) Before printing | Lubricity (dynamic coefficient of friction) After printing | Image | Crack resistance |
|---|---|---|---|---|---|---|---|
| Example 1 | (III-1) | 120 | 1.3 | 0.41 | 0.70 | good | 5 |
| Example 2 | (III-2) | 123 | 1.5 | 0.41 | 0.72 | good | 5 |
| Example 3 | (III-3) | 115 | 1.3 | 0.51 | 0.71 | good | 5 |
| Example 4 | (III-4) | 122 | 1.5 | 0.33 | 0.72 | good | 5 |
| Example 5 | (III-5) | 123 | 1.3 | 0.32 | 0.82 | good | 5 |
| Example 6 | (III-6) | 116 | 1.6 | 0.43 | 0.90 | good | 5 |
| Example 7 | (III-7) | 136 | 1.5 | 0.33 | 0.64 | good | 5 |
| Example 8 | (III-8) | 125 | 1.6 | 0.33 | 0.61 | good | 5 |
| Example 9 | (III-9) | 123 | 1.4 | 0.31 | 0.76 | good | 5 |
| Example 10 | (III-10) | 113 | 1.4 | 0.44 | 0.81 | good | 5 |
| Example 11 | (III-11) | 108 | 1.3 | 0.52 | 0.86 | good | 5 |
| Example 12 | (III-12) | 96 | 1.5 | 0.62 | 0.91 | good | 5 |
| Example 13 | (III-13) | 119 | 1.8 | 0.42 | 0.76 | good | 5 |
| Example 14 | (III-14) | 123 | 1.8 | 0.54 | 0.83 | good | 5 |
| Example 15 | (III-15) | 122 | 1.6 | 0.52 | 0.86 | good | 5 |
| Example 16 | (III-16) | 131 | 1.7 | 0.35 | 0.62 | good | 5 |
| Example 17 | (III-17) | 123 | 1.6 | 0.31 | 0.73 | good | 5 |
| Example 18 | (III-1) | 122 | 1.2 | 0.42 | 0.73 | good | 5 |
| Example 19 | (III-2) | 124 | 1.4 | 0.41 | 0.70 | good | 5 |
| Example 20 | (III-3) | 116 | 1.2 | 0.53 | 0.81 | good | 5 |
| Example 21 | (III-4) | 121 | 1.4 | 0.31 | 0.75 | good | 5 |
| Example 22 | (III-5) | 122 | 1.4 | 0.36 | 0.83 | good | 5 |
| Example 23 | (III-6) | 115 | 1.5 | 0.41 | 0.93 | good | 5 |
| Example 24 | (III-7) | 132 | 1.7 | 0.35 | 0.62 | good | 5 |
| Example 25 | (III-8) | 126 | 1.4 | 0.34 | 0.60 | good | 5 |
| Example 26 | (III-9) | 125 | 1.7 | 0.32 | 0.74 | good | 5 |
| Example 27 | (III-10) | 111 | 1.3 | 0.43 | 0.85 | good | 5 |
| Example 28 | (III-11) | 105 | 1.5 | 0.54 | 0.83 | good | 5 |
| Example 29 | (III-12) | 99 | 1.3 | 0.60 | 0.95 | good | 5 |

TABLE 16

|  | Resin | Machine light area potential (−V) | Amount of wear (μm) | Lubricity (dynamic coefficient of friction) Before printing | Lubricity (dynamic coefficient of friction) After printing | Image | Crack resistance |
|---|---|---|---|---|---|---|---|
| Example 30 | (III-13) | 117 | 1.9 | 0.44 | 0.74 | good | 5 |
| Example 31 | (III-14) | 121 | 1.5 | 0.51 | 0.82 | good | 5 |
| Example 32 | (III-15) | 125 | 1.7 | 0.53 | 0.81 | good | 5 |
| Example 33 | (III-16) | 132 | 1.5 | 0.33 | 0.65 | good | 5 |
| Example 34 | (III-17) | 120 | 1.7 | 0.32 | 0.71 | good | 5 |
| Example 35 | (III-1) | 122 | 1.3 | 0.40 | 0.75 | good | 5 |
| Example 36 | (III-2) | 122 | 1.3 | 0.42 | 0.71 | good | 5 |
| Example 37 | (III-3) | 115 | 1.3 | 0.51 | 0.84 | good | 5 |
| Example 38 | (III-4) | 122 | 1.5 | 0.34 | 0.72 | good | 5 |
| Example 39 | (III-5) | 123 | 1.3 | 0.32 | 0.85 | good | 5 |
| Example 40 | (III-6) | 116 | 1.6 | 0.42 | 0.90 | good | 5 |
| Example 41 | (III-7) | 136 | 1.5 | 0.33 | 0.64 | good | 5 |
| Example 42 | (III-8) | 125 | 1.6 | 0.33 | 0.61 | good | 5 |

TABLE 16-continued

|  | Resin | Machine light area potential (−V) | Amount of wear (μm) | Lubricity (dynamic coefficient of friction) Before printing | Lubricity (dynamic coefficient of friction) After printing | Image | Crack resistance |
|---|---|---|---|---|---|---|---|
| Example 43 | (III-9) | 123 | 1.4 | 0.31 | 0.72 | good | 5 |
| Example 44 | (III-10) | 113 | 1.4 | 0.42 | 0.81 | good | 5 |
| Example 45 | (III-11) | 108 | 1.4 | 0.52 | 0.86 | good | 5 |
| Example 46 | (III-12) | 95 | 1.5 | 0.62 | 0.91 | good | 5 |
| Example 47 | (III-13) | 119 | 1.7 | 0.42 | 0.72 | good | 5 |
| Example 48 | (III-14) | 122 | 1.8 | 0.53 | 0.83 | good | 5 |
| Example 49 | (III-15) | 122 | 1.4 | 0.52 | 0.83 | good | 5 |
| Example 50 | (III-16) | 131 | 2.0 | 0.36 | 0.62 | good | 5 |
| Example 51 | (III-17) | 123 | 1.6 | 0.31 | 0.73 | good | 5 |
| Example 52 | (III-1) | 121 | 1.2 | 0.42 | 0.73 | good | 5 |
| Example 53 | (III-2) | 124 | 1.4 | 0.41 | 0.75 | good | 5 |
| Example 54 | (III-3) | 113 | 1.2 | 0.53 | 0.81 | good | 5 |
| Example 55 | (III-4) | 121 | 1.3 | 0.31 | 0.75 | good | 5 |
| Example 56 | (III-5) | 125 | 1.4 | 0.33 | 0.83 | good | 5 |
| Example 57 | (III-6) | 115 | 1.5 | 0.41 | 0.92 | good | 5 |
| Example 58 | (III-7) | 135 | 1.7 | 0.32 | 0.62 | good | 5 |
| Example 59 | (III-8) | 126 | 1.4 | 0.34 | 0.63 | good | 5 |

TABLE 17

|  | Resin | Machine light area potential (−V) | Amount of wear (μm) | Lubricity (dynamic coefficient of friction) Before printing | Lubricity (dynamic coefficient of friction) After printing | Image | Crack resistance |
|---|---|---|---|---|---|---|---|
| Example 60 | (III-9) | 126 | 1.7 | 0.35 | 0.74 | good | 5 |
| Example 61 | (III-10) | 111 | 1.3 | 0.43 | 0.86 | good | 5 |
| Example 62 | (III-11) | 105 | 1.5 | 0.52 | 0.83 | good | 5 |
| Example 63 | (III-12) | 99 | 1.5 | 0.60 | 0.91 | good | 5 |
| Example 64 | (III-13) | 119 | 1.6 | 0.42 | 0.73 | good | 5 |
| Example 65 | (III-14) | 125 | 1.8 | 0.54 | 0.83 | good | 5 |
| Example 66 | (III-1) | 141 | 1.5 | 0.43 | 0.71 | good | 5 |
| Example 67 | (III-1) | 93 | 1.6 | 0.45 | 0.72 | good | 5 |
| Example 68 | (III-1) | 112 | 2.0 | 0.64 | 1.05 | good | 5 |
| Example 69 | (III-1) | 113 | 2.5 | 0.71 | 1.06 | good | 5 |
| Example 70 | (III-1) | −132 | 1.8 | 0.52 | 0.74 | good | 5 |
| Example 71 | (III-1) | −105 | 1.7 | 0.53 | 0.77 | good | 5 |
| Example 72 | (III-1) | −113 | 1.9 | 0.55 | 0.86 | good | 5 |
| Example 73 | (III-1) | −114 | 1.8 | 0.46 | 0.70 | good | 5 |

TABLE 18

|  | Resin | Solubility | Compatibility | Charging | $Vk_5$ (%) | $E_{1/2}$ (μJ/cm$^2$) | Vr5 (V) |
|---|---|---|---|---|---|---|---|
| Comp. Ex. 1 | (III-66) | partially undissolved | phase-separated | negative | 94 | 0.31 | 87 |
| Comp. Ex. 2 | (III-67) | partially undissolved | phase-separated | negative | 93 | 0.34 | 126 |
| Comp. Ex. 3 | (III-68) | partially undissolved | good | negative | 94 | 0.37 | 117 |
| Comp. Ex. 4 | (III-69) | partially undissolved | good | negative | 95 | 0.35 | 124 |
| Comp. Ex. 5 | (III-70) | partially undissolved | good | negative | 96 | 0.36 | 127 |
| Comp. Ex. 6 | (III-71) | partially undissolved | good | negative | 93 | 0.31 | 128 |
| Comp. Ex. 7 | (III-72) | dissolved | good | negative | 93 | 0.18 | 27 |
| Comp. Ex. 8 | (III-73) | dissolved | good | negative | 93 | 0.19 | 29 |
| Comp. Ex. 9 | (III-74) | dissolved | good | negative | 91 | 0.27 | 37 |
| Comp. Ex. 10 | (III-75) | dissolved | good | negative | 86 | 0.27 | 27 |

TABLE 18-continued

|  | Resin | Solubility | Compatibility | Charging | Vk₅ (%) | E₁/₂ (μJ/cm²) | Vr5 (V) |
|---|---|---|---|---|---|---|---|
| Comp. Ex. 11 | (III-76) | dissolved | good | negative | 82 | 0.28 | 26 |
| Comp. Ex. 12 | (III-77) | dissolved | good | negative | 93 | 0.15 | 29 |
| Comp. Ex. 13 | (III-78) | dissolved | good | negative | 91 | 0.25 | 32 |
| Comp. Ex. 14 | (III-75) | dissolved | good | positive | 88 | 0.29 | 27 |
| Comp. Ex. 15 | (III-75) | dissolved | good | positive | 81 | 0.28 | 29 |

TABLE 19

|  | Resin | Machine light area potential (−V) | Amount of wear (μm) | Lubricity (dynamic coefficient of friction) Before printing | Lubricity (dynamic coefficient of friction) After printing | Image | Crack resistance |
|---|---|---|---|---|---|---|---|
| Comp. Ex. 1 | (III-66) | −185 | 3.9 | 0.35 | 0.61 | decrease in density | 3 |
| Comp. Ex. 2 | (III-67) | −243 | 4.2 | 0.26 | 0.66 | decrease in density | 3 |
| Comp. Ex. 3 | (III-68) | −225 | 3.7 | 0.33 | 0.75 | decrease in density | 3 |
| Comp. Ex. 4 | (III-69) | −221 | 3.8 | 2.96 | 3.08 | streak-like image defects | 3 |
| Comp. Ex. 5 | (III-70) | −222 | 3.9 | 2.85 | 3.11 | streak-like image defects | 3 |
| Comp. Ex. 6 | (III-71) | −224 | 3.8 | 2.75 | 3.12 | streak-like image defects | 3 |
| Comp. Ex. 7 | (III-72) | −132 | 3.9 | 2.83 | 3.15 | streak-like image defects | 5 |
| Comp. Ex. 8 | (III-73) | −145 | 3.5 | 2.85 | 3.18 | streak-like image defects | 5 |
| Comp. Ex. 9 | (III-74) | −137 | 3.4 | 2.57 | 3.36 | streak-like image defects | 5 |
| Comp. Ex. 10 | (III-75) | −125 | 2.9 | 2.85 | 3.06 | good | 2 |
| Comp. Ex. 11 | (III-76) | −126 | 4.1 | 2.93 | 3.16 | streak-like image defects | 5 |
| Comp. Ex. 12 | (III-77) | −142 | 3.6 | 1.37 | 2.15 | streak-like image defects | 4 |
| Comp. Ex. 13 | (III-78) | −135 | 3.4 | 1.58 | 2.34 | streak-like image defects | 3 |
| Comp. Ex. 14 | (III-75) | 126 | 2.8 | 2.59 | 3.45 | good | 2 |
| Comp. Ex. 15 | (III-75) | 128 | 2.7 | 2.66 | 3.39 | good | 2 |

Based on the results in Tables 12 to 19 above, the photoreceptors in Examples 1 to 73 exhibited a low coefficient of friction, both initially and after printing on a printer, and a good crack resistance, with no loss in electrical characteristics. Moreover, the amount of wear after printing was smaller than for other resins containing no siloxane components. In Comparative Examples 1 to 3, a problem was identified in respect of solubility of the resin, but the results showed a poor crack resistance and a loss of electrical characteristics. In Comparative Examples 4 to 6, because the resins contained no siloxane components, the coefficient of friction was high, the crack resistance was poor, and streak-like image defects appeared on the printed images. In Comparative Examples 7 to 9 and 11, the crack resistance was good, but because the resins contained no siloxane components, the coefficient of friction was high and streak-like image defects appeared on the printed images. In Comparative Examples 10, 14 and 15, there were no problems with the electrical characteristics, but the coefficient of friction was high, the crack resistance was poor, and the amount of wear was large. In Comparative Examples 12 and 13, there were no problems with the electrical characteristics and the initial coefficient of friction, but the coefficient of friction after printing showed large fluctuations, the crack resistance decreased, the amount of wear was large and streak-like image defects thought to be caused by the relaxation of stress within the film were confirmed.

The above findings confirm that by using the copolymeric polyarylate resins of the invention, excellent electrophotographic photoreceptors which have a low coefficient of friction and undergo little wear can be obtained with no loss in their electrical characteristics.

The invention claimed is:

1. A method of producing an electrophotographic photoreceptor, comprising:

forming a photosensitive layer by applying, onto an electrically conductive substrate, a coating liquid that includes at least a resin binder that is a reaction product of a siloxane component selected from among (C), (D), (E) and (F) below in a solution polymerization, followed by an interfacial polymerization, and that is a copolymeric polyarylate resin having structural units of Chemical Structural Formula 1 below:

Chemical Structural Formula 1

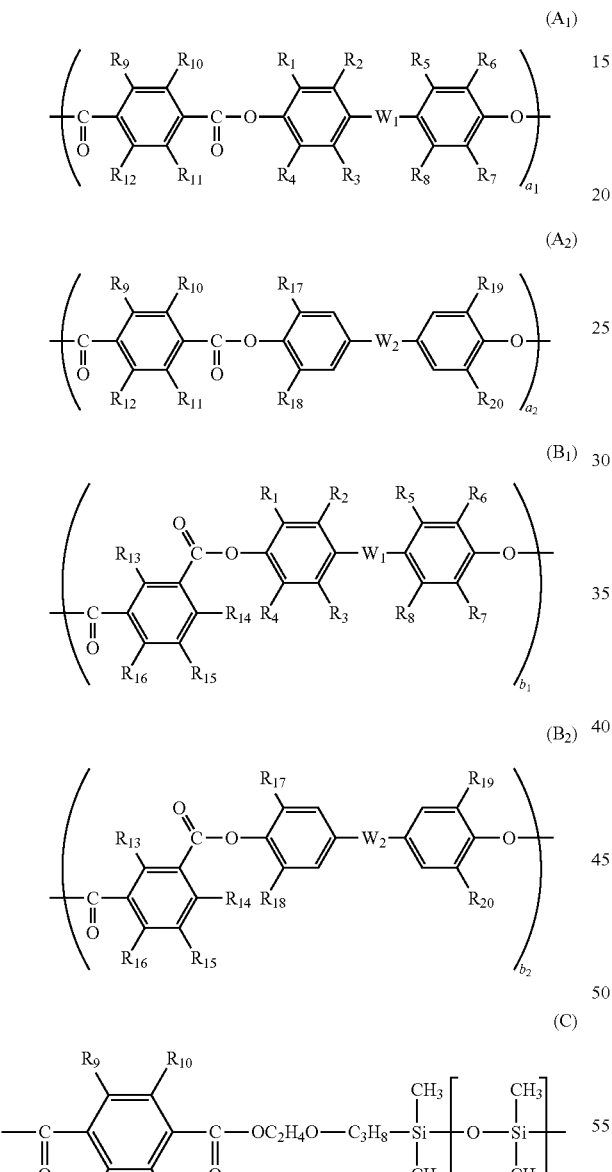

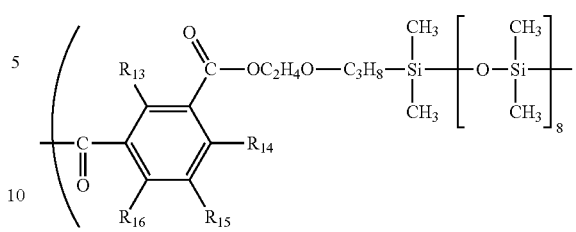

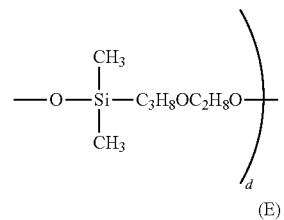

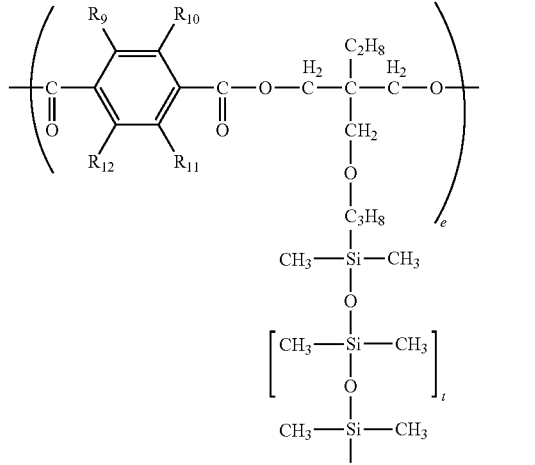

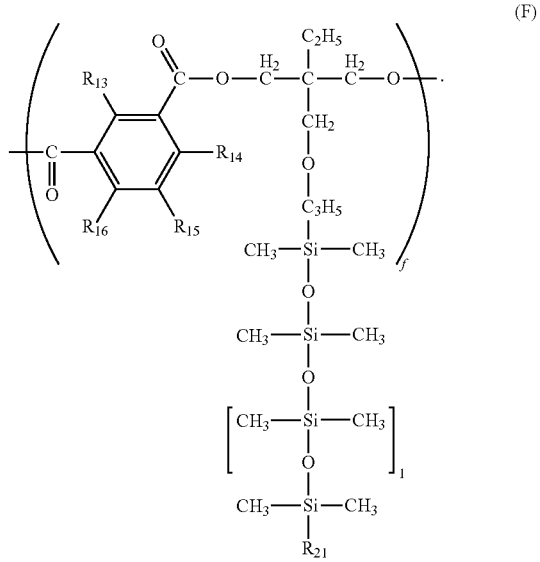

where partial structural formulas $(A_1)$, $(A_2)$, $(B_1)$, $(B_2)$, (C), (D), (E) and (F) are structural units making up the resin binder; $a_1$, $a_2$, $b_1$, $b_2$, c, d, e and f represent mol % of the respective structural units $(A_1)$, $(A_2)$, $(B_1)$, $(B_2)$, (C), (D), (E) and (F), with $a_1+a_2+b_1+b_2+c+d+e+f$ being 100 mol % and c+d+e+f being from 0.001 to 10 mol %; $W_1$ and $W_2$ are two different moieties selected from the group consisting of a single bond, —O—, —S—, —SO—, —CO—, —SO$_2$—, —CR$_{22}$R$_{23}$— (R$_{22}$ and R$_{23}$ being a hydrogen atom, an alkyl group or halogenated alkyl group of 1 to 12 carbons, or a substituted or unsubstituted aryl group of 6 to 12 carbons), substituted or unsubstituted cycloalkylidene groups of 5 to 12 carbons, substituted or unsubstituted α,ω-alkylene groups of 2 to 12 carbons, a 9,9-fluorenylidene group, substituted or unsubstituted arylene groups of 6 to 12 carbons, and divalent groups containing an aryl group or arylene group of 6 to 12 carbons; R$_1$ to R$_{20}$ are each a hydrogen atom, an alkyl group of 1 to 8 carbons, a fluorine atom, a chlorine atom or a bromine atom; R$_{21}$ is a hydrogen atom, an alkyl group of 1 to 20 carbons, an aryl group, a cycloalkyl group, a fluorine atom, a chlorine atom or a bromine atom; and "s" and "t" are integers of 1 or more.

2. The method according to claim 1, wherein, in Chemical Structural Formula 1, W$_2$ is a single bond, —O— or —CR$_{22}$R$_{23}$— (each of R$_{22}$ and R$_{23}$ being a hydrogen atom, a methyl group or an ethyl group).

3. The method according to claim 1, wherein, in Chemical Structural Formula 1, W$_1$ is —CR$_{22}$R$_{23}$— (each of R$_{22}$ and R$_{23}$ being a hydrogen atom, a methyl group or an ethyl group).

4. The method according to claim 1, wherein, in Chemical Structural Formula 1, W$_1$ is a methylene group, W$_2$ is a single bond, R$_1$ and R$_6$ are each methyl groups, and R$_2$ to R$_5$ and R$_7$ to R$_{20}$ are hydrogen atoms.

5. The method according to claim 1, wherein the structural units of Chemical Structural Formula 1 account for 10 to 100 mol % of the 100 mol % copolymeric polyarylate resin.

6. The method according to claim 1 wherein, in Chemical Structural Formula 1, "c" and "d" are 0 mol %.

7. The method according to claim 1, wherein, in Chemical Structural Formula 1, "e" and "f" are 0 mol %.

8. The method according to claim 1, wherein the photosensitive layer has at least a charge generating layer and a charge transport layer, and the charge transport layer includes the copolymeric polyarylate resin and a charge transporting material.

9. The method according to claim 8, further comprising:
stacking the charge generating layer on the charge transport layer on the electrically conductive substrate.

10. The method according to claim 1, wherein the photosensitive layer includes the copolymeric polyarylate resin, a charge generating material and a charge transporting material.

11. The method according to claim 1, wherein the photosensitive layer has at least a charge transport layer and a charge generating layer, and the charge generating layer includes the copolymeric polyarylate resin, a charge generating material and a charge transporting material.

12. The method according to claim 11, further comprising:
stacking the charge generating layer on the charge transport layer on the electrically conductive substrate.

13. The method according to claim 11, wherein the charge transporting material includes a hole transporting material and an electron transporting material.

14. A method of preparing a copolymeric polyarylate resin comprising:
synthesizing the copolymeric polyarylate resin by reacting a siloxane component selected from among (C), (D), (E) and (F) in a solution polymerization; and
performing an interfacial polymerization on a product of the reaction of the siloxane component in the solution polymerization,
wherein the copolymeric polyarylate resin has structural units of Chemical Structural Formula 1 below:

Chemical Structural Formula 1

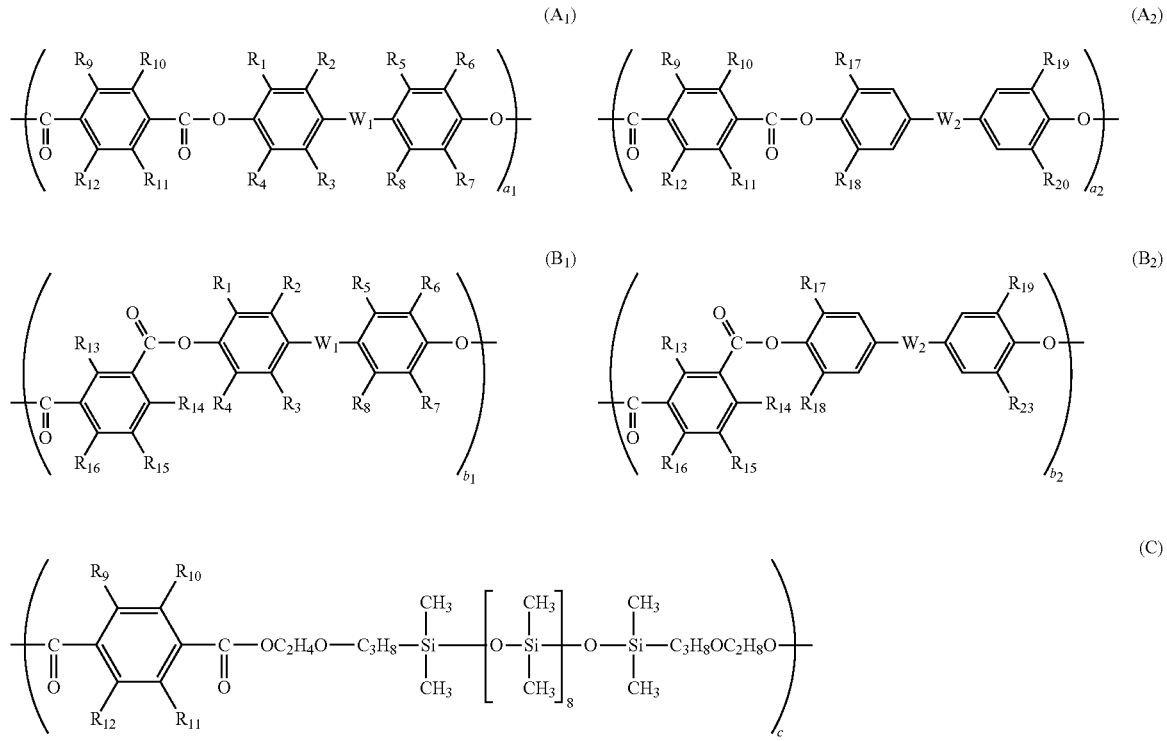

-continued

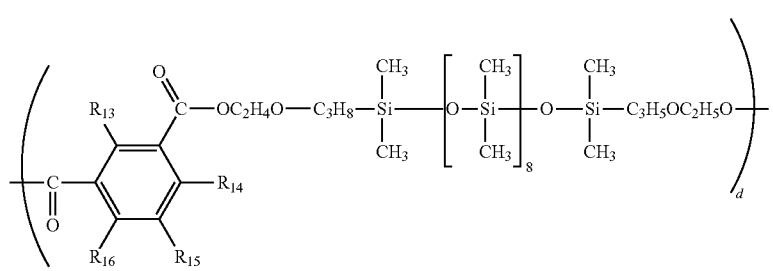

(D)

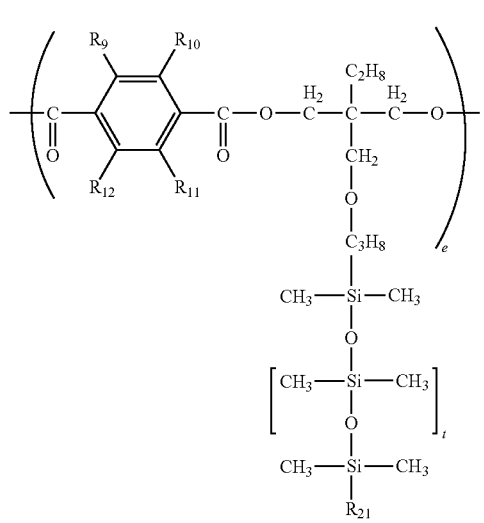

(E)

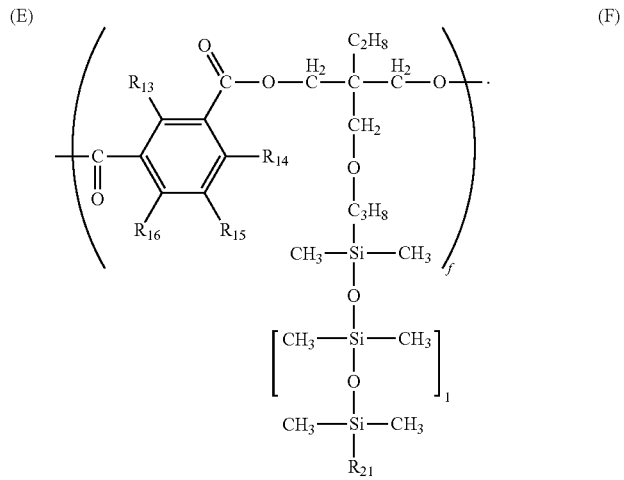

(F)

15. The method of producing an electrophotographic photoreceptor according to claim 1, wherein, in Chemical Structural Formula 1, $W_1$ is a methylene group, $W_2$ is a single bond, $R_1$ and $R_6$ are each methyl groups, and $R_2$ to $R_5$ and $R_7$ to $R_{20}$ are hydrogen atoms.

16. The method of preparing a copolymeric polyarylate resin for a photosensitive layer of an electrophotographic photoreceptor according to claim 14, wherein, in Chemical Structural Formula 1, $W_1$ is a methylene group, $W_2$ is a single bond, $R_1$ and $R_6$ are each methyl groups, and $R_2$ to $R_5$ and $R_7$ to $R_{20}$ are hydrogen atoms.

17. A method of producing an electrophotographic photoreceptor, comprising:

generating a reaction product of a siloxane component selected from among (C), (D), (E) and (F) below in a solution polymerization;

performing an interfacial polymerization on the reaction product of the siloxane component and the solution polymerization to generate a resin binder; and coating a coating liquid including the resin binder onto an electrically conductive substrate to form a photosensitive layer, wherein the resin binder is a copolymeric polyarylate resin having structural units of Chemical Structural Formula 1 below:

Chemical Structural Formula 1

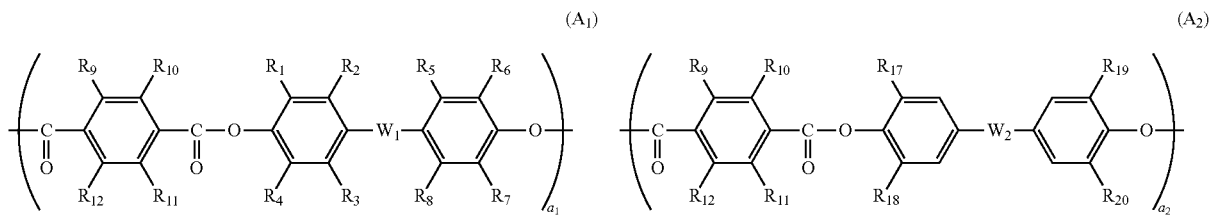

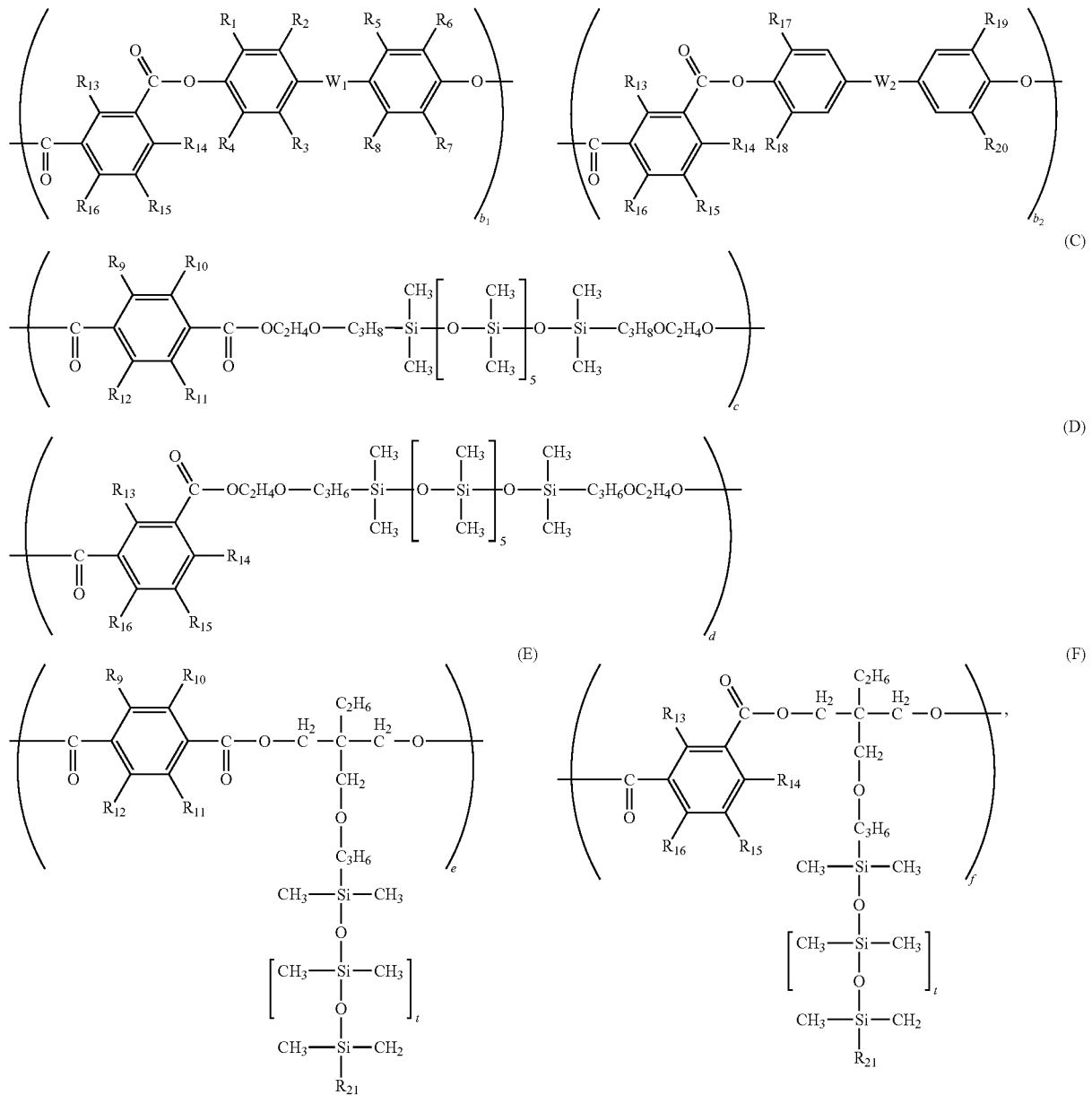

wherein partial structural formulas (A₁), (A₂), (B₁), (B₂), (C), (D), (E) and (F) are structural units making up the resin binder, $a_1$, $a_2$, $b_1$, $b_2$, c, d, e and f represent mol % of the respective structural units (A₁), (A₂), (B₁), (B₂), (C), (D), (E) and (F), with $a_1+a_2+b_1+b_2+c+d+e+f$ being 100 mol % and c+d+e+f being from 0.001 to 10 mol %, W₁ and W₂ are two different moieties selected from the group consisting of a single bond, —O—, —S—, —SO—, —CO—, —SO₂—, —CR₂₂R₂₃— (R₂₂ and R₂₃ each being a hydrogen atom, an alkyl group or halogenated alkyl group of 1 to 12 carbons, or a substituted or unsubstituted aryl group of 6 to 12 carbons), substituted or unsubstituted cycloalkylidene groups of 5 to 12 carbons, substituted or unsubstituted α,ω-alkylene groups of 2 to 12 carbons, a 9,9-fluorenylidene group, substituted or unsubstituted arylene groups of 6 to 12 carbons, and divalent groups containing an aryl group or arylene group of 6 to 12 carbons, R₁ to R₂₀ are each a hydrogen atom, an alkyl group of 1 to 8 carbons, a fluorine atom, a chlorine atom or a bromine atom, and R₂₁ is a hydrogen atom, an alkyl group of 1 to 20 carbons, an aryl group, a cycloalkyl group, a fluorine atom, a chlorine atom or a bromine atom; and "s" and "t" are integers of 1 or more.

* * * * *